United States Patent [19]
Mori et al.

[11] Patent Number: 5,660,454
[45] Date of Patent: Aug. 26, 1997

[54] APPARATUS AND METHOD FOR CONTROLLING LIGHT DISTRIBUTION OF HEADLAMP

[75] Inventors: Takakazu Mori, Toyoto; Takashi Nakamura, Susono, both of Japan

[73] Assignee: Toyota Jidosha Kabushiki Kaisha, Toyota, Japan

[21] Appl. No.: 112,381

[22] Filed: Aug. 27, 1993

[30] Foreign Application Priority Data

Aug. 28, 1992 [JP] Japan ................... 4-230055

[51] Int. Cl.⁶ ........................................ B60Q 1/04
[52] U.S. Cl. ............................... 362/61; 362/66
[58] Field of Search ........................ 362/36, 37, 66, 362/61, 284, 286

[56] References Cited

U.S. PATENT DOCUMENTS

| | | | |
|---|---|---|---|
| 4,768,135 | 8/1988 | Kretschmer et al. | |
| 4,870,545 | 9/1989 | Hatanaka | 362/66 |
| 4,891,559 | 1/1990 | Matsumoto et al. | 362/66 |
| 4,967,319 | 10/1990 | Seko | 362/66 |
| 5,010,457 | 4/1991 | Ohmamyuda et al. | 362/66 |
| 5,016,155 | 5/1991 | Chevance | 362/66 |
| 5,193,894 | 3/1993 | Lietar et al. | |
| 5,331,251 | 7/1994 | Marois | 362/66 |

FOREIGN PATENT DOCUMENTS

| | | |
|---|---|---|
| 55-22299 | 6/1980 | Japan . |
| 2-27938 | 2/1990 | Japan . |

*Primary Examiner*—Y. My Quach
*Attorney, Agent, or Firm*—Cushman, Darby & Cushman IP Group of Pillsbury Madison & Sutro LLP

[57] ABSTRACT

An apparatus for controlling the light distribution of a headlamp includes a vehicle speed sensor; a calculating device for estimating a position to be reached by the vehicle after a predetermined time along a forward roadway of the vehicle on the basis of a vehicle speed and information representing a route of the forward roadway, and for calculating a direction of illumination or a range of illumination by the headlamp so that light is illuminated onto an estimated position; and a control device for controlling the direction of illumination or the range of illumination by the headlamp on the basis of a result of calculation by the calculating device. The light is illuminated onto a position, which is located ahead of the vehicle and which is viewed by a driver, for obtaining an optimum light distribution for a field of view of the driver.

18 Claims, 36 Drawing Sheets

145

Fφ

FV

GW

GS

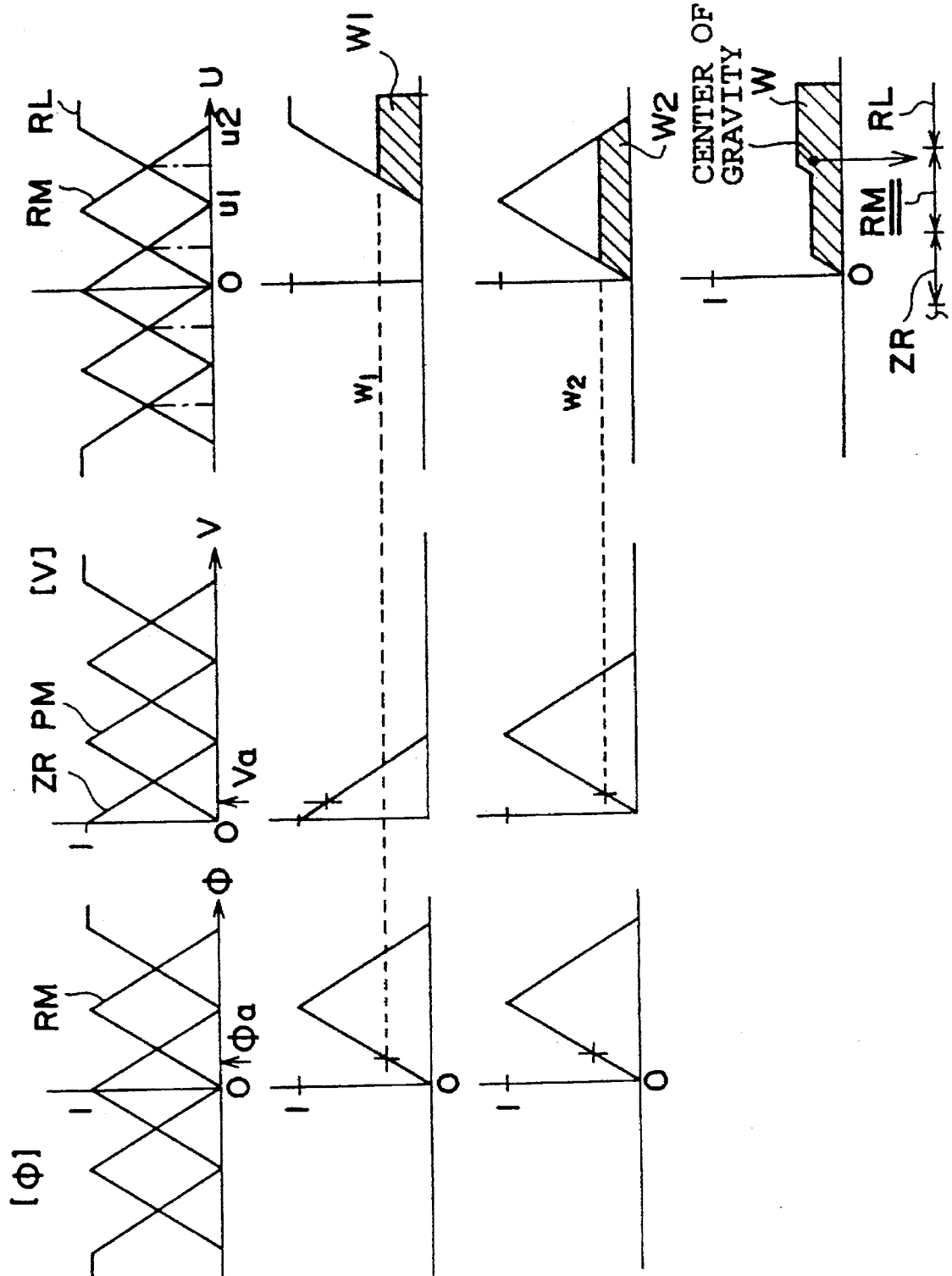

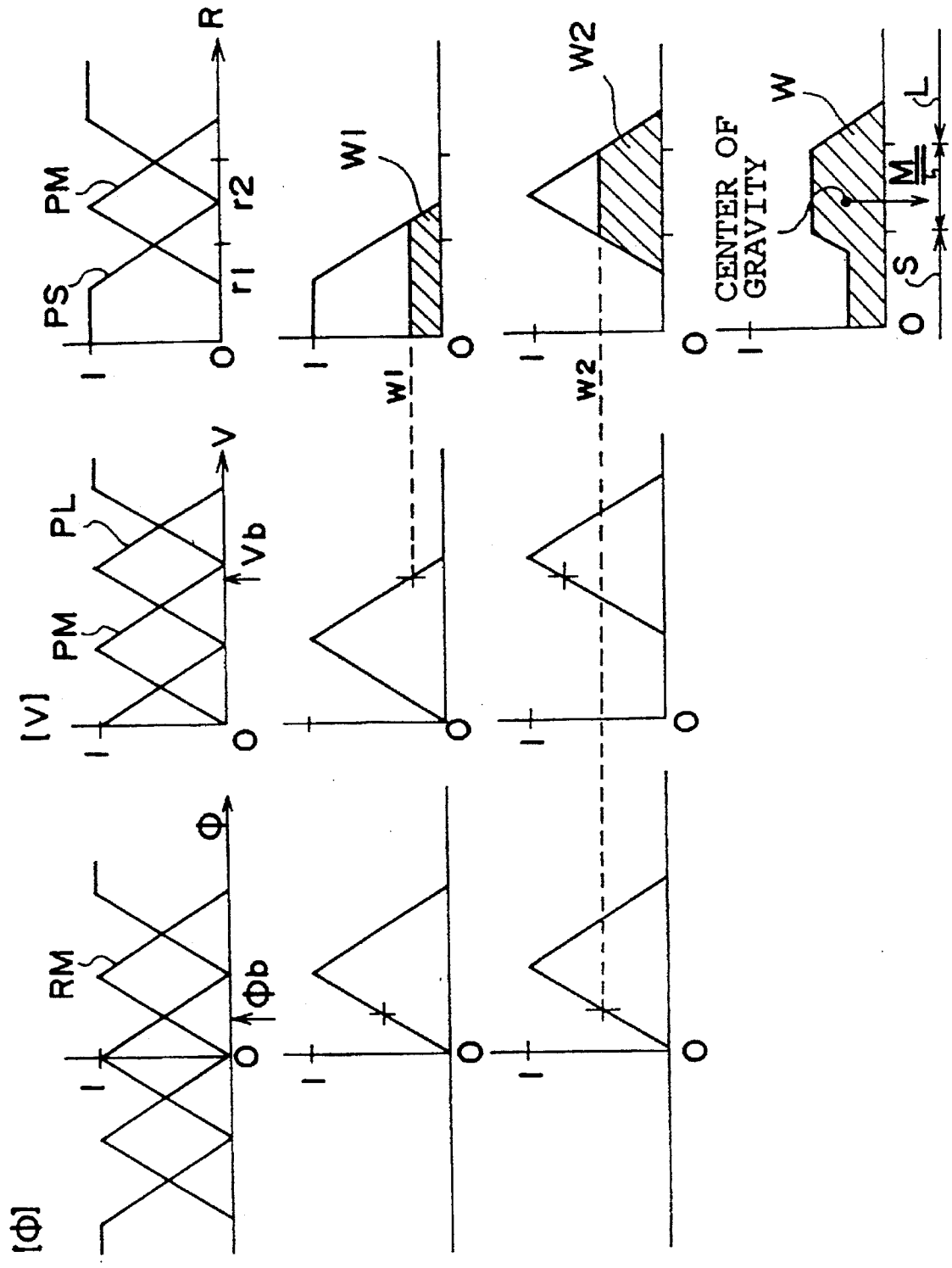

FIG. 25A  FdV
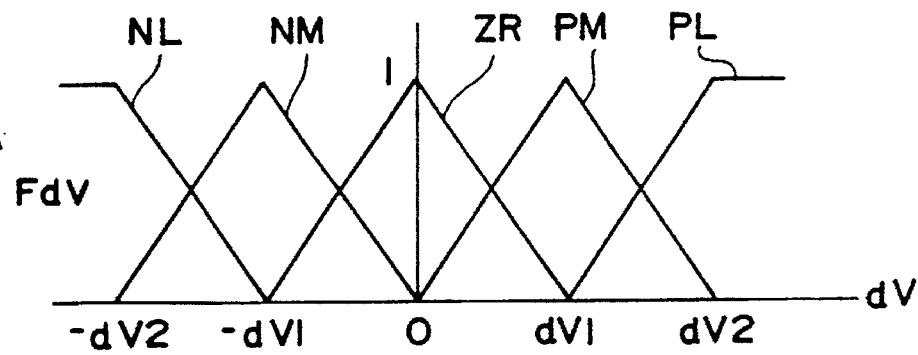
FIG. 25B  FΦ'
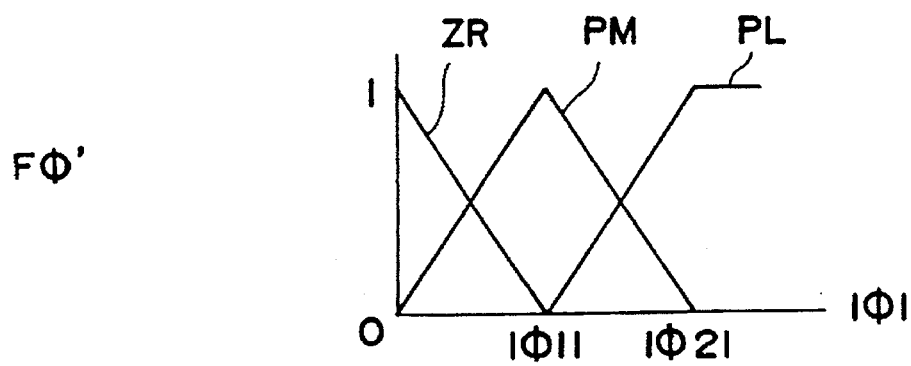
FIG. 25C  GK
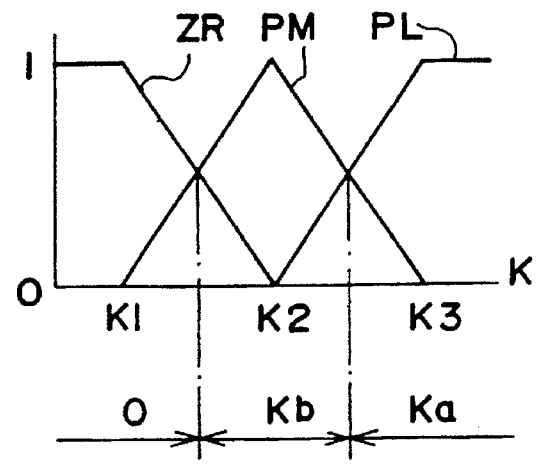

HIGH-SPEED-RUNNING DISCRIMINATING ROUTINE
INTERRUPT AT PREDETERMINED TIMING

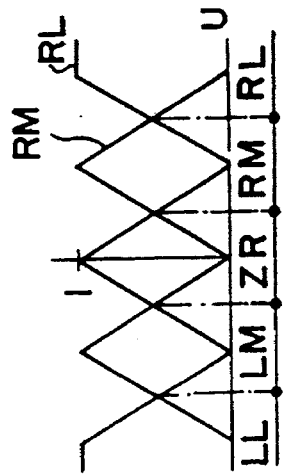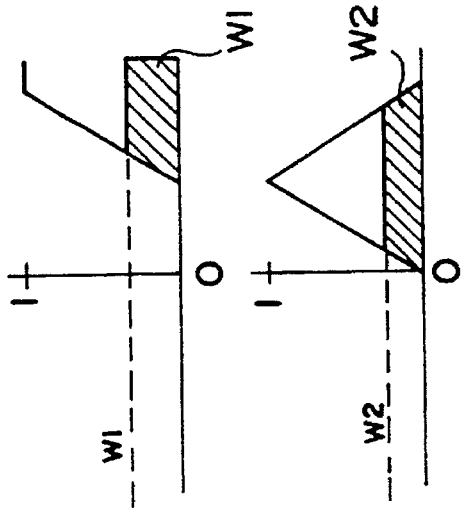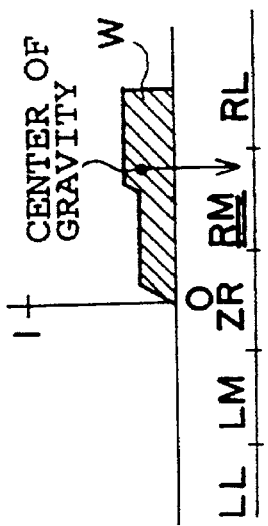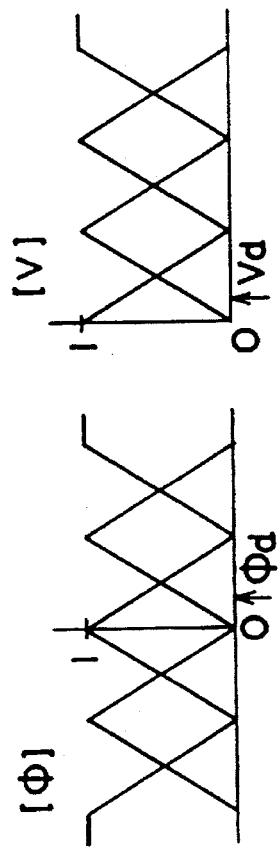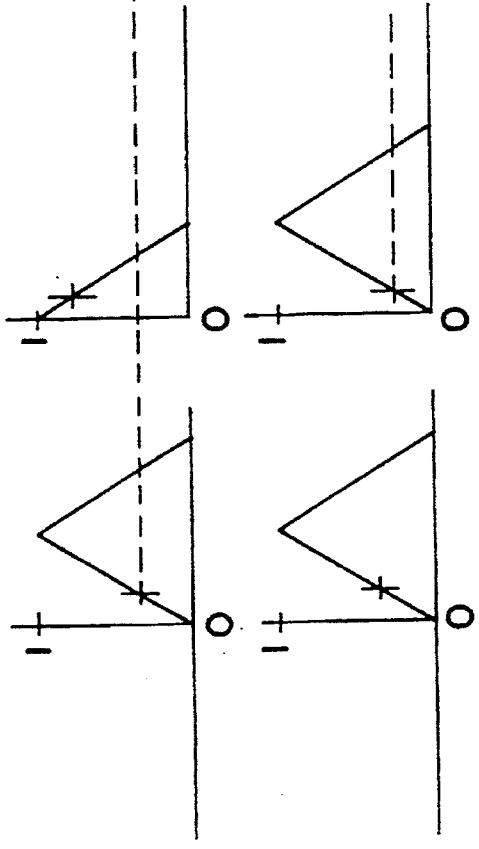
FIG. 33A
FIG. 33B
FIG. 33C
FIG. 33D

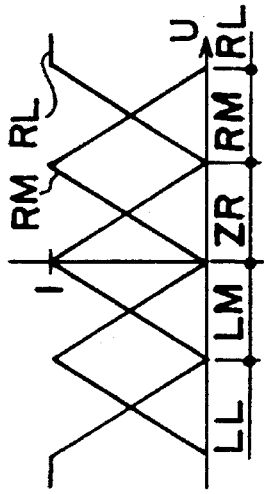
FIG. 34A
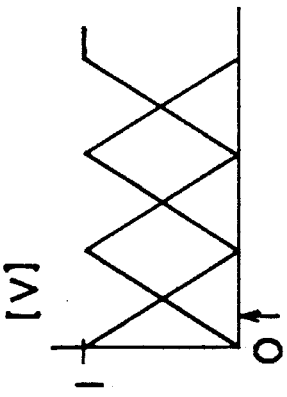
FIG. 34B
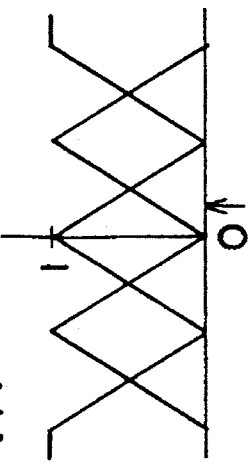
FIG. 34C
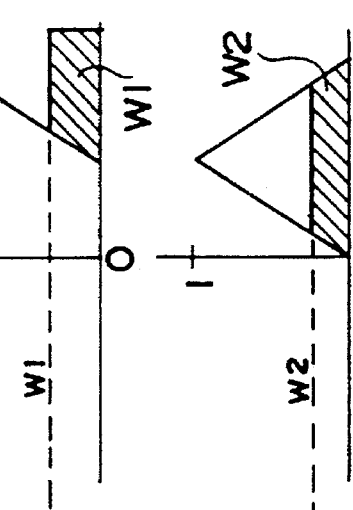
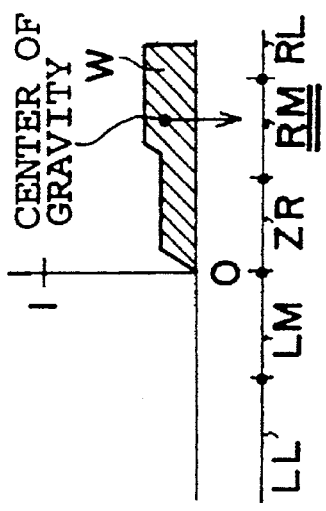
FIG. 34D

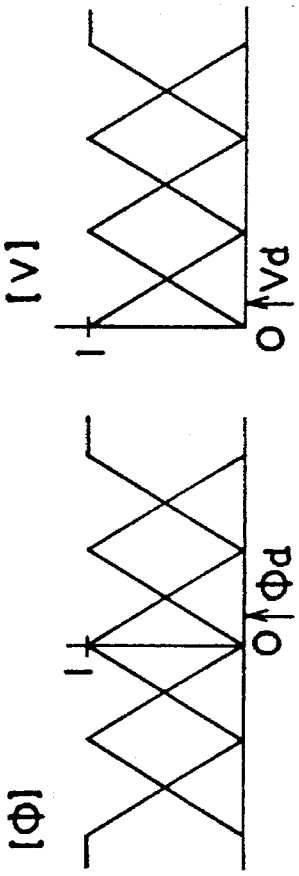
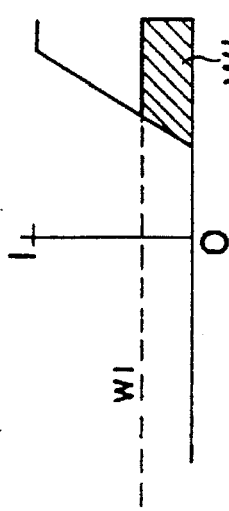
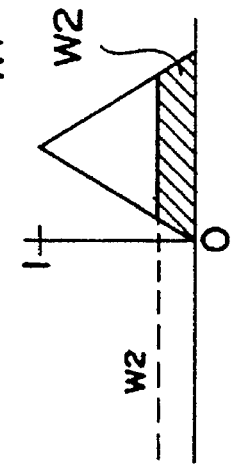
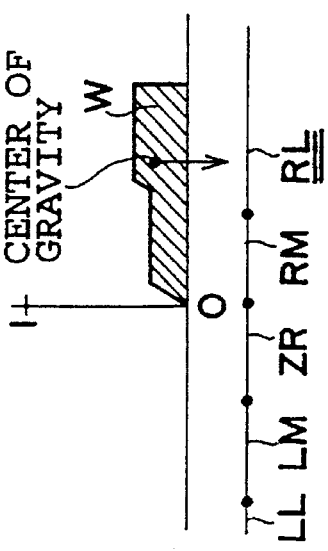
FIG. 35A
FIG. 35B
FIG. 35C
FIG. 35D

APPARATUS AND METHOD FOR CONTROLLING LIGHT DISTRIBUTION OF HEADLAMP

BACKGROUND OF THE INVENTION

1. Field of the Invention

The present invention relates to an apparatus and method for controlling the light distribution of a headlamp, and more particularly to an apparatus and method for controlling the light distribution of a headlamp so as to control the light distribution of a headlamp for illuminating an area ahead of a vehicle during running in correspondence with a running state.

2. Description of the Related Art

Conventionally, a vehicle is provided with headlamps for improving the forward visibility of a driver for night driving or the like. In general, a pair of headlamps are respectively disposed on the left and right sides of a front end of the vehicle, and illuminate a relatively wide zone. However, since the headlamps are fixed, there are cases where the driver must continuously view a dark zone which is outside the range of illumination by the headlamps of the vehicle depending on the running state of the vehicle, e.g., when the vehicle makes a turn. Thus, there have been cases where an area which the driver needs to view during the running of a vehicle cannot be illuminated brightly.

To overcome this drawback, a headlamp has been proposed which illuminates an area corresponding to the running direction by changing the optical axis of illumination by the headlamp in correspondence with a steering angle (Japanese Patent Application Publication No. 22299/1980). According to this method, however, although the direction of illumination can be changed, the range of illumination is fixed, so that it is impossible to illuminate the area ahead in a wide range. Accordingly, a headlamp apparatus has been proposed in which the degree of the advancing direction of a vehicle is detected from a steering angle or the like, and the area of light illuminated by the headlamp is enlarged or reduced on the basis of a detected value, thereby guaranteeing an area of illumination by the headlamp with respect to the view position of the driver (Japanese Utility Model Application Laid-Open No. 27938/1990).

However, the position viewed by the driver during driving is not uniformly determined by the running direction of the vehicle or the steering angle of the vehicle. Namely, the driver determines the state of the vehicle such as the running direction and the speed by estimating the position which the vehicle is about to reach, and by viewing the vicinity of that position and estimating its condition. Therefore, if the degree of the advancing direction of the vehicle is detected only from the steering angle or the like, the illumination of the light by the headlamps will lag behind the driver's determination, so that the control of the light distribution ahead of the vehicle lags behind, thereby making it impossible to illuminate an optimum position which provides the driver with information suited to a view prompting an accurate determination. In addition, when making a turn with such headlamps, since the timing of viewing by the driver always precedes the timing of illumination by the headlamps, the driver inevitably views a position which undergoes a shift from a dark condition due to being not illuminated by the headlamps to a bright condition due to being illuminated by the headlamps. Accordingly, when such a shift takes place continually, the driver may experience an unpleasant sensation.

SUMMARY OF THE INVENTION

In view of the above-described circumstances, it is an object of the present invention to provide an apparatus and method for controlling the light distribution of a headlamp capable of positively illuminating a position viewed by the driver while driving a vehicle.

To this end, in accordance with one aspect of the invention, there is provided an apparatus for controlling the light distribution of a headlamp, comprising: a vehicle speed sensor for detecting a speed of a vehicle having a headlamp in which at least one of a direction of illumination and a range of illumination is changeable; calculating means for estimating a position to be reached by the vehicle after a predetermined time along a forward roadway of the vehicle on the basis of the vehicle speed and information representing a route of the forward roadway, and for calculating at least one of the direction of illumination and the range of illumination by the headlamp so that light is illuminated onto the estimated position; and control means for controlling at least one of the direction of illumination and the range of illumination by the headlamp on the basis of a result of calculation by the calculating means.

In accordance with a second aspect of the invention, there is provided an apparatus for controlling the light distribution of a headlamp, comprising: an image sensor for detecting an image including a route of a forward roadway of a vehicle having a headlamp in which at least one of a direction of illumination and a range of illumination is changeable; a vehicle speed sensor for detecting a speed of the vehicle; image processing means for extracting the route of the forward roadway on the basis of a signal inputted from the image sensor; calculating means for estimating a position to be reached by the vehicle after a predetermined time along the forward roadway on the basis of a change in the vehicle speed, a current vehicle speed, and the extracted route of the forward roadway, when the change in the vehicle speed from a time When the signal from the image sensor is inputted to a time when the route of the forward roadway is extracted exceeds a predetermined value, and for calculating at least one of the direction of illumination and the range of illumination by the headlamp so that light is illuminated onto the estimated position; and control means for controlling at least one of the direction of illumination and the range of illumination by the headlamp on the basis of a result of calculation by the calculating means.

In accordance with a third aspect of the invention, there is provided an apparatus for controlling the light distribution of a headlamp, comprising: a vehicle speed sensor for detecting a speed of a vehicle having a headlamp in which at least one of a direction of illumination and a range of illumination is changeable; a turn signal switch for indicating a moving direction of the vehicle; calculating means for estimating a position to be reached by the vehicle after a predetermined time along a forward roadway of the vehicle on the basis of information representing a route of the forward roadway, the vehicle speed, and a direction of the vehicle indicated by the turn signal switch, and for calculating at least one of the direction of illumination and the range of illumination by the headlamp so that light is illuminated onto the estimated position; and control means for controlling at least one of the direction of illumination and the range of illumination by the headlamp on the basis of a result of calculation by the calculating means.

In accordance with a fourth aspect of the invention, there is provided an apparatus for controlling the light distribution of a vehicle headlamp in which at least one of a direction of illumination and a range of illumination is changeable, comprising: storage means for storing a plurality of beam patterns of an area ahead of the vehicle which correspond to at least one of the direction of illumination and the range of illumination by the headlamp; selecting means for selecting a beam pattern stored in the storage means; and control means for controlling at least one of the direction of illumination and the range of illumination by the headlamp on the basis of the beam pattern selected by the selecting means.

In accordance with a fifth aspect of the invention, there is provided an apparatus for controlling the light distribution of a headlamp, comprising: a vehicle speed sensor for detecting a speed of a vehicle having a headlamp in which at least one of a direction of illumination and a range of illumination is changeable; storage means for storing a plurality of beam patterns of an area ahead of the vehicle which correspond to at least one of the direction of illumination and the range of illumination by the headlamp; selecting means for selecting a beam pattern stored in the storage means such that a position to be reached by the vehicle after a predetermined time along a forward roadway of the vehicle is estimated on the basis of the vehicle speed and information representing a route of the forward roadway and such that light is illuminated onto the estimated position; and control means for controlling at least one of the direction of illumination and the range of illumination by the headlamp on the basis of the beam pattern selected by the selecting means.

The apparatus for controlling the light distribution of a headlamp in accordance with the first aspect of the invention has a vehicle speed sensor which detects the vehicle speed. As this vehicle speed sensor, a speed indicator provided on a rotating shaft of a speedometer is known. The vehicle has a headlamp capable of changing at least one of a direction of illumination and a range of illumination. The change of the direction of illumination can be realized by oscillating the center optical axis of the headlamp in a vertical direction. Also, the change of the range of illumination can be realized by providing a light-shielding plate movable to a predetermined position in an emergent direction of the headlamp and by moving the light-shielding lamp. The calculating means estimates a position to be reached by the vehicle after a predetermined time along a forward roadway of the vehicle on the basis of the vehicle speed and information representing a route of the forward roadway. Also, the calculating means calculates at least one of the direction of illumination and the range of illumination by the headlamp so that light is illuminated onto the estimated position. The position reached after the predetermined time is a position coinciding with the position viewed by the driver. By estimating this position, it is possible to estimate the position viewed by the driver. The information representing the route of the forward roadway of the vehicle includes an image photographed by a camera or the like and information based on road-vehicle communication for receiving road information and the like transmitted from sign posts arranged along the road or its vicinity. By virtue of such information, it is possible to specify the route of the forward roadway of the vehicle. The control means controls at least one of the direction of illumination and the range of illumination by the headlamp on the basis of the result of calculation by the calculating means.

The apparatus for controlling the light distribution of a headlamp in accordance with a second aspect of the invention has an image sensor which detects an image including the route of the forward roadway of the vehicle having a headlamp capable of changing at least one of the direction of illumination and the range of illumination. As this image sensor, image pickup devices such as a night vision camera, an infrared camera, and an X-ray camera are known. The route of the forward roadway of the vehicle is extracted by an image processor on the basis of the signal inputted thereto from the image sensor. In the extraction of the route of the forward roadway, it is possible to make use of a center line of the road or the like as well as a boundary, such as a curb, for discriminating between the forward roadway and a surrounding area. The calculating means estimates a position to be reached by the vehicle a predetermined time along the forward roadway on the basis of a change in the vehicle speed from a time when the signal is inputted thereto from the image sensor until a time when the route of the forward roadway is extracted, a present vehicle speed, and the route of the forward roadway detected when the change in the vehicle speed exceeds a predetermined value. Also, the calculating means calculates at least one of the direction of illumination and the range of illumination by the headlamp so that light is illuminated onto the estimated position. Accordingly, as for the estimated position, i.e., the position viewed by the driver, even if time is required in the extraction of the route of the forward roadway by the image processor, the distribution of light from the headlamp, i.e., at least one of the direction of illumination and the range of illumination, is calculated on the basis of the vehicle speed which has undergone a change with that time. Accordingly, the control means is capable of controlling at least one of the direction of illumination and the range of illumination by the headlamp on the basis of the result of calculation by the calculating means such that the light is illuminated onto an optimum position being viewed by the driver.

In accordance with the third aspect of the invention, the calculating means estimates a position to be reached by the vehicle after a predetermined time along the forward roadway of the vehicle on the basis of information representing the route of the forward roadway, the vehicle speed, and the direction of the vehicle indicated by a turn signal switch, and calculates at least one of the direction of illumination and the range of illumination by the headlamp so that light is illuminated onto the estimated position. Accordingly, when the distribution of light is effected on the basis of the route of the forward roadway of the vehicle, if the direction of movement of the vehicle is indicated by the turn signal switch, the illumination by the headlamp can be effected on the basis of the indicated direction. Thus, it is possible to effect optimum illumination even during a lane change on an expressway or the like.

The apparatus for controlling the light distribution of a vehicle headlamp in accordance with the fourth aspect of the invention controls the light distribution of a vehicle having a headlamp capable of changing at least one of the direction of illumination and the range of illumination. This apparatus for controlling light distribution has storage means which stores a plurality of beam patterns of an area ahead of the vehicle which correspond to at least one of the direction of illumination and the range of illumination by the headlamp. A beam pattern stored in this storage means is selected by selecting means. The control means controls at least one of the direction of illumination and the range of illumination by the headlamp on the basis of the beam pattern selected by the selecting means. Thus, since a plurality of beam patterns are stored, it is possible to construct the apparatus for controlling the light distribution of a headlamp with a simple arrangement and simple control only by selecting a desired beam pattern from the plurality of beam patterns without involving complicated operations or a complex apparatus.

In accordance with the fifth aspect of the invention, a beam pattern is selected by the selecting means from among the plurality of beam patterns stored in the storage means provided in the apparatus for controlling the light distribution of a headlamp. The beam patterns stored by the storage means are patterns of distribution of the light in an area ahead of the vehicle by means of the headlamp, and they correspond to at least one of the direction and range of illumination by the headlamp. In addition, the beam pattern selected by the selecting means is a pattern such that a position to be reached by the vehicle after a predetermined time along the forward roadway of the vehicle is estimated on the basis of the vehicle speed and information representing the route of the forward roadway, and such that light is illuminated onto the estimated position. The vehicle speed is detected by the vehicle speed sensor. The control means controls at least one of the direction of illumination and the range of illumination by the headlamp on the basis of the beam pattern selected. Accordingly, the light distribution control for illuminating the estimated position, i.e., the position viewed by the driver, by means of the headlamp can be effected easily by selecting a predetermined beam pattern.

As described above, in accordance with the first aspect of the present invention, since the position to be reached by the vehicle a predetermined time afterwards along the forward roadway, i.e., the position viewed by the driver, is estimated on the basis of the route of the forward roadway and the vehicle speed, an advantage can be obtained in that it is possible to effect satisfactory light distribution control of the headlamps with excellent visibility for allowing the driver to effect visual confirmation in accordance with the running state.

In accordance with the second aspect of the invention, even in the case of an apparatus which requires processing time for image processing or the like, the view position is corrected in accordance with a changing vehicle speed in accordance with that processing time. Accordingly, there is an advantage in that it is possible to effect stable light-distribution control of a headlamp which coincides with the running state of the vehicle without causing a time lag in the light distribution control.

In accordance with the third aspect of the invention, since the view position is estimated on the basis of the route of the forward roadway, the vehicle speed, and an indication of the direction of movement of the vehicle, there is an advantage in that it is possible to effect the light distribution control of a headlight with excellent visibility for allowing the driver to visually confirm when making a lane change while driving at high speed, for example.

In accordance with the fourth aspect of the invention, since the light distribution control is effected in accordance with predetermined beam patterns, advantages can be obtained in that the light distribution control can be executed within a short time, that the light distribution control and the structure of the controller can be simplified, and that a stable light distribution of the headlamp can be obtained even with respect to a change in the direction of the vehicle.

In accordance with the fifth aspect of the invention, since the position viewed by the driver is estimated on the basis of the route of the forward roadway and the vehicle speed, advantages can be obtained in that it is possible to effect the light distribution control of a headlight with excellent visibility for allowing the driver to visually confirm in accordance with the running state, and that since the light distribution control is effected by means of predetermined beam patterns, the light distribution control can be executed within a short time, and the light distribution control and the structure of the controller can be simplified.

The other objects, features and advantages of the present invention will become more apparent from the following detailed description of the invention when read in conjunction with the accompanying drawings.

BRIEF DESCRIPTION OF THE DRAWINGS

FIGS. 16A to 16D are diagrams illustrating a fuzzy inference process of spread-light distribution in accordance with a first embodiment;

FIGS. 17A to 17D are diagrams illustrating a fuzzy inference process of light distribution on the basis of the distance reached by the light in accordance with the first embodiment;

FIGS. 25A to 25C are diagrams illustrating membership functions in accordance with a third embodiment;

FIGS. 33A to 33D are diagrams illustrating fuzzy inference processing in a normal running state in accordance with the fourth embodiment;

FIGS. 34A to 34D are diagrams illustrating fuzzy inference processing when a left-turn signal switch is on in accordance with the fourth embodiment;

FIGS. 35A to 35D are diagrams illustrating fuzzy inference processing when a right-turn signal switch is on in accordance with the fourth embodiment;

DESCRIPTION OF THE PREFERRED EMBODIMENTS

Referring now to the accompanying drawings, a detailed description will be given of the embodiments of the present invention. In the following embodiments, the present invention is applied to an apparatus for controlling the light distribution of a headlamp disposed at the front of a vehicle.

First Embodiment

A description will be given of an apparatus for controlling the light distribution of a headlamp in accordance with a first embodiment of the present invention.
(Structure of Vehicle 10)

Figure 1:
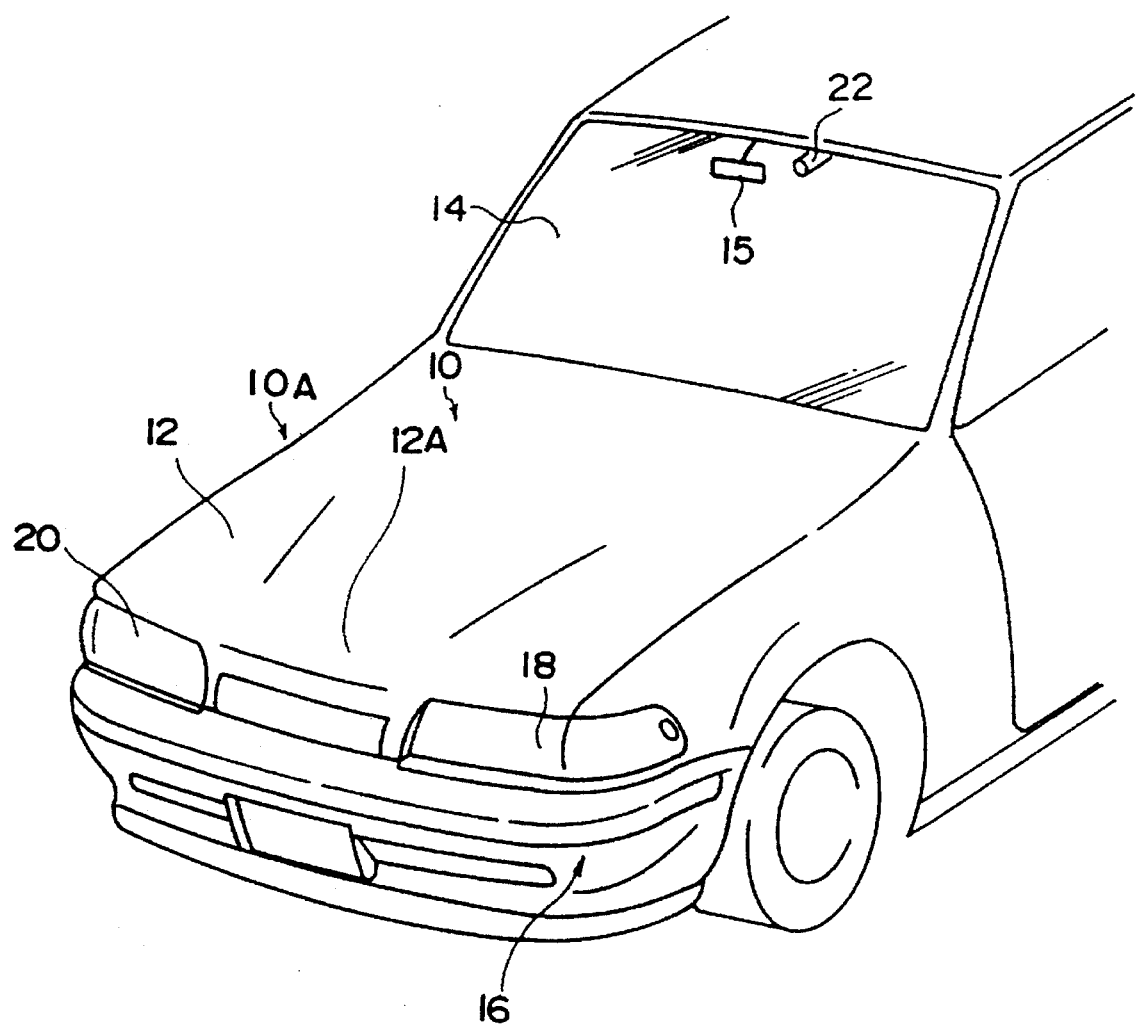
FIG. 1 is a perspective view taken from a front diagonal direction of a vehicle and illustrating a front portion of the vehicle in accordance with the present embodiment.

As shown in FIG. 1, an engine hood 12 is disposed as an upper-surface panel of a front body 10A of a vehicle 10, and is swingably mounted on the body frame by means of hinges (not shown) disposed at a rear end of the hood 12. A front bumper 16 is fixed to opposite ends, as viewed in the transverse direction of the vehicle, of a front end of the front body 10A. A pair of left and right headlamps 18, 20 (at opposite ends in the transverse direction of the vehicle) is disposed above the front bumper 16 and below the front body 10A.

Figure 6:
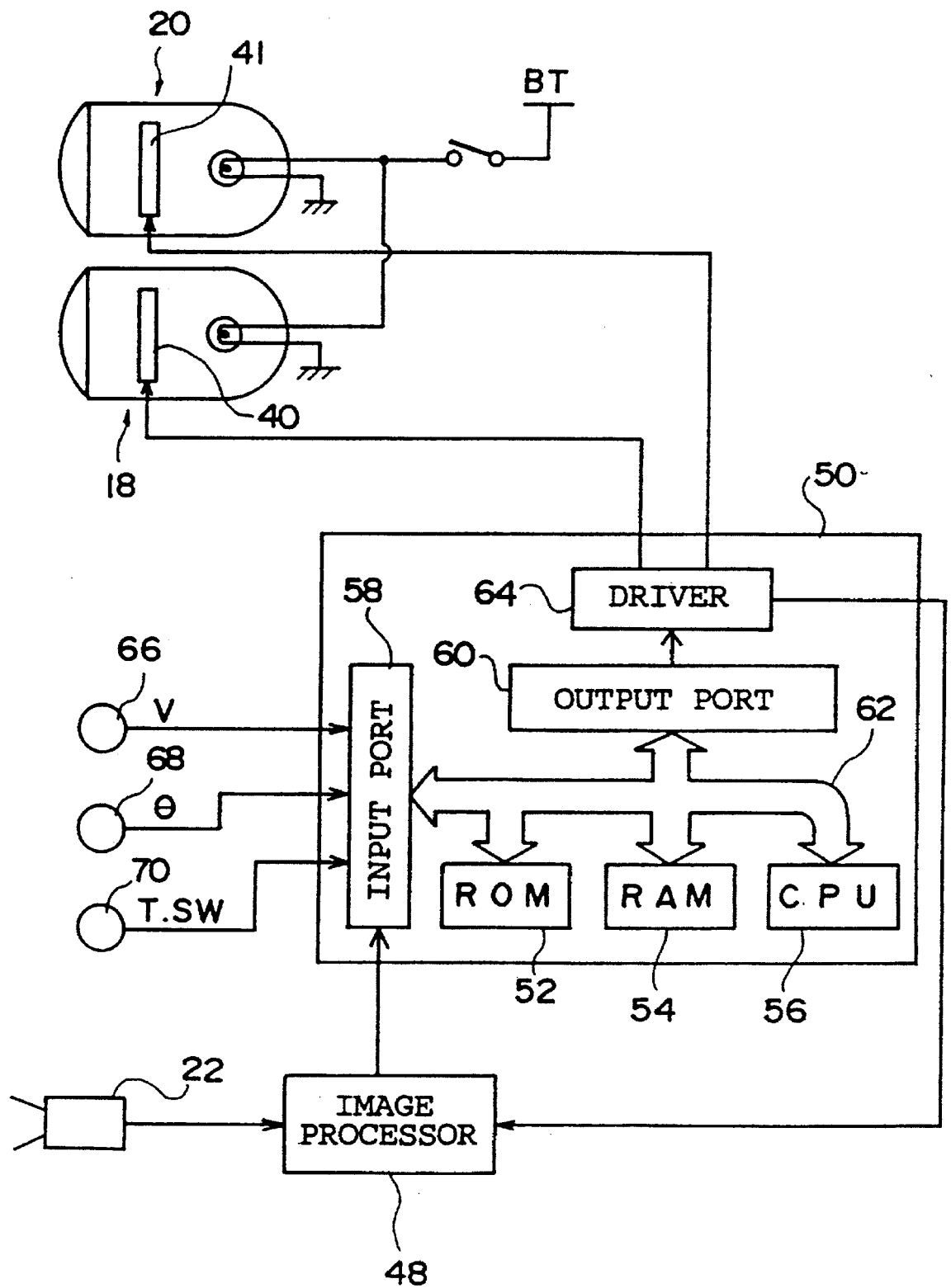
FIG. 6 is a block diagram illustrating a schematic structure of a controller.

In addition, a windshield 14 is disposed in the vicinity of the rear end of the engine hood 12. A rearview mirror 15 is disposed in the vehicle compartment in the vicinity of an upper portion of the windshield 14. A night vision camera 22 including a nighttime-detection optical system for shooting a scene ahead of the vehicle is installed in the vicinity of the rearview mirror 15. This night vision camera 22 is connected to an image processor 48 (FIG. 6). The night vision camera 22 is preferably located in the vicinity of the viewing position (so-called eye point) of the driver so as to make it possible to accurately recognize the route of the road ahead of the vehicle and to better match the driver's visual sense.

Figure 2:
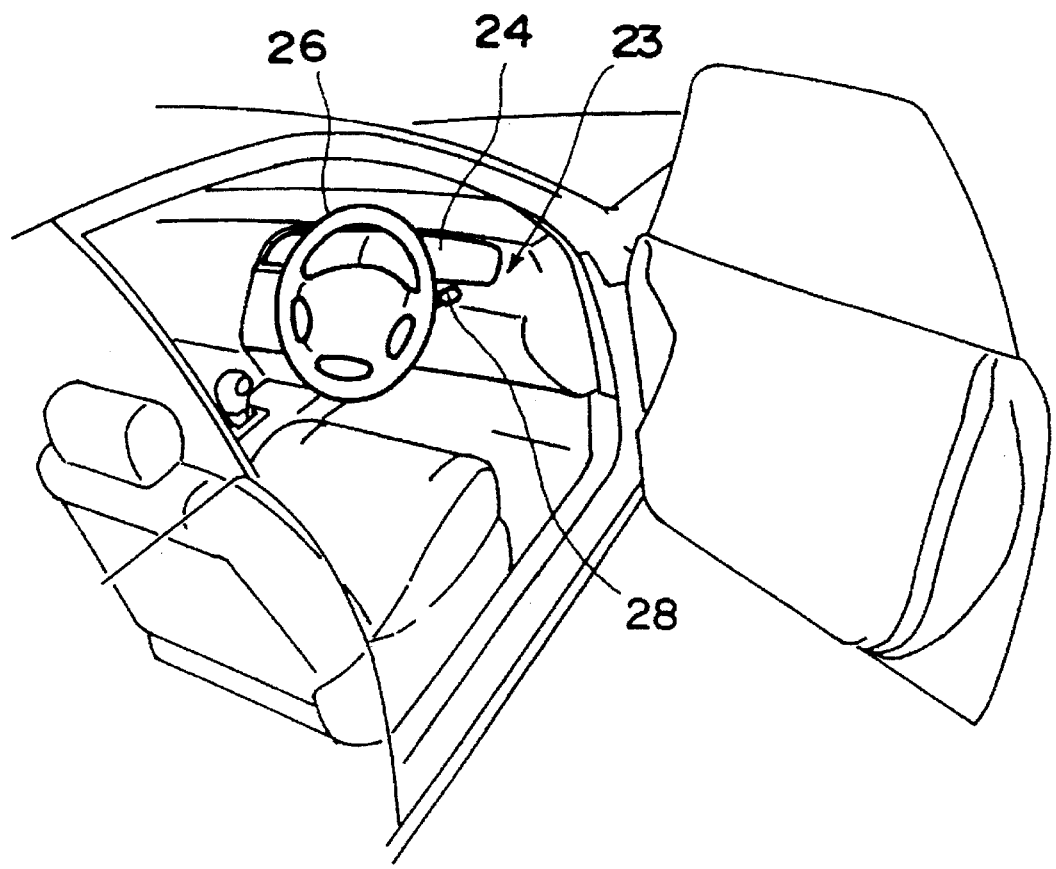
FIG. 2 is a perspective view taken from a rear diagonal direction of a driver's seat of the vehicle and illustrating the front portion of the vehicle.
Figure 3:
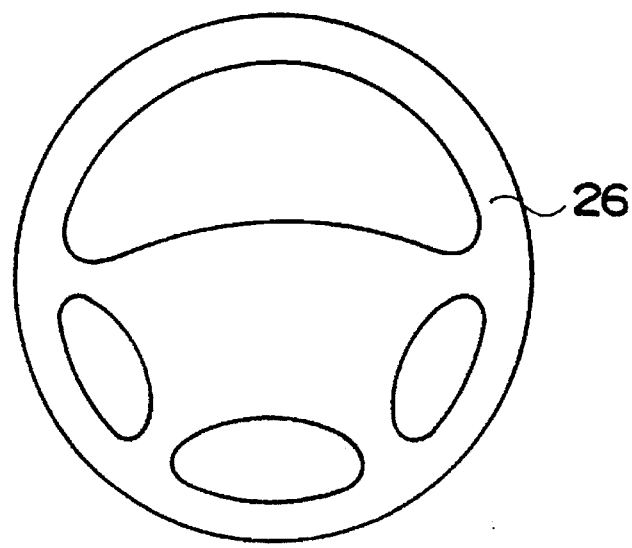
FIG. 3 is a plan view of a steering wheel.

As shown in FIG. 2, a steering wheel 26 is provided in the vehicle compartment, and an unillustrated rotating shaft of the steering wheel 26 is provided with a steering angle sensor 68 for detecting the rotational angle of the steering wheel 26. A turn signal lever 28 is disposed in the vicinity of the unillustrated rotating shaft of the steering wheel 26. This turn signal lever 28 has a turn signal switch 70 (FIG. 6). The turn signal switch 70 has two contacts (not shown) TSL (left indication) and TSR (right indication) corresponding to indications of the direction of the vehicle 10. The contact corresponding to the indication of the direction of the vehicle 10 is connected (turned on) when the turn signal lever 28 is swung. A speedometer 24 is provided on an instrument panel 23. A vehicle speed sensor 66 (FIG. 6) for detecting the running speed V of the vehicle 10 is attached to an unillustrated cable of the speedometer 24.

(Headlamps)

Figure 4:
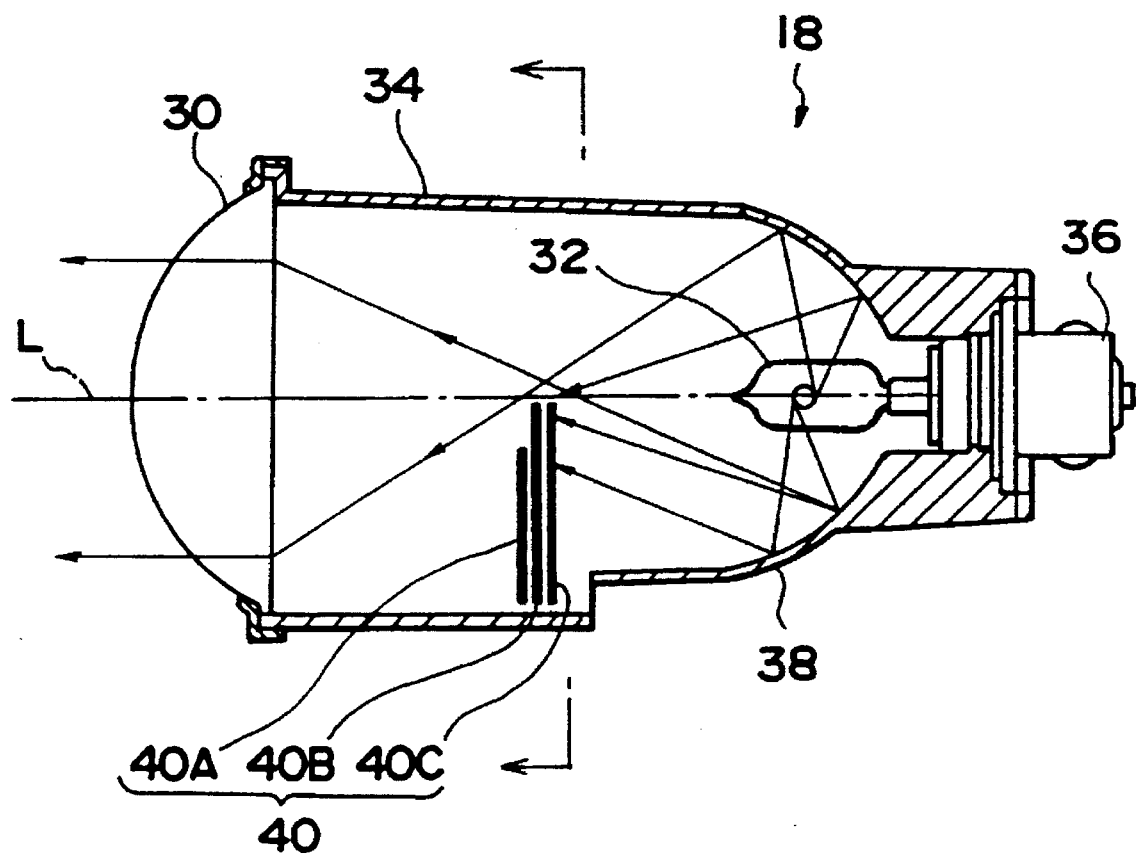
FIG. 4 is a schematic diagram of a headlamp to which an apparatus for controlling the light distribution of a headlamp in accordance with the present invention is applicable.

As shown in FIG. 4, the headlamp 18 is a projector-type headlamp and has a convex lens 30, a bulb 32, and a lamphouse 34. The convex lens 30 is fixed at one opening of the lamphouse 34, while the bulb 32 is fixed at the other opening via a socket 36 such that a light-emitting point is located on the optical axis L (center axis of the convex lens 30).

A shade 40 which will be described later is disposed between the convex lens 30 and the bulb 32 in the lamphouse 34. This shade 40 is movable in a plane perpendicular to the optical axis L of the convex lens 30 in response to a control signal outputted from a controller 50 (FIG. 6). The bulb-side portion (right-hand side in FIG. 4) of the lamphouse 34 is formed as a reflector 38 having an ellipsoidal reflecting surface, and the light from the bulb 32 reflected by this reflector 38 is focused onto a vicinity of the shade 40. Accordingly, the convex lens 30 makes the light emergent in the forward direction (in the direction of arrow FR in FIG. 4) of the vehicle 10 by using as a light-emitting point a position in the vicinity of the shade 40 onto which the light from the bulb 32 is focused after being reflected by the reflector 38. It should be noted that since the headlamp 20 has the same construction as the headlamp 18, a description of the headlamp 20 will be omitted.

(Shade 40 of Headlamp 18)

Figure 5:
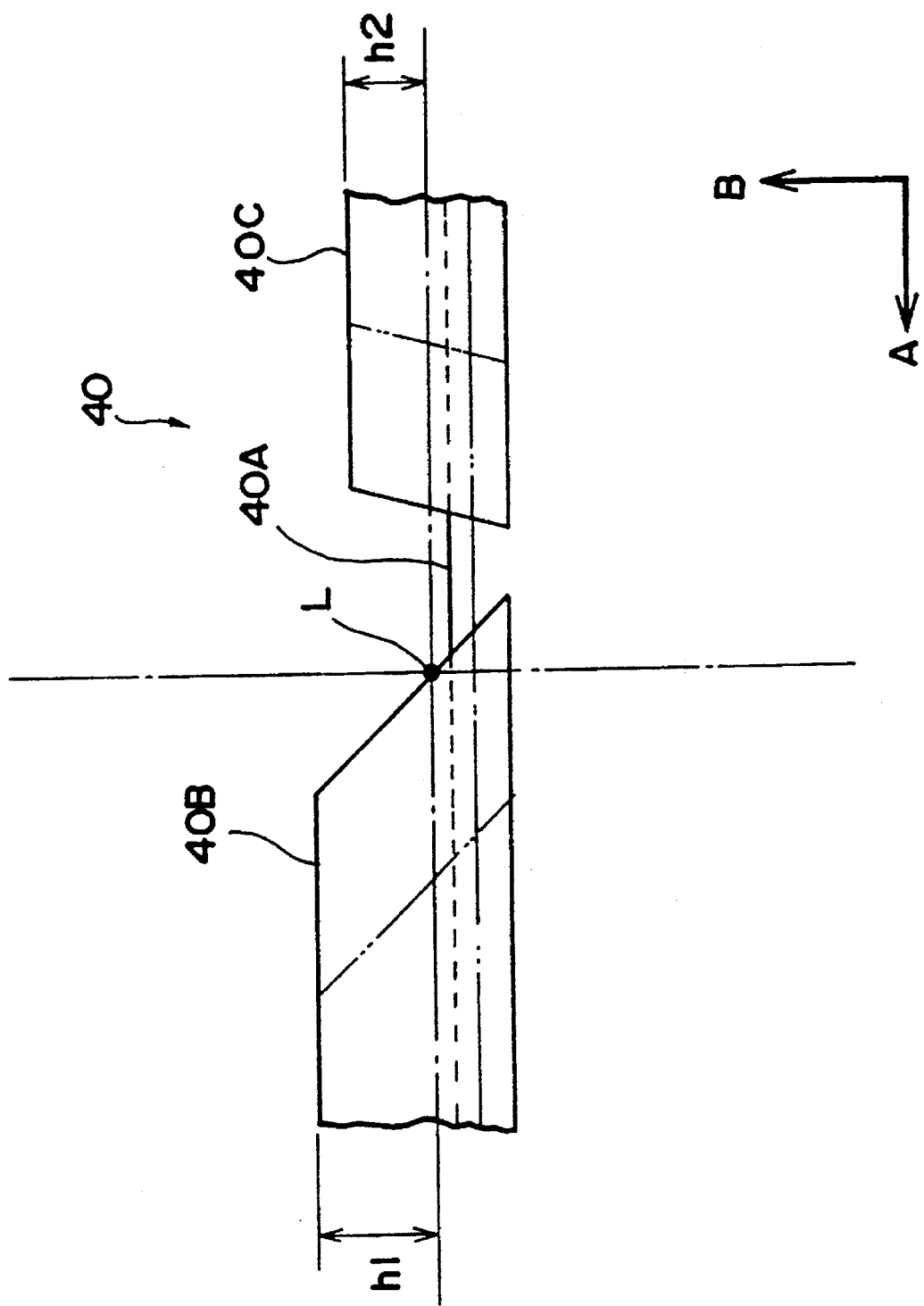
FIG. 5 is a diagram (cross-sectional view of FIG. 4) illustrating a structure of a shade.

As shown in FIG. 5, the shade 40 of the headlamp 18 has light-shielding plates 40A, 40B, and 40C, which move in the plane perpendicular to the optical axis L of the convex lens 30 as an unillustrated motor is rotatively driven in response to the control signal outputted by the controller 50 (FIG. 6). The light-shielding plate 40A is movable in vertical directions (in the direction of arrow B and in the direction opposite thereto in FIG. 5), while the light-shielding plates 40B and 40C are movable in transverse directions (in the direction of arrow A and in the direction opposite thereto in FIG. 5). The height h1 of the light-shielding shielding plate 40B from the plane passing through the optical axis L to an upper end of the light-shielding plate 40B is greater than the height h2 of the light-shielding plate 40C from the plane passing through the optical axis L to an upper end of the light-shielding plate 40C. The reason why the respective heights of the light-shielding plates 40B and 40C of the Shade 40 are different is that the driver's viewing range or driver's view field differs for the left- and right-hand sides ahead of the vehicle 10. For instance, on the left forward side of the vehicle 10, it is necessary for the driver to reliably view pedestrians, traffic signs (namely, sign posts), and the like. However, on the right forward side, the need for the driver to view pedestrians, traffic signs, and the like is relatively low, so that the range of illumination can be reduced to a minimum so as to prevent the driver of a vehicle in the opposite lane from becoming blinded.

Although the headlamp 20 has a shade 41, since this shade 41 has the same construction as the shade 40 of the headlamp 18, a description of the shade 41 will be omitted.

(Structure of Controller 50)

As shown in FIG. 6, the controller 50 comprises a read-only memory (ROM) 52, a random-access memory (RAM) 54, a central processing unit (CPU) 56, an input port 58, and an output port 60, and buses 62 including data buses for connecting the above components and control buses. It should be noted that stored in the ROM 52 are fuzzy rules used for effecting fuzzy inference in the light distribution control, which will be described later, as well as a control program for controlling the shade 40 and the like.

The vehicle speed sensor 66, the steering angle sensor 68, and the turn signal switch 70 are connected to the input port 58. The image processor 48 is also connected to the input port 58. The vehicle sensor 66 outputs a signal corresponding to the vehicle speed V of the vehicle 10, while the steering angle sensor 68 outputs a pulse signal corresponding to the rotational angle and rotating direction of the steering wheel 26. The output port 60 is connected so as to operate the shades 40 and 41 via a driver 64. The output port 60 is also connected to the image processor 48 via the driver 35.

The image processor 48 is a device for generating a plan view by effecting image processing with respect to an image shot by the night vision camera 22 on the basis of the signals inputted to the image processor 48 from the night vision camera 22 and the controller 50, and for determining a deviation angle φ between the present running direction of the vehicle 10 and the direction of view of the driver in accordance with the road route. This image processor 48 starts image processing upon receipt of an image-processing command signal inputted thereto from the controller 50 and, upon completion of image processing, outputs the determined deviation angle φ to the controller 50.

It should be noted that the aforementioned road route includes the route of one lane formed by, for instance, a center line, a curb, or the like.

(Night Vision Camera 22)

Next, a brief description will be given of a schematic structure of the night vision camera 22 for detecting an image of an area which is not illuminated by the headlamps 18 and 20 during night driving.

Figure 7:
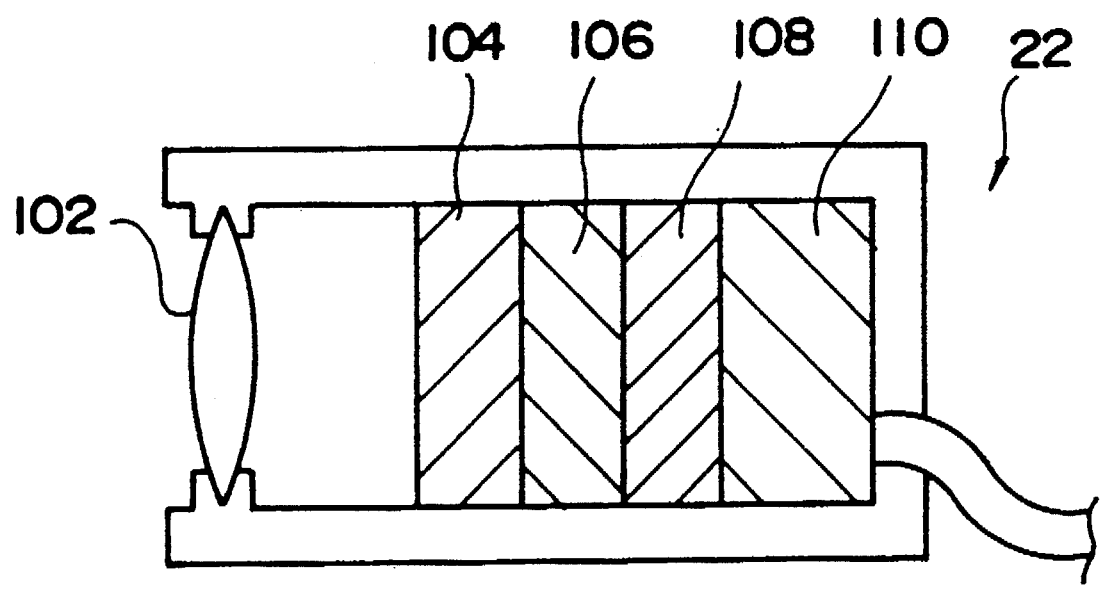
FIG. 7 is a schematic cross-sectional view illustrating a structure of a night vision camera.

As shown in FIG. 7, the night vision camera 22 includes a lens 102, a photocathode 104, a microchannel plate 106, a screen 108, and a two-dimensional CCD sensor 110. The photons made incident upon this lens 102 are guided to the photocathode 104 and are converted into electrons. These electrons are amplified by the microchannel plate 106, and are guided to the screen 108 to form an image. The image on this screen 108 is converted into image signals by means of the two-dimensional CCD sensor 110 and the image signals are outputted. Accordingly, by using this night vision camera 22, it is possible to output image signals of a dark area which is not illuminated by the headlamps 18 and 20.

Although, in this embodiment, a description has been given of an example in which the night vision camera 22 is used to detect an image of a dark area during night driving as described above, an arrangement may be provided such that a night vision camera converts X-rays or a particle beam into a visible image on a two-dimensional image sensor such as a two-dimensional CCD camera, and uses an image intensifier tube to boost the intensity of the dark visible image to convert the image into a bright visible image, so as to detect an image of the dark area.

(Light Distribution Pattern Z)

In the present embodiment, the illumination of the road (road surface) and the like by means of the headlamp 18 of the vehicle 10, i.e., the distribution of light, is controlled by moving the light-shielding plates 40A, 40B, and 40C of the shade 40. In the present embodiment, the states of light distribution, which are formed by the positions to which the light-shielding plates 40A, 40B, and 40C of the shade 40 are moved, are classified in advance into a plurality of large groups. These states of light distribution are set as beam patterns Z. These beam patterns Z can be made to correspond to desired states of light distribution by storing the respective positions of the light-shielding plates 40A, 40B, and 40C of the shade 40.

Figure 8:
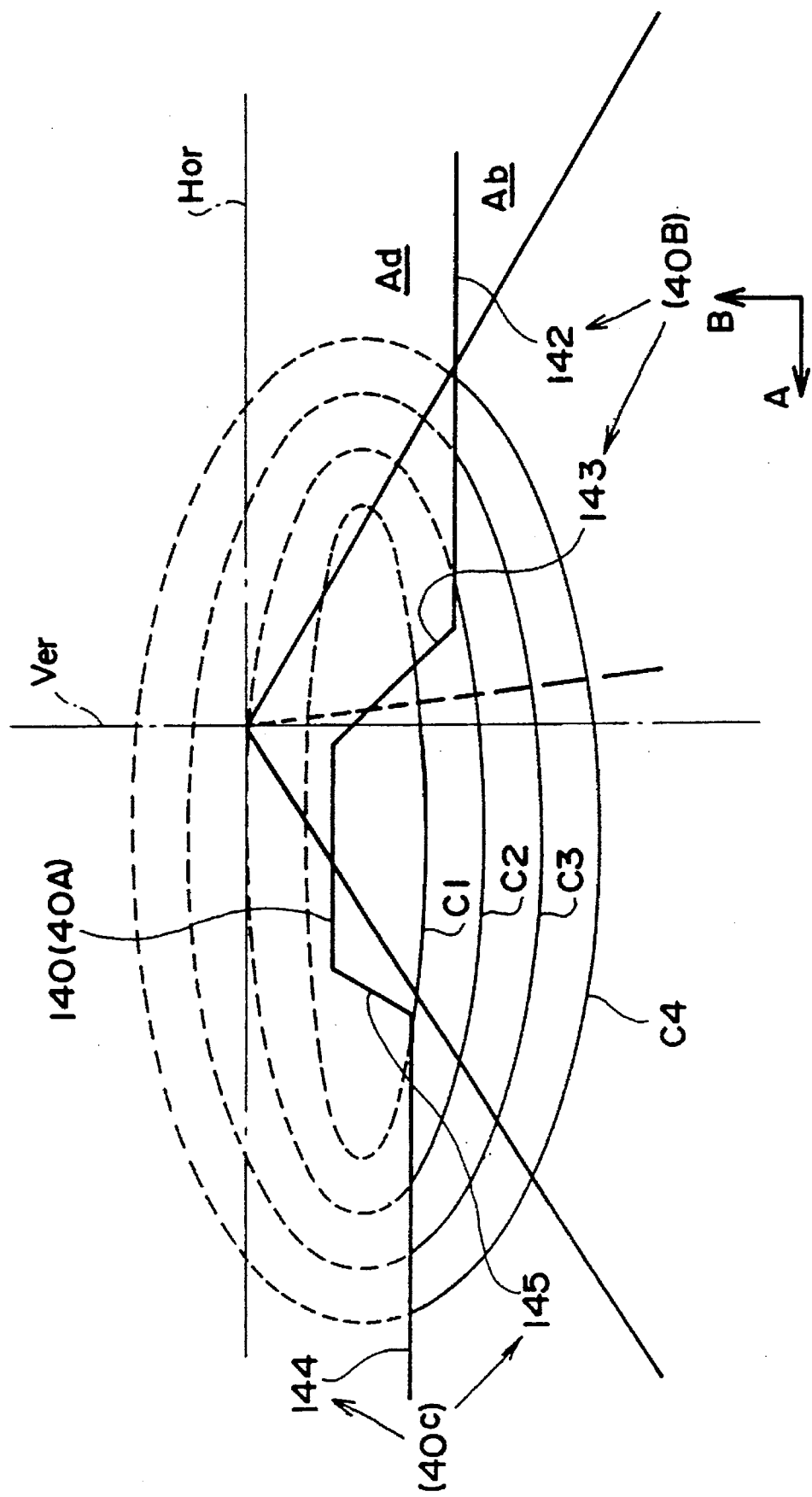
FIG. 8 is an image diagram illustrating a beam pattern when a headlamp is lit.
Figure 14:
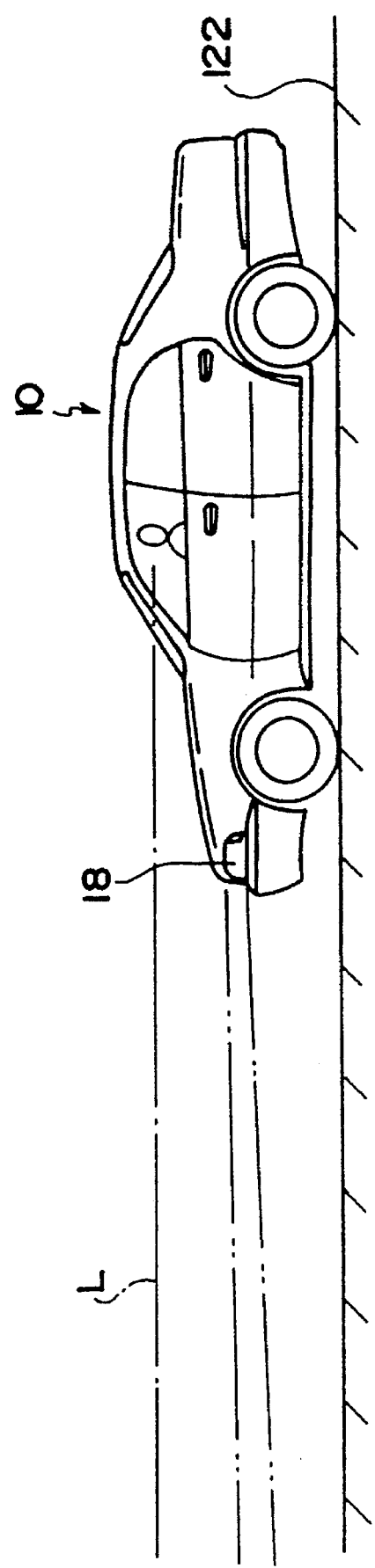
FIG. 14 is a side elevational view of the vehicle when the headlamps are lit.

FIG. 8 shows a beam pattern when the road is illuminated by the headlamps 18 and 20 during night driving (FIG. 14). Namely, FIG. 8 is a diagram of an image of the area ahead of the vehicle viewed by the driver and located in the vicinity of the area illuminated by the headlamps.

Circles C1, C2, C3, and C4 shown in FIG. 8 show ranges of substantially the same brightness of light emitted from the headlamp 18. For instance, the road surface illuminance of the circle C1 is about 30 lx, while the road surface illuminance of the circle C4 is about 5 lX. It should be noted that because the headlamp 20 is the same as the headlamp 18, a description of the headlamp 20 will be omitted.

The illumination by the headlamp 18 is restricted by the above-described shade 40 (FIG. 5). Namely, the boundary between illumination and nonillumination by the headlamp 18 is formed by a cut line 140 at an end of the light-shielding plate 40A, cut lines 142 and 143 at ends of the light-shielding plate 40B, and cut lines 144 and 145 at ends of the light-shielding plate 40C. An area Ad above a line connecting these cut lines (i.e., an area in the direction of arrow B in FIG. 8) is shielded from light.

The movement of the cut line 140 in the vertical directions (in the direction of arrow B and in the direction opposite thereto in FIG. 8) is made to correspond to the distance, from the vehicle 10, reached by the far-reaching light of a light area Ab illuminated by the headlamp 18 in the forward direction. It should be noted that the cut line 144 formed by the light-shielding plate 40C is set to a height sufficient for viewing sidewalks and traffic signs, while the angle of inclination of the cut line 145 is set at an angle of substantially 60 degrees with respect to the horizontal line, thereby making it possible to guarantee an effective illumination area. Further, the cut line 142 formed by the light-shielding plate 40B is set to a height sufficient for preventing the driver of a vehicle in the opposite lane from becoming blinded, while the angle of inclination of the cut line 143 is set at an angle of substantially 45 degrees with respect to the horizontal line. Thus, the amount of light illuminated toward vehicles in the opposite lane is reduced.

Accordingly, by moving the positions of the light-shielding plates 40A, 40B, and 40C of the shade 40, it is possible to set the illumination area of the road surface freely.

Next, a description will be given of the plurality of beam patterns Z when the above-described light-shielding plates 40A, 40B, and 40C are moved in accordance with the route (straight or meandering) and the vehicle speed.

The beam pattern Z shown in FIG. 8 illustrates a beam pattern Z in an initial state which serves as a reference for changing the light distribution by moving the light-shielding plates 40A, 40B, and 40C as will be described later, and illustrates a beam pattern Z at optimum positions of the light-shielding plates 40A, 40B, and 40C when the vehicle is running on a straight road at a predetermined vehicle speed V (e.g., 50 km/h). The light-reaching state at this time is a state M in which the cut line 140 is at a position set in advance in accordance with the predetermined vehicle speed V. The transversely spread state of the light distribution is an initial state ZR in which the light-shielding plates 40B and 40C are located furthest inwardly (in directions in which the light-shielding plates 40B and 40C approach each other).

Figure 9A:
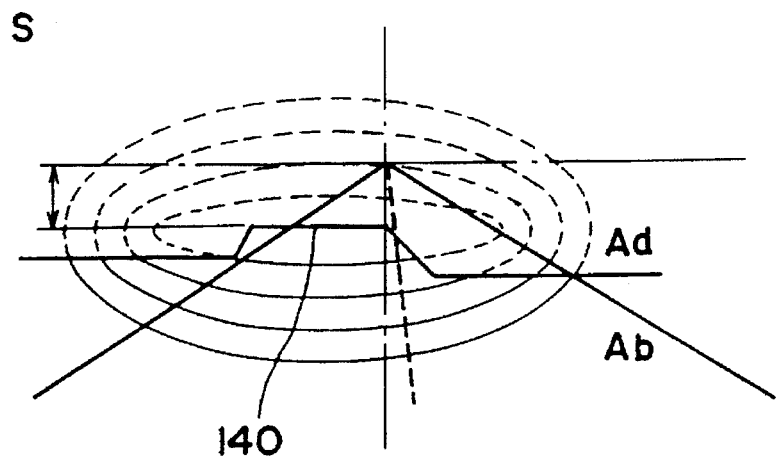
FIGS. 9A to 9C are image diagrams illustrating beam patterns corresponding to the distance reached by the light.
Figure 9B:
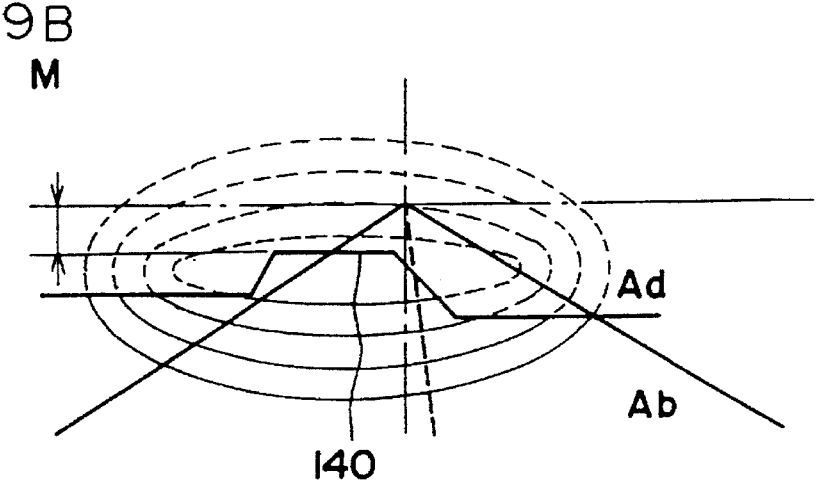
Figure 9C:
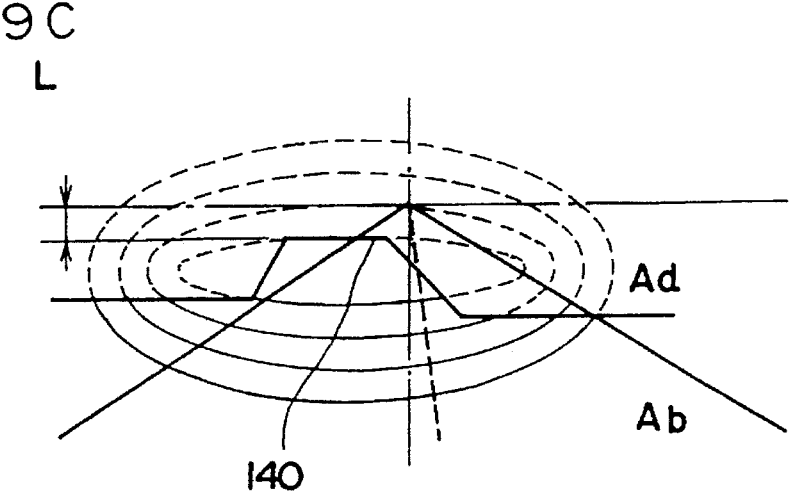

FIGS. 9A to 9C show beam patterns Z at times when the distance reached by the light is varied in stages (in the present embodiment, three stages S, M, and L) by moving the light-shielding plate 40A.

FIG. 9A shows a beam pattern Z in the state S in which the light-reaching state is close to the vehicle 10; FIG. 9B shows a beam pattern Z in the state M in which the light-reaching state exceeds the state S; and FIG. 9C shows a beam pattern Z in the state L in which the light-reaching state exceeds the state M and in which the light-shielding plate 40A is most distant from the optical axis L (FIG. 5).

FIGS. 10A and 10B and FIGS. 11A and 11B show beam patterns Z at times when the transverse spread of the light distribution is varied in stages (in this embodiment, five stages RL, RM, ZR, LM, and LL) by moving the light-shielding plates 40B and 40C.

Figure 10A:
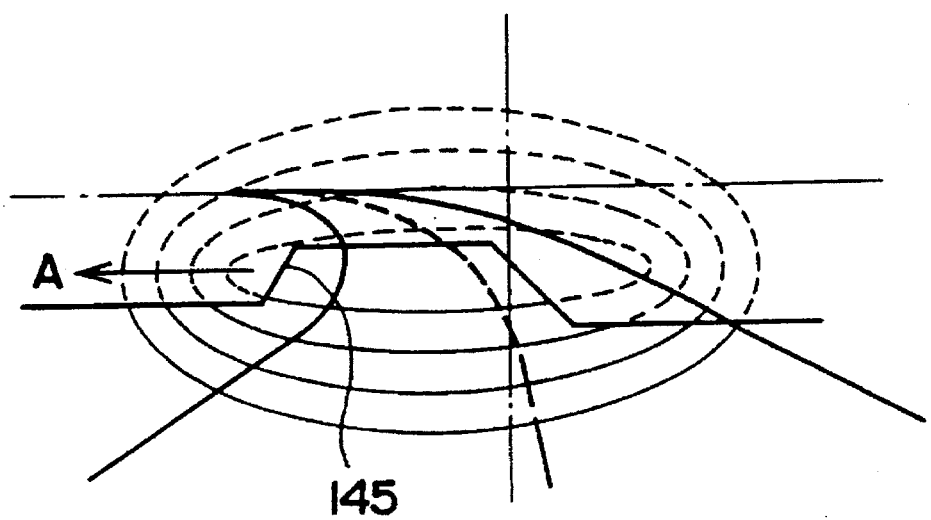
FIGS. 10A and 10B are image diagrams illustrating beam patterns corresponding to a left turn.
Figure 10B:
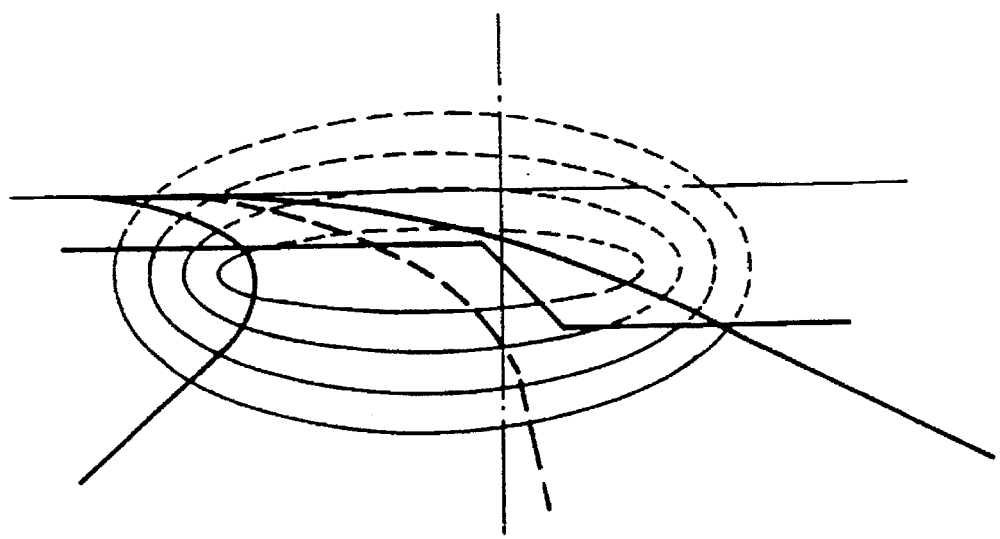

FIGS. 10A and 10B show beam patterns Z in which the light distribution in the left forward area ahead of the vehicle is varied by moving the light-shielding plate 40C. Specifically, the drawings illustrate beam patterns Z in the state LM and the state LL, respectively, in which the cut line 145 is moved (in the direction of arrow A in FIG. 10A) by successively moving the light-shielding plate 40C in the initial state (FIG. 8) in a direction away from the light-shielding plate 40B.

Figure 11A:
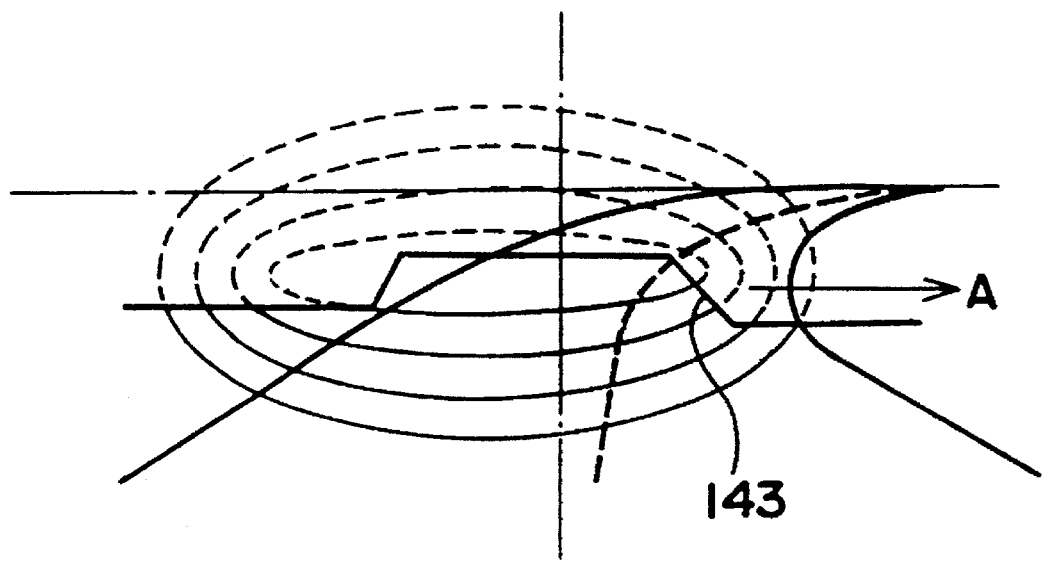
FIGS. 11A and 11B are image diagrams illustrating beam patterns corresponding to a right turn.
Figure 11B:
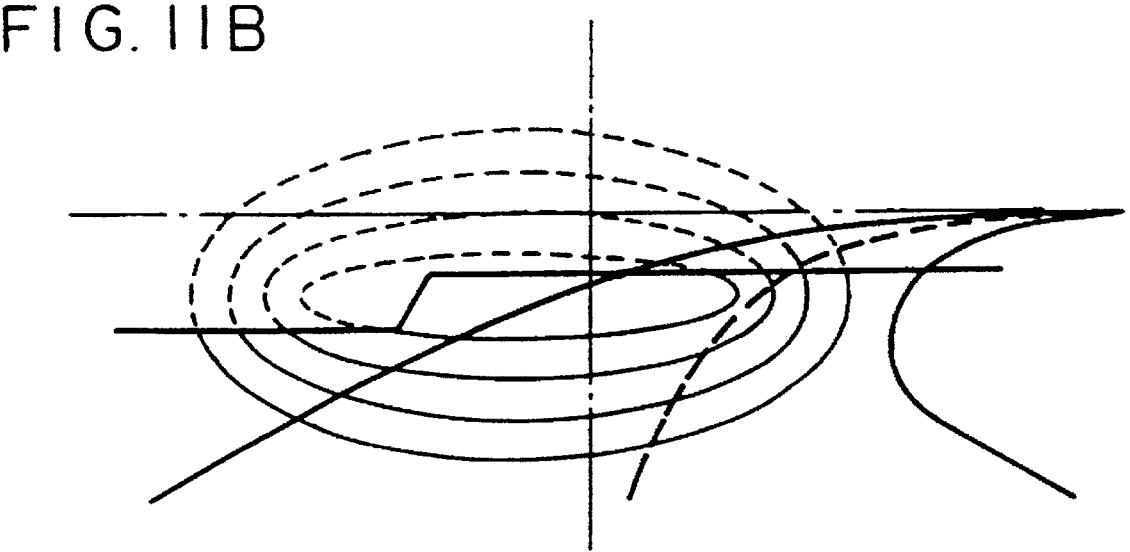

In addition, the changes in the light distribution in the right forward area ahead of the vehicle, which are caused by moving the light-shielding plate 40B, are shown in FIGS. 11A and 11B. Specifically, the drawings illustrate beam patterns Z in the state RM and the state RL, respectively, in which the cut line 143 is moved (in the direction of arrow A in FIG. 11A) by successively moving the light-shielding plate 40B in the initial state (FIG. 8) in a direction away from the light-shielding plate 40C.

Accordingly, if an optimum beam pattern Z is selected by using these beam patterns Z in stages, control can be provided in stages without the need to effect continuous control of the light-shielding plates, so that the structure and light distribution control can be simplified.

It should be noted that since the light-shielding plates 40A, 40B, and 40C of the shade 40 do not allow the light to be focused on one spot on the road, blurring occurs at positions corresponding to the actual cut lines, so that it is possible to obtain a predetermined road-surface illuminance even in areas surrounding these positions.

(Image Processor 48)

Next, a brief description will be given of a method for determining, at the image processor 48, the aforementioned deviation angle φ on the basis of an image signal outputted by the above-described night vision camera 22.

First, the inventors of the present invention conducted an experiment for detecting a position at which the driver looks while driving the vehicle 10. In this experiment, the distance from the vehicle 10 to the position viewed by the driver was determined from the direction of view (an angle formed with respect to the running direction of the vehicle 10) and the vehicle speed V in cases in which the vehicle 10 was driven at a plurality of running speeds (vehicle speeds V) on a test course 122 having a plurality of road (course) routes. From this experiment, the present inventors obtained the result that the driver looks at a position reached by the vehicle 10 approximately 1.5 seconds later irrespective of the route and the vehicle speed V. Accordingly, it is possible to determine the position viewed by the driver if the route and the vehicle speed V of the test course 122 can be specified.

Figure 12:
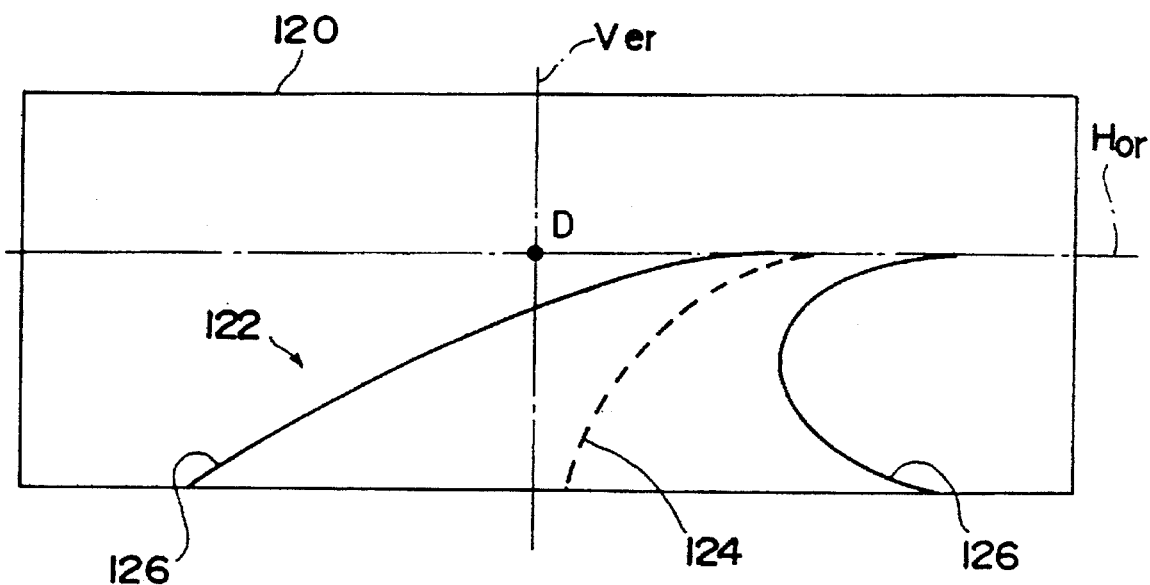
FIG. 12 is an image diagram of an image signal outputted by the night vision camera.

FIG. 12 shows an image 120 when the test course 122 on which the vehicle 10 was run was shot by the night vision camera 22. This test course 122 has two lanes on which the vehicle 10 runs in the same direction, respectively. The boundary between the lanes is demarcated by a line 124, and curbs 126 serve as boundaries between the lanes and other areas.

In this image 120, a point D is provided at a position corresponding to the height and direction of the line of view L (see FIG. 14) which is parallel with the test course 122 and coincides with the running direction of the vehicle 10. This point D serves as a reference for the image 120, which is shot by the night vision camera 22 and changes with the orientation of the vehicle 10. In addition, a horizontal line which is on the image 120 and passes through the point D is set as a line Hor. The line Hor coincides with the horizon during the stable running of the vehicle 10. A straight line which is perpendicular to this line Hot and passes through the point D is set as a line Ver. The lines Hor and Ver can be used for correction when the image 120 which is generated due to the rocking or the like of the vehicle 10 is subjected to image processing.

The image 120 shot by the night vision camera 22 is inputted to the image processor 48. The image processor 48 performs image processing on the basis of a plurality of items of image data representing the positions of pixels of the line 124 and the curbs 126 in the image 120, and forms an image 130 in which the test course 122 is viewed from above (see FIG. 13). By virtue of this image 130, it is possible to specify the route.

Figure 13:
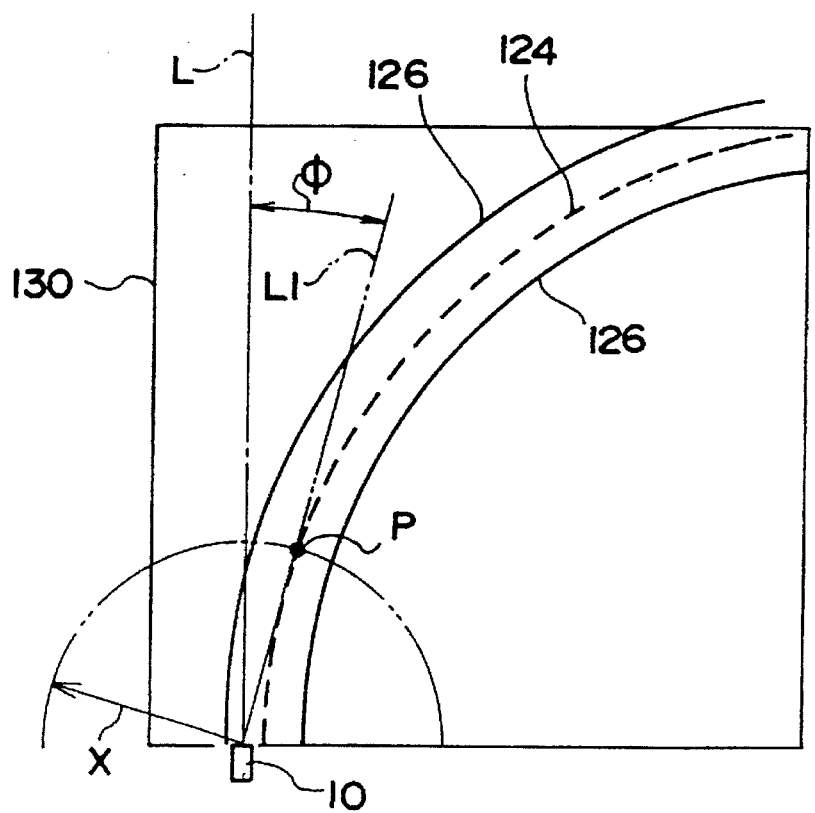
FIG. 13 is an image diagram after the image shown in FIG. 12 is processed by an image processor.

As shown in FIG. 13, the position viewed by the driver at the present speed V of the vehicle 10 is at a distance X (on a circumference of a circle with a radius X) from the vehicle 10 reached about 1.5 seconds later at the present vehicle speed V, as shown by Formula (1) below. The test course 122 has the route determined by the image processor 48, and the driver normally views a direction corresponding to this route. In this embodiment, the route of the line 124 which is provided along the route of the test course 122 is specified as the route for the sake of simplicity. Accordingly, a point of intersection P between this line 124 and the radius X can be specified as the position viewed by the driver. It should be noted that although the route is specified on the aforementioned line 124, the position (path of running) in which the vehicle travels within the lane may be imagined, and the route may be specified at that position.

$$X = 1.5 \cdot (10/36) \cdot V \tag{1}$$

where

V: vehicle speed (unit: km/h)
X: viewed distance (unit: m)

The straight line passing through this point of intersection P is the direction which substantially corresponds to the direction (the driver's line of view L1) in which the driver looks in accordance with the route. Accordingly, the angle formed between the driver's line of view L (see FIG. 14), which coincides with the running direction of the vehicle 10, and the line of view L1, which corresponds to the route, is the deviation angle φ which indicates the angle by which the driver's direction of view changes in accordance with the running condition (vehicle speed V) of the vehicle 10 and the route.

(Fuzzy Inference Rules for Light Distribution Control)

In this embodiment, fuzzy inference is used for calculating a controlled variable for controlling the light distribution of the headlamps 18 and 20. With regard to the light distribution control of the headlamps, the present inventors took note of the fact that the light distribution for changing the spread of light and the light distribution for changing the distance reached by the light vary in accordance with the vehicle speed and the route. Accordingly, fuzzy inference is made on the basis of respectively independent fuzzy inference rules. Tables 1 and 2 below show fuzzy inference rules of the light distribution control for changing the spread of light and of the light distribution control for changing the distance reached by the light, respectively. It should be noted that, in the following fuzzy inference rules, when the vehicle speed is low, the distance reached by the light is made short and the spread of the light is made large so as to give leeway to the field of view for low-speed driving. When the vehicle speed is high, the spread of the light is made small and the distance reached by the light is made long so as to give priority to the field of view for high-speed driving (far field of view).

TABLE 1

Light distribution control for changing the transverse spread of light

| φ | V |||| 
| | ZR | PM | PL | PVL |
| --- | --- | --- | --- | --- |
| RL | (1) RL | (2) RL | (3) RM | (4) RM |
| RM | (5) RL | (6) RM | (7) RM | (8) RM |
| ZR | (9) ZR | (10) ZR | (11) ZR | (12) ZR |
| LM | (13) LL | (14) LM | (15) LM | (16) LM |
| LL | (17) LL | (18) LL | (19) LL | (20) LM |

TABLE 2

Light distribution control for changing the distance reached by light

| φ | V |||| 
| | ZR | PM | PL | PVL |
| --- | --- | --- | --- | --- |
| RL | (21) PS | (22) PM | (23) PL | (24) PL |
| RM | (25) PS | (26) PS | (27) PM | (28) PL |
| ZR | (29) PS | (30) PS | (31) PM | (32) PL |
| LM | (33) PS | (34) PS | (35) PM | (36) PL |
| LL | (37) PS | (38) PM | (39) PL | (40) PL | where, φ: deviation angle
V: vehicle speed
(1) to (40): numbers of fuzzy inference rules If the above fuzzy inference rules are expressed in the form of "if . . . , then . . . ," the rules (5) and (6) in Table 1 and the rules (26) and (27) in Table 2, for example, are expressed as shown below. Although the other fuzzy rules among the rules (1) to (20) and (21) to (40) can be expressed in a similar manner, description thereof will be omitted.

(5) If the deviation angle φ represents a rightward turn and the medium degree RM, and the vehicle speed V is substantially zero, then the rightward light distribution is made large with respect to the spread of the light.

(6) If the deviation angle φ represents a rightward turn and the medium degree RM, and the vehicle speed V is low speed, then the rightward light distribution is set to an intermediate degree with respect to the spread of the light.

(26) If the deviation angle φ represents a rightward turn and the medium degree RM, and the vehicle speed V is low speed PM, then the light is distributed such that the distance reached by the light is near.

(27) If the deviation angle φ represents a rightward turn and the medium degree RM, and the vehicle speed V is medium speed PL, then the light is distributed such that the distance reached by the light is an intermediate distance.

The language value of the deviation angle φ being substantially zero is expressed by ZR, and the language values of the angle representing a rightward turn of a medium degree and a rightward turn of a large degree are respectively expressed by RM and RL. Language values of similar leftward turns are respectively expressed by LM and LL. In addition, language values of the vehicle speed V being substantially zero, low, medium, and high are respectively expressed by ZR, PM, PL, and PVL.

The language value of not performing light distribution with respect to the spread of the light is expressed by ZR, and the language value of making the rightward light distribution medium and large are respectively expressed by RM and RL. The language values of making the leftward light distribution medium and large are respectively expressed by LM and LL. In addition, in the light distribution control in the light reaching state, the language values of the light distribution for near distance, medium distance, and far distance reached by the light are respectively expressed by PS, PM, and PL.

Figure 15A:
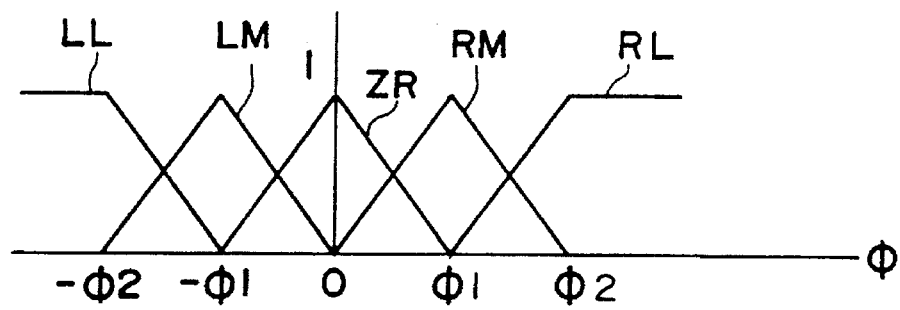
FIGS. 15A to 15D are diagrams illustrating membership functions.

The language values of ZR, RM, RL, LM, and LL of the aforementioned deviation angle φ are quantified by a membership function Fφ shown in FIG. 15A. Hereafter, Fφ(), FV(), GP(), . . . , represent the membership functions of φ, V, . . . , with respect to the language values in the parentheses, respectively. Fφ(ZR) represents a characteristic in which, in terms of the deviation angle φ, the degree of fulfillment of rule gradually decreases from 0 to φ1, and also gradually decreases from 0 to −φ1. Fφ(RM) represents a characteristic in which, in terms of the deviation angle φ, the degree of fulfillment gradually increases from 0, becomes 1 at φ1, and gradually decreases from φ1 to φ2. Fφ(RL) represents a characteristic in which, in terms of the deviation angle φ, the degree of fulfillment gradually increases from φ1, and becomes 1 at φ2 or more. Further, Fφ(ZR) corresponding to the language value for a leftward turn has the same characteristic as that of the above-described rightward turn, and Fφ(LM) and Fφ(LL) have characteristics with inverse codes of Fφ(RM) and Fφ(RL) for the above-described rightward turn.

Figure 15B:
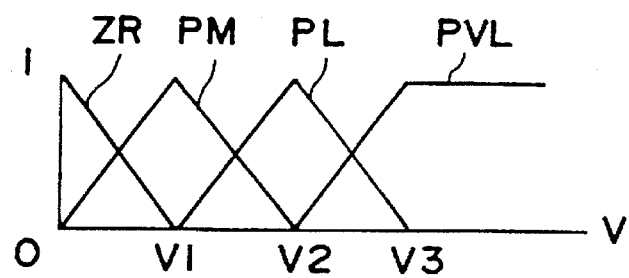

The language values of the vehicle speed V, i.e., ZR, PM, PL, and PVL, are quantified by the membership function FV shown in FIG. 15B. FV(ZR) represents a characteristic in which the degree of fulfillment gradually decreases from 0 to V1 in terms of the vehicle speed V. FV(PM) represents a characteristic in which, in terms of the vehicle speed V, the degree of fulfillment gradually increases from 0, becomes 1 at V1, and gradually decreases from V1 to V2. FV(PL) represents a characteristic in which, in terms of the vehicle speed V, the degree of fulfillment gradually increases from V1, becomes 1 at V2, and decreases gradually from V2 to V3. FV(PVL) represents a characteristic in which, in terms of the vehicle speed V, the degree of fulfillment gradually increases from V2 and becomes 1 at V3 or more.

Figure 15C:
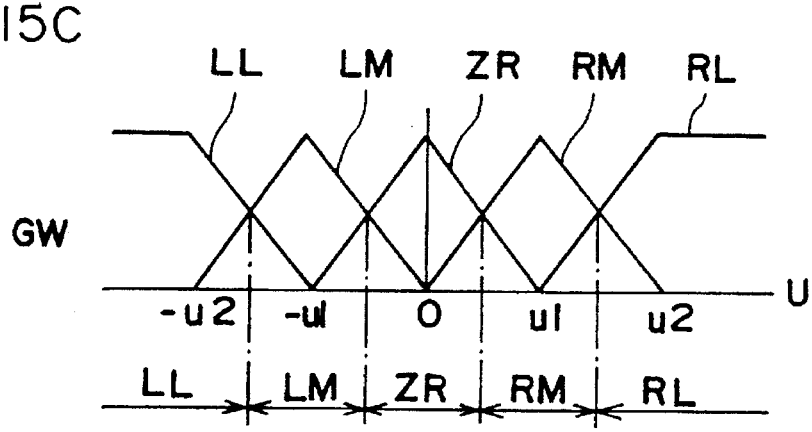

The language values concerning the light distribution through the spread of light from the headlamps in the consequents, i.e., LL, LM, ZR, RM, and RL, are quantified by a membership function GW shown in FIG. 15C. GW(ZR) represents a characteristic in which the degree of fulfillment is 1 when an amount of control U of the spread-light distribution is 0, the degree of fulfillment gradually decreases from 0 to u1 in the amount of control U of the spread-light distribution, and the degree of fulfillment gradually decreases from 0 to −u1. GW(RL) represents a characteristic in which the degree of fulfillment gradually increases from 0 in the amount of control U of the spread-light distribution, the degree of fulfillment becomes 1 at u1, and the degree of fulfillment gradually decreases up to u2 as the amount of control U increases. GW(RL) represents a characteristic in which the degree of fulfillment gradually increases from u1 in the amount of control U of the spread-light distribution, and the degree of fulfillment becomes 1 at u2 or more. Meanwhile, GW(LM) and GW(LL) for quantifying the language values LL and LM in the leftward spread-light distribution have characteristics with inverse codes of GW(RM) and GW(RL) for the above-described rightward turn.

It should be noted that, in the present embodiment, continuous values are not used for the amount of control of the light distribution in accordance with the spread of the light of headlamps, i.e., the amount of control U of the light distribution obtained by fuzzy inference which will be described later. Instead, correspondence is so provided that states (states in fives stages, RL, RM, ZR, LM, and LL) corresponding to the above-described beam patterns Z can be obtained. Namely, as shown in FIG. 15C, the LL state is selected when the obtained amount of control U of the light distribution is at or below a point of intersection between GW(LM) and GW(LL), and the RL state is selected when the amount of control U of the light distribution exceeds a point of intersection between GW(RL) and GW(RM). In addition, the LM state is selected when the amount of control U of the light distribution exceeds the point of intersection between GW(LM) and GW(LL) and is at or below a point of intersection between GW(ZR) and GW(LM); the ZR state is selected when the amount of control U of the light distribution exceeds the point of intersection between GW(ZR) and GW(LM) and is at or below a point of intersection between GW(ZR) and GW(RM); and the RM state is selected when the amount of control U of the light distribution exceeds the point of intersection between GW(ZR) and GW(RM) and is at or below a point of intersection between GW(RM) and GW(RL).

Figure 15D:
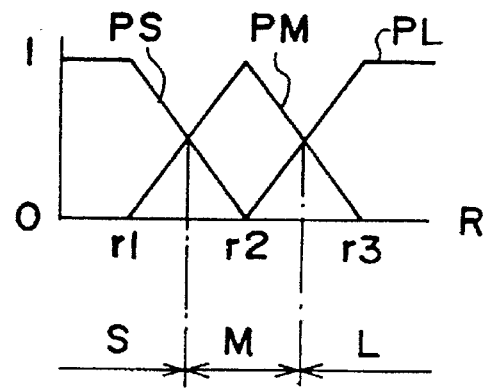

The language values PS, PM and PL concerning the light distribution due to the state of the light reached from the headlamps in the consequents are quantified by a membership function GS shown in FIG. 15D. GS(PS) represents a characteristic in which the degree of fulfillment is 1 when an amount of control R of the reached-light distribution is from 0 to r1, and the degree of fulfillment gradually decreases from r1 to r2. GS(PM) represents a characteristic in which the degree of fulfillment gradually increases from r1 in the amount of control R of the reached-light distribution, and the degree of fulfillment becomes 1 at r2 and gradually decreases from r2 to r3. GS(PL) represents a characteristic in which the degree of fulfillment gradually increases from r2 in the amount of control R of the reached-light distribution, and the degree of fulfillment becomes 1 at r3 or more.

In a similar manner to the above-described amount of control of the light distribution by the spread of the light of headlamps, in the amount of control of the light distribution due to the state of the light reached from the headlamps, continuous values are not used for the amount of control R of the light distribution. Instead, correspondence is provided such that states (states in three stages, S, M, L) corresponding to the above-described beam patterns Z can be obtained. Namely, as shown in FIG. 15D, the S state is selected when the obtained amount of control R of the light distribution is at or below a point of intersection between GS(PS) and GS(PM); the M state is selected when the amount of control U of the light distribution exceeds the point of intersection between GS(PS) and GS(PM), and the amount of control R of the light distribution is at or below a point of intersection between GS(PM) and GS(PL); and the L state is selected when the amount of control U of the light distribution exceeds a point of intersection between GS(PM) and GS(LL).

(Fuzzy Inference for Spread-Light Distribution Control)

Next, a description will be given of a case where fuzzy inference is effected for the amount of control of the spread-light distribution of the headlamp 18 on the basis of the above-described fuzzy rules and membership functions. Hereafter, to simplify the description, a description will be given of fuzzy inference based on two rules, rules (5) and (6) in Table 1 above.

When the deviation angle φ is φa, and the vehicle speed V is Va (see FIG. 16A), the degrees of fulfillment corresponding to the deviation angle φ and the vehicle speed V, i.e., the degrees of fulfillment for the antecedents of the fuzzy rules, are calculated on the basis of the fuzzy inference rules and the membership functions described above. In rule (5), as shown in FIG. 16B, the degree of fulfillment with respect to the deviation angle φ is calculated by means of the membership function Fφ(RM), and the degree of fulfillment with respect to the vehicle speed V is calculated by means of the membership function FV(ZR). With respect to rule (6) as well, the degree of fulfillment is calculated by means of Fφ(RM) and FV(PM), as shown in FIG. 16C. Next, an AND of the degrees of fulfillment (a minimum value w of the degrees of fulfillment), i.e., the goodness of fit with respect to the deviation angle φ and the vehicle speed V, is calculated with respect to each of the above-described rules. In rule (5), the minimum value of the degree of fulfillment thus determined becomes a goodness of fit $w_1$, as shown in FIG. 16B. With respect to rule (6) as well, each minimum value similarly becomes a goodness of fit $w_2$, as shown in FIG. 16C.

Next, the result of inference is calculated for each of the above-described rules. Namely, with respect to rule (5), a set W1 (see FIG. 16B), which is the hatched portion formed by cutting the membership function GW(RL) of the amount of control of the spread light at the goodness of fit $w_1$, is obtained. With respect to rule (6), a set W2 (see FIG. 16C), which is the hatched portion formed by cutting GW(RM) at the goodness of fit $w_2$, is obtained. The result of fuzzy inference becomes a set W in the hatched portion which combines the sets W1 and W2 (see FIG. 16D). The center of gravity of this set W is determined, and a beam pattern Z, which is indicative of the state of movement of the light-shielding plates and which is closest to the amount of control U of the spread light in the determined value of the center of gravity, is selected (any one of the states RL, RM, ZR, LM, and LL; see FIGS. 10A, 10B, 11A and 11B). Accordingly, the RM state is selected in this case.

(Fuzzy Inference For Reached-Light Distribution Control)

Next, a description will be given of a case where fuzzy inference is effected for the amount of control of the reached-light distribution of the headlamp 18 on the basis of the above-described fuzzy rules and membership functions. Hereafter, to simplify the description, a description will be given of fuzzy inference based on two rules, rules (26) and (27) in Table 1 above.

When the deviation angle $\phi$ is $\phi$b, and the vehicle speed V is Vb (see FIG. 17A), the degrees of fulfillment corresponding to the deviation angle $\phi$ and the vehicle speed V are calculated on the basis of the fuzzy inference rules and the membership functions described above. In rule (26), the degree of fulfillment with respect to the deviation angle $\phi$ is calculated by means of the membership function F$\phi$(RM), and the degree of fulfillment with respect to the vehicle speed V is calculated by means of the membership function FV(ZR) (see FIG. 17B). With respect to rule (27) as well, the degree of fulfillment is calculated in a similar manner (see FIG. 17C). Next, an AND of the degrees of fulfillment (a minimum value w of the degrees of fulfillment), i.e., the goodness of fit with respect to the deviation angle $\phi$ and the vehicle speed V, is calculated. In rule (26), the minimum value of the degree of fulfillment thus determined becomes the goodness of fit $w_1$ (see FIG. 17B). With respect to rule (27) as well, each minimum value becomes the goodness of fit $w_2$ (see FIG. 17C).

Next, the result of inference is calculated for each of the above-described rules. Namely, with respect to rule (26), a set W1 (see FIG. 17B), which is the hatched portion formed by cutting the membership function GS(PS) of the amount of control of the reached light at the goodness of fit $w_1$, is obtained. With respect to rule (27), a set W2 (see FIG. 17C), which is the hatched portion formed by cutting GS(PM) at the goodness of fit $w_2$, is obtained. The result of fuzzy inference becomes a set W in the hatched portion which combines the sets W1 and W2 (see FIG. 17D). The center of gravity of this set W is determined, and a beam pattern Z, which is indicative of the state of movement of the light-shielding plates and which is closest to the amount of control R of the reached light in the determined value of the center of gravity, is selected (any one of the states S, M, and L; see FIGS. 9A to 9C). Accordingly, the M state is selected in this case.

(Operation of the First Embodiment)

Figure 18:
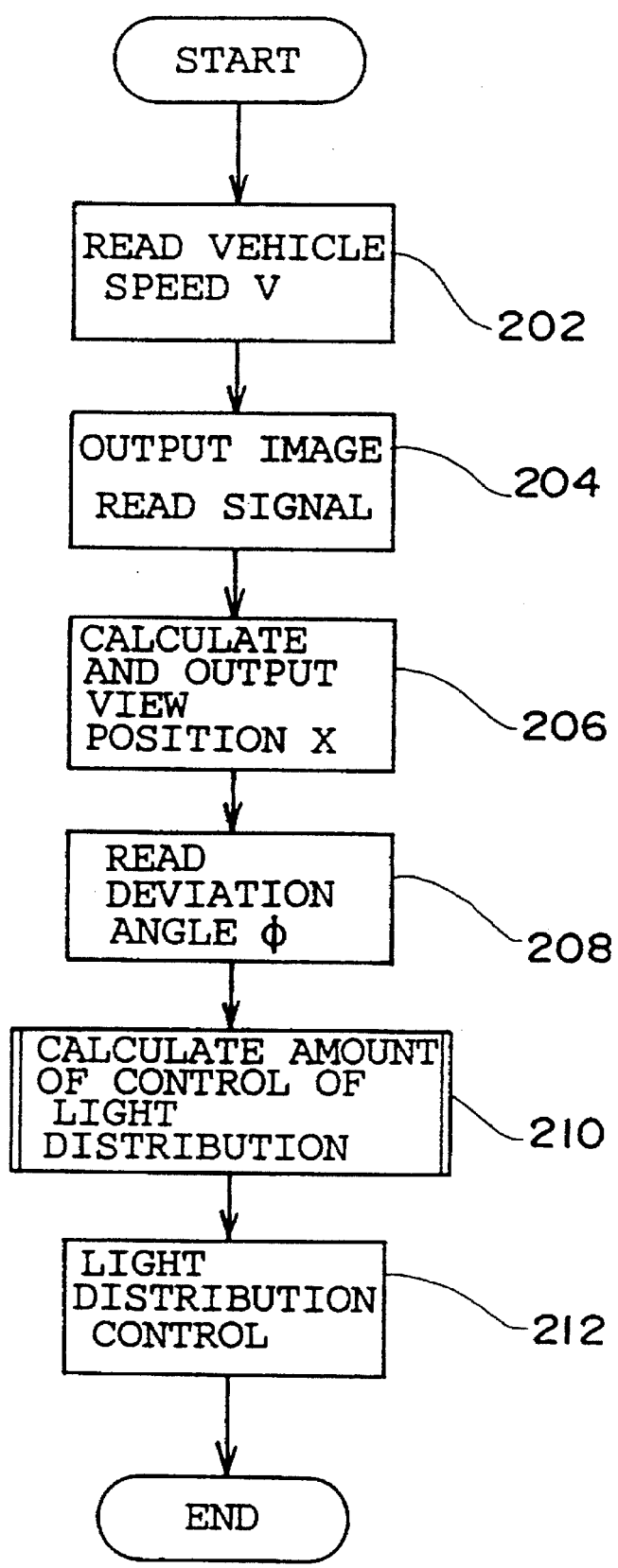
FIG. 18 is a flowchart illustrating a main routine for light distribution control in accordance with the first embodiment.
Figure 19:
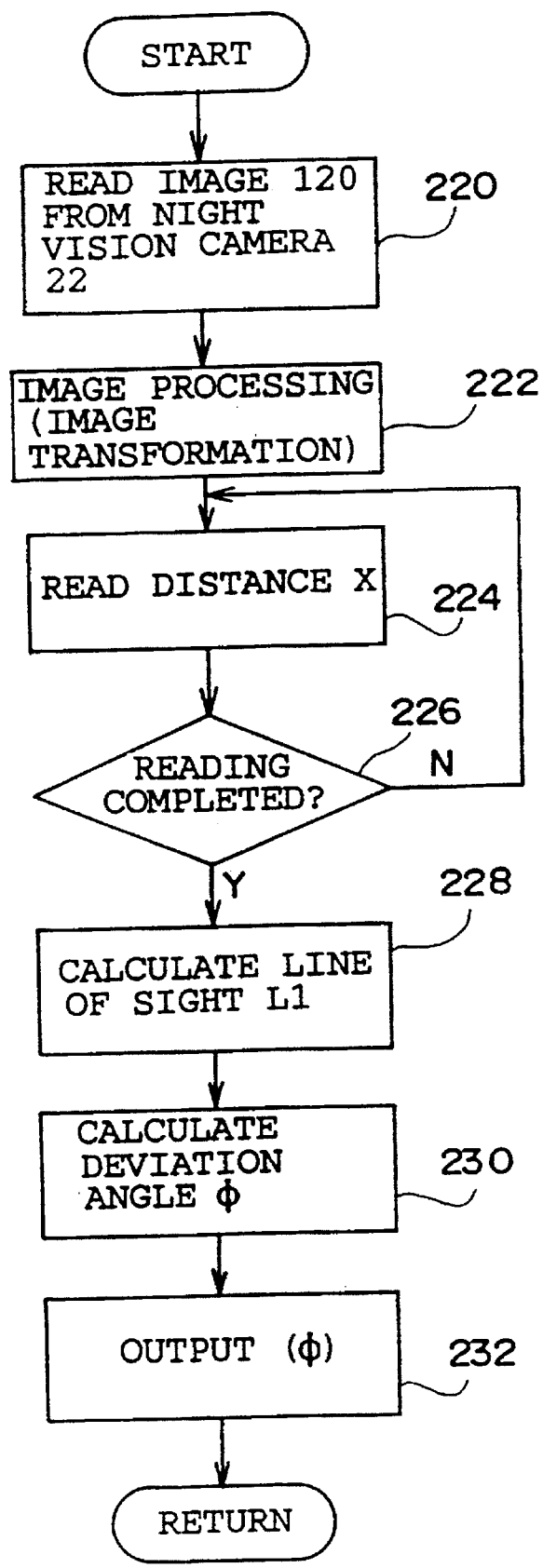
FIG. 19 is a flowchart illustrating an image processing routine in accordance with the first embodiment.
Figure 20:
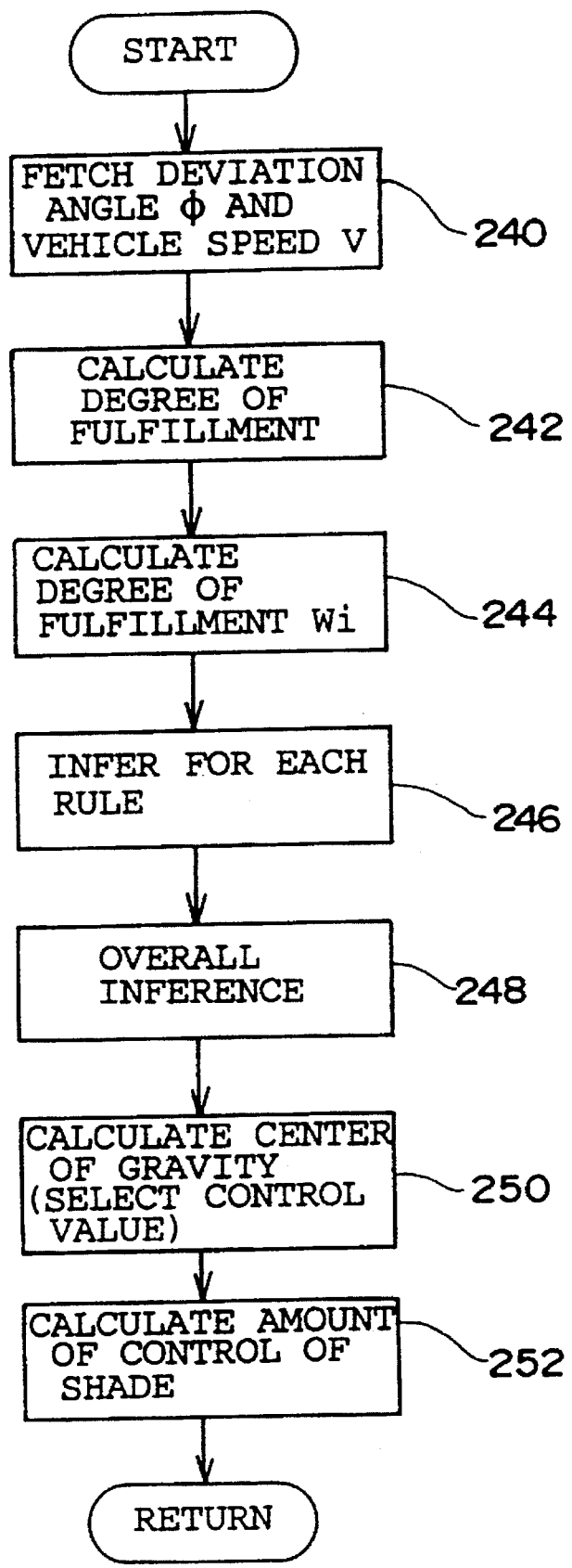
FIG. 20 is a flowchart illustrating fuzzy inference processing for calculating an amount of control of the shade in accordance with the first embodiment.

Referring now to FIGS. 18, 19, and 20, a description will be given of the operation of the first embodiment with reference to control routines for controlling the light distribution of the headlamps 18 and 20.

First, when the driver turns on an unillustrated light switch to turn on the headlamps 18 and 20, the control main routine shown in FIG. 18 is executed repeatedly at intervals of predetermined time. When the control routine is started, the operation proceeds to Step 202 to read the vehicle speed V, and then in Step 204 an image read signal is outputted to the image processor 48 for ascertaining the route. In an ensuing Step 206, the viewed distance X is calculated, and the calculated viewed distance X is outputted to the image processor 48.

In an ensuing Step 208, the deviation angle $\phi$ calculated by the image processor 48 is read, and the operation proceeds to Step 210. Step 210 is a subroutine for calculating the amount of control of the light distribution based on fuzzy inference which will be described later. In Step 210, the amounts of control of the light distribution of the headlamps 18 and 20 are calculated by making use of fuzzy inference as described above (see FIG. 20). Upon completion of this calculation, in Step 212, the light-shielding plates 40A, 40B, and 40C are moved in correspondence with the amount of control of the light distribution thus calculated, so as to control the light distribution of the headlamps 18 and 20, and this routine ends.

Next, referring to FIG. 19, a description will be given of the calculation for image processing by the image processor 48 used in this first embodiment.

When the image read signal is inputted to the image processor 48 from the controller 50, the routine shown in FIG. 19 for calculating the deviation angle $\phi$ is executed. Namely, the operation proceeds to Step 220 to read the image 120 (see FIG. 12) of the forward area ahead of the vehicle 10 shot by the night vision camera 22.

Upon completion of the reading of the image 120, the operation proceeds to Step 222 in which image processing is performed on the basis of a plurality of items of image data representing the pixel positions of the line 124 and the curbs 126 on the image 120, and the image 120 is transformed into the image 130 corresponding to a plan view in which the test course 122 is viewed from above (see FIG. 13).

Upon completion of the transformation of the image, the viewed distance X, which is determined in accordance with Formula (1) above and corresponds to the position which the vehicle will reach in approximately 1.5 seconds at the present vehicle speed V, is read (Steps 224 and 226).

In an ensuing Step 228, the driver's line of view L is determined on this image 130. Namely, by using the viewed distance X which has been read as the radius, the route of the transformed image 130 can be specified. For instance, by determining the point of intersection P between the center line 124 and the radius X, the position viewed by the driver (coordinates at the point of intersection P) is determined. A straight line passing through this point of intersection P and the vehicle 10 is a straight line in a direction which substantially coincides with the direction in which the driver looks (the driver's line of view L1) in accordance with the route.

Upon completion of the calculation of the line of view L1, the deviation angle $\phi$ is determined in Step 230. In other words, the angle formed by the line of view L, which coincides with the running direction of the vehicle 10, and the line of view L1, which corresponds to the route, is the deviation angle $\phi$ in the direction of the line of view of the driver which changes from the running direction of the vehicle 10 in accordance with the route. It should be noted that the running condition (vehicle speed V) of the vehicle 10 is taken into consideration in the view position of the driver, as shown in Formula (1) above.

In an ensuing Step 232, the determined deviation angle $\phi$ is outputted to the controller 50, and this routine ends.

Thus, an image which matches an image viewed by the driver and shot by the night vision camera is converted into an image of a plan view to ascertain the route, so that the deviation angle $\phi$, which is the angle formed by the running direction of the vehicle and the direction of view by the driver in accordance with the route, can be obtained easily on the basis of the distance viewed by the driver.

Next, referring to FIG. 20, a description will be given of fuzzy inference for determining the amount of control of the light distribution. When this routine is started, the deviation angle $\phi$ and the vehicle speed V are read in Step 240. Then, in Step 242, the degree of fulfillment of the deviation angle $\phi$ is calculated on the basis of the read deviation angle $\phi$ and the read vehicle speed V.

In other words, the deviation angle φ and the vehicle speed V are fetched (Step 240), and the degrees of fulfillment of the antecedents are calculated on the basis of the respective membership functions in accordance with the fuzzy inference rules described above (Step 242). Subsequently, an AND of the degrees of fulfillment of the respective rules, i.e., the minimum value wi (i represents the number of rule) of the degrees of fulfillment, namely, the goodness of fit, is calculated (Step 244), and the set (AND) Wi weighted by the goodness of fit wi is determined from the sets of membership functions for quantifying the states of light distribution in the consequents (Step 246). Then, the result of inference (set W) is determined by the sum of sets from the results of inference (respective sets Wi) calculated for the respective rules (Step 248). The center of gravity of this set W is determined, and an amount of control of a beam pattern in the closest state is selected from the determined value of the center of gravity (Step 250). On the basis of the amount of control of the selected beam pattern, the amounts by which the light-shielding plates 40A to 40C of the shade 40 are to be driven are calculated (Step 252). Since the amounts to be driven in this case are values in steps corresponding to predetermined beam patterns, control is simplified.

Figure 21A:
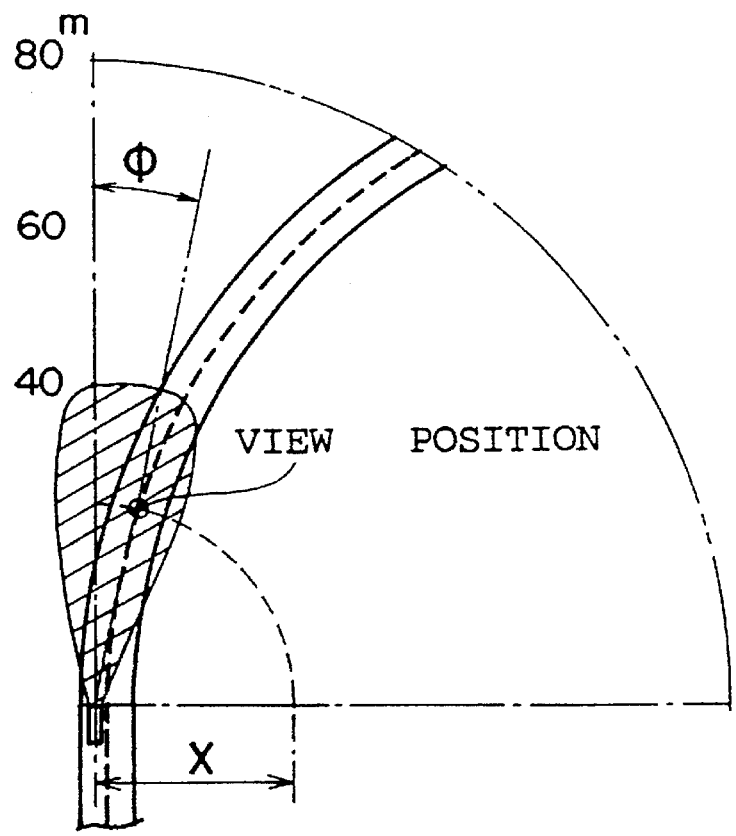
FIGS. 21A and 21B are plan views illustrating routes of roads and light distributions of the headlamps.
Figure 21B:
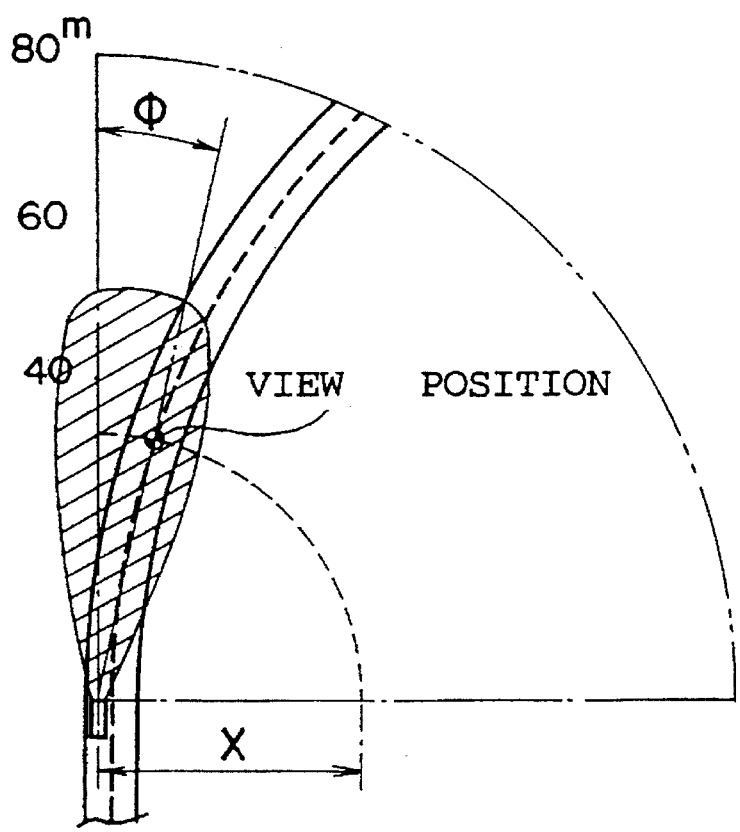

Accordingly, for instance, in a case where the route is curved at 80 R and the vehicle speed is 60 km/h, if the amounts of control U and R of the light distribution by the spread of light and the distance reached by the light are determined and the light is distributed on the basis of the above-described fuzzy inference rules, the direction and position viewed by the driver are positively illuminated by the headlamps, as shown in FIG. 21A, thereby improving the visibility. In addition, in a case where the vehicle speed is accelerated to 80 km/h, the viewed distance X increases, as shown in FIG. 21B, and, concurrently, the direction and position viewed by the driver are calculated to optimum values, thereby improving the visibility of the driver.

Thus, in the present embodiment, since the light distribution is determined on the basis of the relationship between the road condition and the driver's view position corresponding to the actual forward field of view (image) ahead of the vehicle by image processing, the light from the headlamps is optimally radiated in the direction and to the position viewed by the driver.

In addition, since fuzzy inference is used to determine the light distribution, it is possible to effect control matching the sensations of the driver. Further, since control based on the steering angle or the like is not carried out, it is possible to effect optimum light distribution control without being affected by steering conditions such as so-called counter steering.

In the present embodiment, the calculations of the spread of light and the distance reached by the light are made independently, and the amounts of control determined from the calculated values are controlled in a related manner. Hence, it is possible to obtain a beam pattern matching the running condition, i.e., illumination of light corresponding accurately to the driver's view position.

Figure 22A:
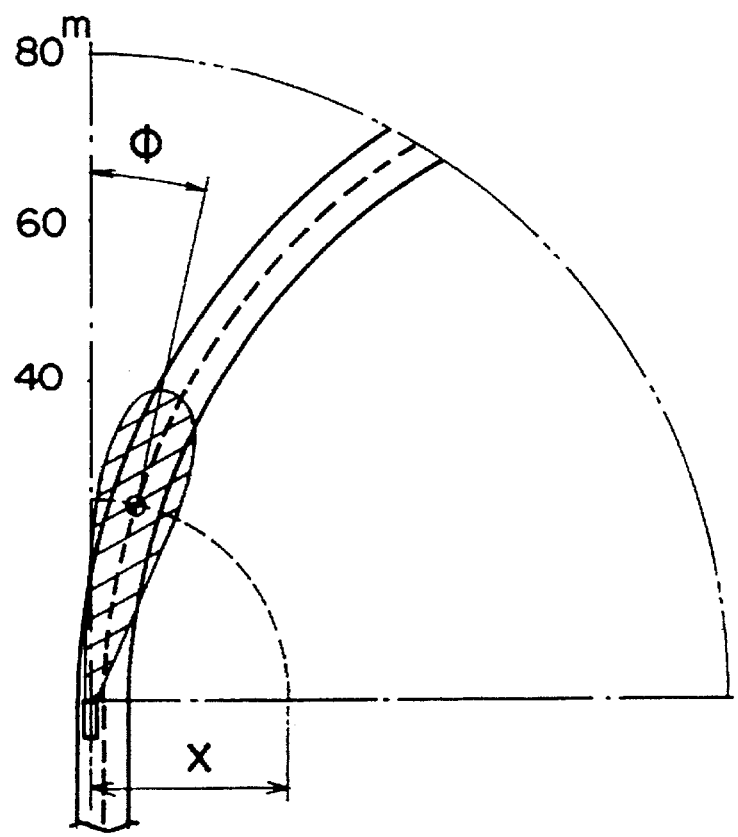
FIGS. 22A and 22B are plan views illustrating routes of roads and light distributions of the headlamps when optical axes are changed.
Figure 22B:
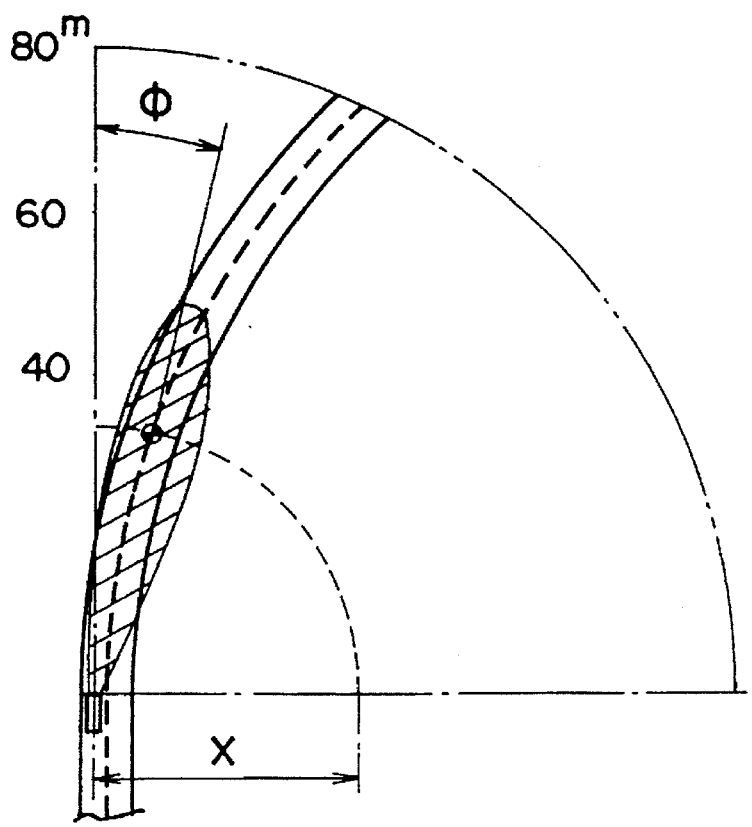

Although in the above-described first embodiment a description has been given of an example in which the shade having the plurality of light-shielding plates is disposed in the headlamp, and the light distribution is changed by changing the positions of these light-shielding plates, the present invention is not limited to the same, and the optical axis (center axis) of each headlamp may be changed. In this case, it suffices if the optical axis is oscillated to the left or right in correspondence with the deviation angle φ determined as described above and the spread-light distribution obtained from fuzzy inference, and the optical axis is oscillated vertically in correspondence with the light-reaching distance obtained from fuzzy inference. An example of light distribution when the optical axis is changed is shown FIGS. 22A and 22B. The diagrams of light distribution shown in FIGS. 22A and 22B correspond to diagrams of light distribution based on light distribution control using the shade, which are shown in FIGS. 21A and 21B.

In addition, although, in the above-described first embodiment, the deviation angle φ is determined from the calculated viewed distance after the image shot by the night vision camera is converted into a plan image, it suffices to directly determine only the deviation angle φ on the basis of the viewed distance calculated when image processing is performed.

Second Embodiment

In the above-described first embodiment, the route is obtained by performing image processing of an image ahead of the vehicle 10 shot by the night vision camera 22, and the view position of the driver is determined from the running direction of the vehicle. In a second embodiment, instead of using the shot image, the present invention is applied to road-vehicle communication which makes use of road information obtained from sign posts arranged along the road.

Since the structure of the second embodiment is substantially similar to that of the above-described first embodiment, detailed description of identical parts will be omitted, and description will be given of different parts.

The apparatus for controlling the light distribution of headlamps in accordance with the second embodiment comprises a plurality of sign posts (not illustrated) arranged along the road, instead of the image processor 48. Accordingly, road information transmitted from the unillustrated sign posts is inputted to the controller 50. The road information includes, for example, numerical data on the curvature of a curved road and the straightness of the road.

In addition, stored in the ROM 52 of the controller 50 are the fuzzy rules used for effecting fuzzy inference in processing for forming a road pattern and light distribution control on the basis of the road information from the unillustrated sign posts. Control programs for controlling the shade 40 and the like are also stored in the ROM 52.

Next, a description will be given of the operation of the second embodiment together with an interrupt processing routine for road-vehicle communication shown in FIG. 24.

Figure 23:
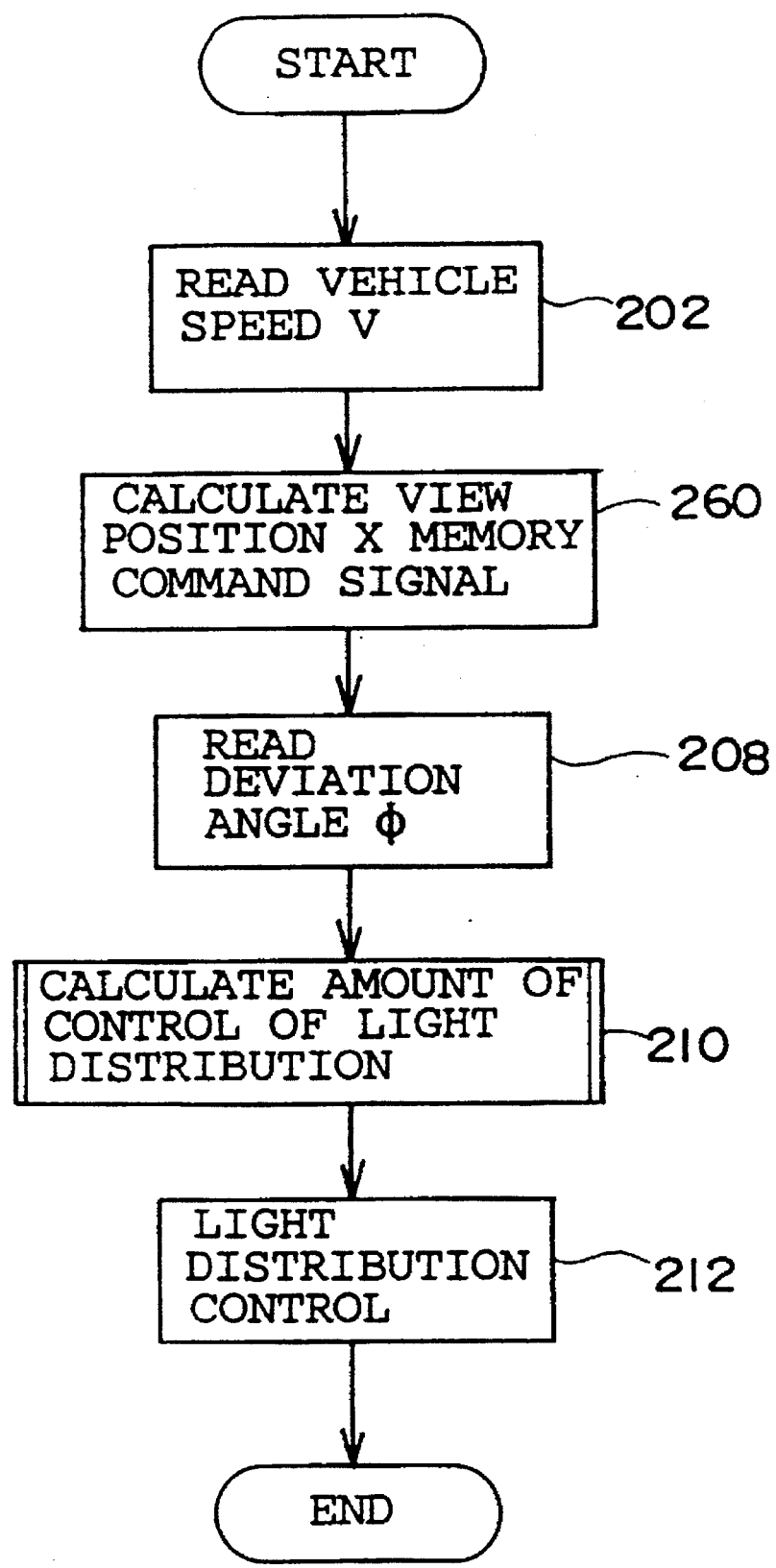
FIG. 23 is a flowchart illustrating a main routine for light distribution control based on road-vehicle communication in accordance with a second embodiment.

FIG. 23 shows a control main routine of the second embodiment. In the main routine of the second embodiment, Step 260 which will be described below is executed instead of Steps 204 and 206 in the control main routine of the first embodiment (see FIG. 18).

In Step 260, after reading the vehicle speed V (Step 202), the viewed distance X is calculated in accordance with Formula (1) above and is stored in an unillustrated memory, and a command signal which enables interrupt processing (see FIG. 24), which will be described later, for a process of ascertaining the route through road-vehicle communication is outputted. The deviation angle φ is calculated through this interrupt processing.

In an ensuing Step 208, the calculated deviation angle φ is read, and the amounts of control of the light distribution of the headlamps 18 and 20 are calculated by using fuzzy inference in the same way as in the first embodiment (Step 210, see FIG. 20). Upon completion of this calculation, the light-shielding plates 40A to 40C are moved in correspondence with the calculated amounts of control of the light distribution so as to control the light distribution of the headlamps 18 and 20 (Step 212), and this routine ends.

Next, a description will be given of interrupt processing for a process of ascertaining the route on the basis of road-vehicle communication.

Figure 24:
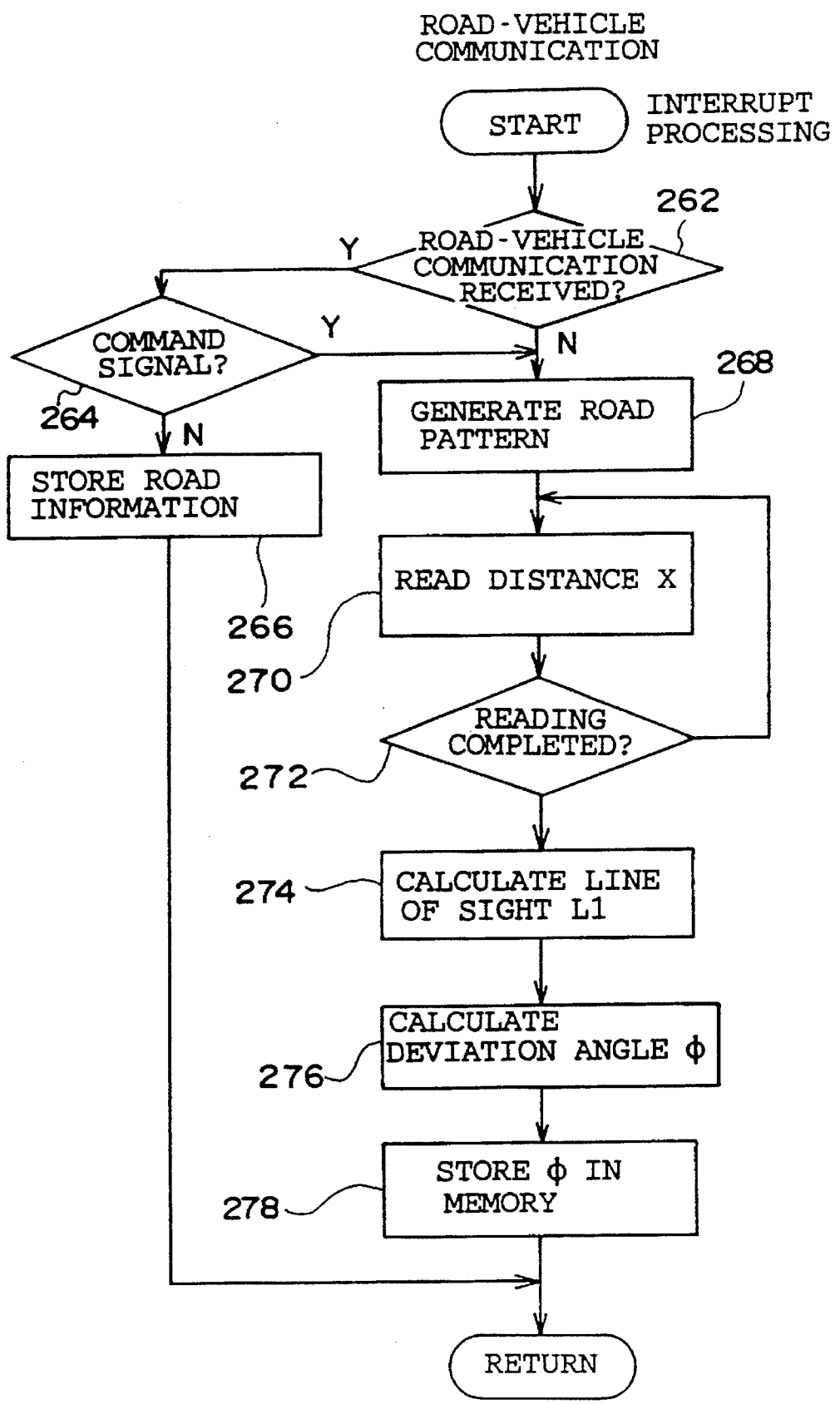
FIG. 24 is a flowchart illustrating an interrupt processing routine for road-vehicle communication.

The interrupt processing routine shown in FIG. 24 is executed either when road information is received from an unillustrated sign post for road-vehicle communication, or when the aforementioned command signal is issued.

First, in Step 262, a determination is made as to whether road information for road-vehicle communication has been received. If NO is the answer to the determination, a determination is made that the aforementioned command signal has been issued, and the operation proceeds to Step 268. However, if YES is the answer to the determination, the operation proceeds to Step 264 to determine whether the command signal has been issued. If the command signal has been issued, the operation proceeds to Step 268. If NO is the answer to the determination in Step 264, only the road information has been received through road-vehicle communication. The received road information is stored in the unillustrated memory in Step 266, and this routine ends.

In Step 268, the road information stored in the unillustrated memory is fetched, and a road pattern is formed on the basis of this road information. Since the road pattern is formed on the basis of the straightness of the road, the curvature of the curves, and the like, the road pattern does not need to be processed as an image as in the first embodiment, and can be handled as data of numerical values or mathematical expressions. Next, the viewed distance X is read (Steps 270 and 272), and the operation proceeds to Step 274. In Step 274, the line of view L1 similar to that of the first embodiment is determined from the formed road pattern and the calculation processing of the viewed distance X. The line of view L1 is made to correspond to a linear expression determined by a simple calculation of numerical values or the like. Upon completion of the calculation of the line of view L1, the deviation angle $\phi$ is determined in Step 276. In an ensuing Step 278, the determined deviation angle $\phi$ is stored in the unillustrated memory of the controller 50, and this routine ends.

Thus, in the second embodiment, since the view position can be determined from the route without image processing, the processing time can be reduced, and the structure of the apparatus is simplified.

Third Embodiment

In the above-described first embodiment, image processing is used to ascertain the route. Generally, in image processing, the operation time increases in proportion to the number of pixels to be processed. Accordingly, if light distribution control is effected after image processing to determine the position viewed by the driver, a time lag of the amount of time required by the image processing occurs in control. In a third embodiment, to overcome the time lag in control which is caused by the time required for image processing, the amount of control of the light distribution is corrected in correspondence with an acceleration dV of the vehicle, so as to obtain an optimum light distribution.

Since the structure of the third embodiment is substantially similar to that of the first embodiment, detailed description of identical parts will be omitted, and only different portions, i.e., correction by means of the acceleration dV of the vehicle, will be described.

(Time Lag Correction)

The method for correcting a time lag due to image processing is carried out by the following procedures. First, as shown below in Formula (2), a correction value obtained by multiplying a correction coefficient $K_1$ obtained from fuzzy inference, which will be described later, by the acceleration dV of the vehicle is added to the driver's view position X determined on the basis of the running condition (vehicle speed) of the vehicle in Formula (1) above. A corrected view position X' of the driver to be reached after the time lapse due to image processing is thereby determined. By determining the deviation angle $\phi$ on the basis of this corrected view position X', it is possible to determine the deviation angle $\phi$ in which the time lag due to the lapse of the operation time for image processing is corrected.

$$X'=1.5 \cdot (10/36) \cdot V + K_1 \cdot dV \qquad (2)$$

where,

V: vehicle speed (unit: km/h)

X': corrected viewed distance (unit: m)

$K_1$: correction coefficient (Fuzzy Inference Rules for Correction Control)

In the present embodiment, fuzzy inference is used to obtain the aforementioned correction coefficient $K_1$. Table 3 shows fuzzy inference rules for correcting the light distribution control by means of the acceleration of the vehicle.

TABLE 3

| | Light distribution control for changing the transverse spread of light | | |
| | $\phi$ | | |
| dV | ZR | RM, LM | RL, LL |
| --- | --- | --- | --- |
| NL | (a) ZR | (b) PM | (c) PL |
| NM | (d) ZR | (e) ZR | (f) PM |
| ZR | (g) ZR | (h) ZR | (i) ZR |
| PM | (j) ZR | (k) ZR | (l) PM |
| PL | (m) ZR | (n) PM | (o) PL | where, dV: acceleration of the vehicle
$\phi$: deviation angle
(a) to (o): letters designating fuzzy inference rules If the above fuzzy inference rules are expressed in the form of "if . . . , then . . . ," the rules (l) and (o), for example, are expressed as shown below. Although the other fuzzy rules (a) to (n) can be expressed in a similar manner, description thereof will be omitted.

(l) If the vehicle accelerates by an intermediate degree, and the absolute value of the deviation angle $\phi$ is large, the viewed distance is corrected by an intermediate degree.

(o) If the vehicle accelerates by a large degree, and the absolute value of the deviation angle $\phi$ is large, the viewed distance is corrected by a large degree.

The language values of the absolute values of the deviation angle $\phi$ being substantially zero, medium, and large are expressed by ZR, PM, and PL. In Table 3, since PM includes a rightward turn and a leftward turn, these directions are respectively represented by RM and LM. Further, since PL also includes a rightward turn and a leftward turn, these directions are respectively represented by RL and LL. The language value of the acceleration dV being substantially zero is represented by ZR. In addition, the language values of the vehicle accelerating by an intermediate degree and a large degree are represented by PM and PL, while the language values of the vehicle decelerating by an intermediate degree and a large degree are represented by NM and NL. The language value of not effecting correction of the viewed distance is represented by ZR, and the language value of correction by an intermediate degree and a large degree are represented by PM and PL, respectively.

The language values NL, NM, ZR, PM, and PL representing the acceleration of the vehicle are quantified by the membership function FdV shown in FIG. 25A. FdV(ZR) represents a characteristic in which the degree of fulfillment is 1 when the acceleration dV of the vehicle is 0, the degree of fulfillment gradually decreases from 0 to dV1 in terms of the acceleration dV, and gradually decreases from 0 to −dV1. FdV(PM) represents a characteristic in which the degree of fulfillment gradually increases from 0 in terms of the acceleration dV, becomes 1 at dV1, and gradually decreases as the acceleration dV increases to dV2. FdV(PL) represents a characteristic in which the degree of fulfillment gradually increases from dV1 in terms of the acceleration dV, and becomes 1 at dV2 or more. Meanwhile, FdV (NM) and FdV(NL) for quantifying the language values NL and NM representing the conditions when the vehicle is decelerated have characteristics with inverse codes of FdV(PM) and FdV(PL) representing the conditions of acceleration when the vehicle is accelerated.

The language values of ZR, PM, and PL representing the absolute values of the deviation angle $\phi$ are quantified by the membership function F$\phi$' shown in FIG. 25B. F$\phi$' (ZR) represents a characteristic in which the degree of fulfillment is 1 when the absolute value $|\phi|$ of the deviation angle $\phi$ is 0, and the degree of fulfillment gradually decreases from 0 to $|\phi|$. F$\phi$' (PM) represents a characteristic in which the degree of fulfillment gradually increases from 0 in terms of the absolute value $|\phi|$, becomes 1 at $|\phi 1|$, and gradually decreases as the absolute value $|\phi|$ increases to $|\phi 2|$. F$\phi$' (PL) represents a characteristic in which the degree of fulfillment gradually increases from more. It should be noted that the membership function concerning the absolute value of this deviation angle $\phi$ is the same as only the positive-code side of the deviation angle $\phi$ shown in FIG. 15A.

The language values of ZR, PM, and PL representing the correction of the viewed distance of the consequents are quantified by a membership function Gk shown in FIG. 25C. Gk(ZR) represents a characteristic in which the degree of fulfillment is 1 from 0 to k1 in terms of a correction amount k, and the degree of fulfillment gradually decreases from k1 to k2. Gk(PM) represents a characteristic in which the degree of fulfillment gradually increases from k1, becomes 1 at k2, and gradually decreases from k2 to k3. Gk(PL) represents a characteristic in which the degree of fulfillment gradually increases from k2, and becomes 1 at k3 or more.

In the present embodiment, continuous values are not used for the aforementioned correction amount, i.e., the correction amount k obtained by fuzzy inference which will be described later. Instead, correspondence is provided so that coefficients in steps (values in three stages, 0, kb, and ka) can be obtained. Namely, as shown in FIG. 25C, the correction coefficient 0 is selected when the obtained correction amount k is at or below a point of intersection between Gk(ZR) and Gk(PM); the correction coefficient kb is selected when the correction amount k exceeds the point of intersection between Gk(ZR) and Gk(PM) and is at or below a point of intersection between Gk(PM) and Gk(PL); and the correction coefficient ka is selected when the correction amount k exceeds the point of intersection between Gk(PM) and Gk(PL). In the present embodiment, the correction coefficients are predetermined values and have the relationship ka=2·kb.

(Fuzzy Inference for Correction Control)

Next, a description will be given of an example in which the correction amount is determined by fuzzy inference when the amounts of control of the light distribution of the headlamps 18 and 20 are corrected when the vehicle makes a turn.

Figure 28A:
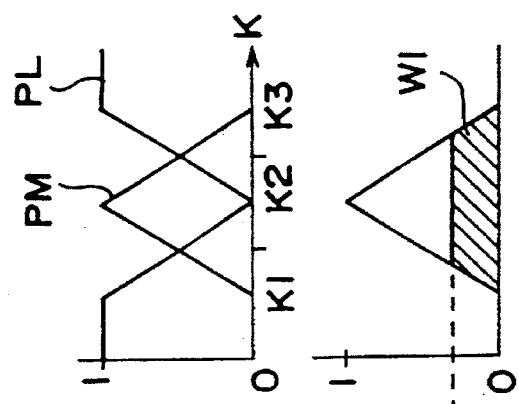
FIGS. 28A to 28D are diagrams illustrating fuzzy inference processing for determining an acceleration correction value in accordance with the third embodiment.
Figure 28B:
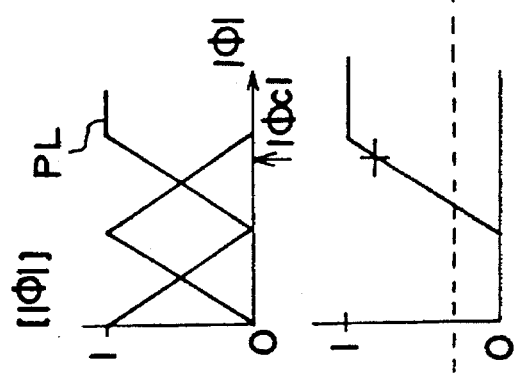
Figure 28C:
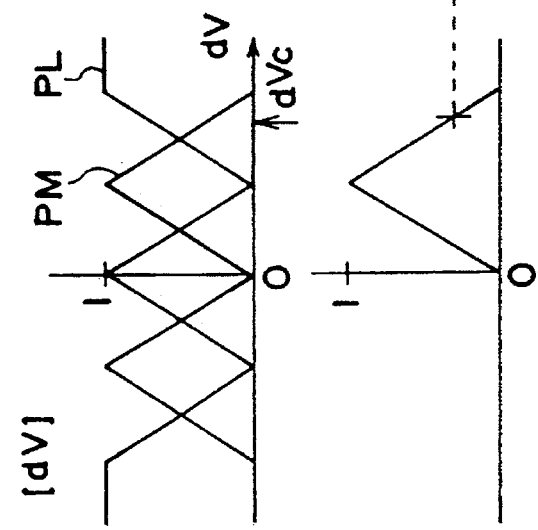

When the absolute value $|\phi|$ of the deviation angle $\phi$ is $|\phi c|$, and the acceleration dV of the vehicle is dVc (see FIG. 28A), the degree of fulfillment corresponding to the absolute value $|\phi|$ and the acceleration dV is calculated on the basis of the above-described fuzzy inference rules and the respective membership functions. In rule (1), the degree of fulfillment of the acceleration dV is calculated by means of the membership function FdV(PM), while the degree of fulfillment of the absolute value $|\phi|$ is calculated by means of the membership function F$\phi$' (PL) (see FIG. 28B). With respect to rule (o) as well, the degree of fulfillment is calculated in a similar manner (see FIG. 28C). Next, an AND of the degrees of fulfillment (a minimum value w of the degrees of fulfillment), i.e., the goodness of fit with respect to the acceleration dV and the absolute value $|\phi|$, is calculated. In rule (1), the minimum value of the degree of fulfillment thus determined becomes the goodness of fit $w_1$ (see FIG. 28B). With respect to rule (o) as well, each minimum value becomes the goodness of fit $w_2$ (see FIG. 28C).

Figure 28D:
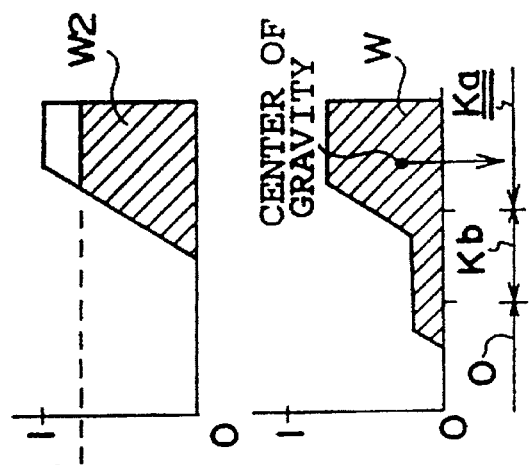

Next, the result of inference is calculated for each of the above-described rules. Namely, with respect to rule (1), a set W1 (see FIG. 28B), which is the hatched portion formed by cutting the membership function Gk(PM) of the correction amount at the goodness of fit $w_1$, is obtained. With respect to rule (o), a set W2 (see FIG. 28C), which is the hatched portion formed by cutting Gk(PL) at the goodness of fit $w_2$, is obtained. The result of fuzzy inference becomes a set W in the hatched portion which combines the sets W1 and W2 (see FIG. 28D). The center of gravity of this set W is determined, and a correction coefficient closest to the correction amount k in the determined value of the center of gravity is selected (any one of 0, ka, and kb). Accordingly, the correction coefficient ka is selected in this case.

(Operation of the Third Embodiment)

Referring now to the flowcharts shown in FIGS. 26 and 27, a description will be given of the operation of the third embodiment.

Figure 26:
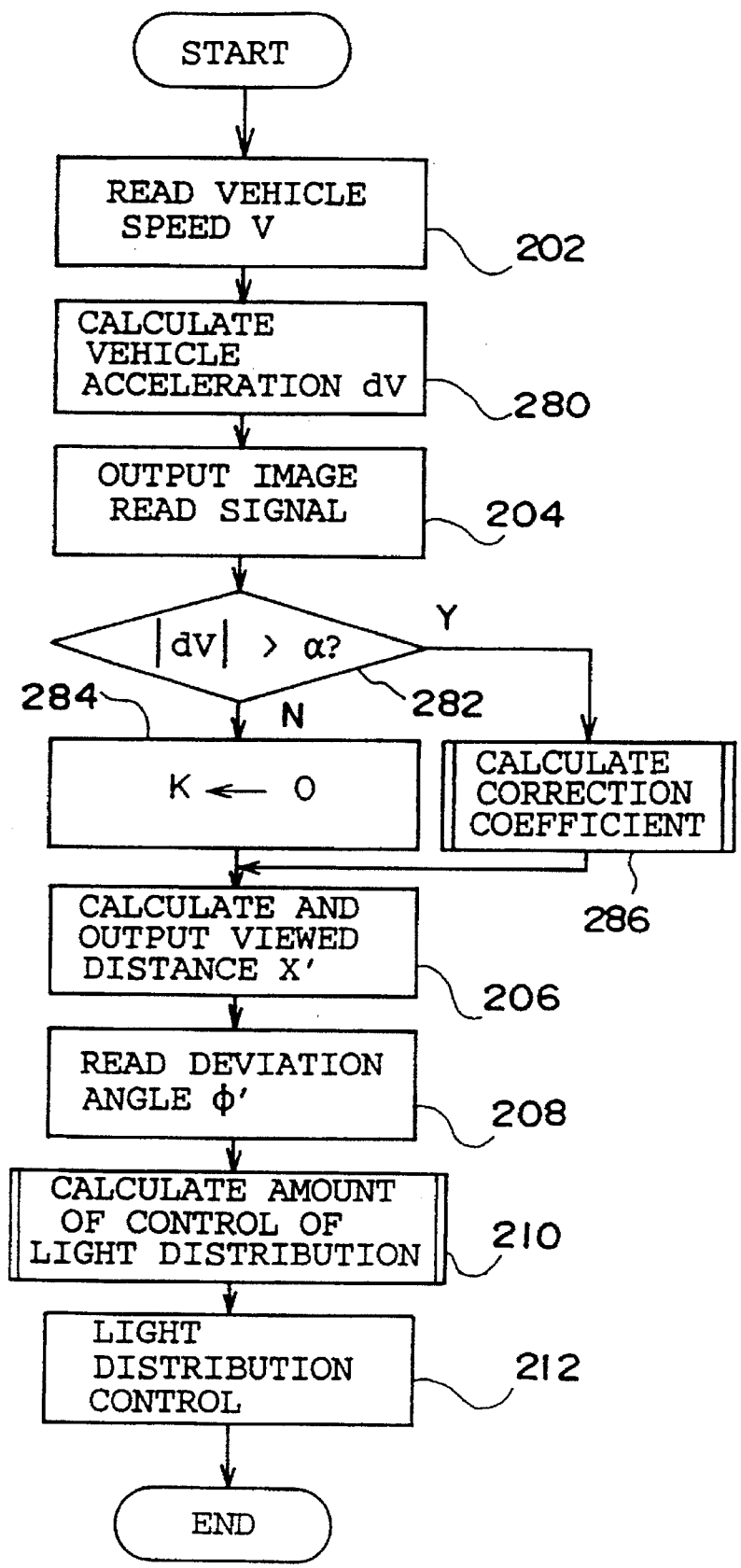
FIG. 26 is a flowchart illustrating a main routine for acceleration correction in accordance with the third embodiment.
Figure 27:
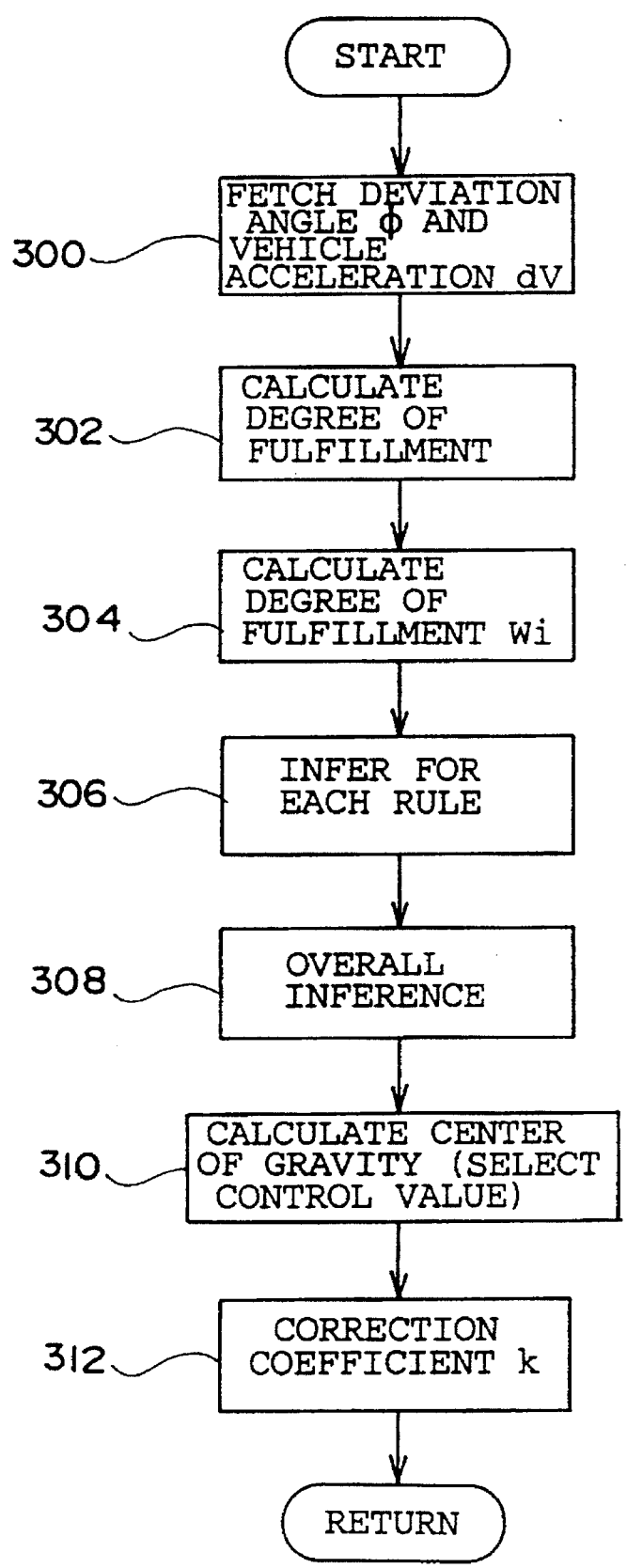
FIG. 27 is a flowchart illustrating fuzzy inference processing for calculating a correction value in accordance with the third embodiment.

As shown in FIG. 26, the control main routine in the third embodiment uses the control main routine shown in FIG. 18 as its basis, and processing for correction is added thereto. Accordingly, detailed description of identical portions will be omitted, and only the different portions will be described. It should be noted that this control routine is also executed for each predetermined time in the same way as the control main routine shown in FIG. 18.

After the headlamps are turned on and the vehicle speed V is read (Step 202), the acceleration dv of the vehicle is calculated in Step 280. This acceleration dv corresponds to a positive code during acceleration and to a negative code during deceleration. Next, the image read signal is outputted to the image processor 48 (Step 204). In Step 282, a determination is made as to whether the absolute value $|dV|$ of the acceleration dv of the vehicle is greater than $\alpha$, so as to determine the need for correction processing by means of the acceleration of the vehicle. The value $\alpha$ is a predetermined value, and a value sufficient for allowing the view position to change due to acceleration is used. If $|dV| \leq \alpha$, i.e., NO is the answer to the determination in Step 282, there is no need for correction processing based on the acceleration, so that "0" is set to the correction coefficient k in Step 284, and the operation proceeds to Step 206.

Meanwhile, if YES is the answer to the determination in Step 282, the operation proceeds to Step 286 to execute a correction-coefficient calculating routine which will be described later, and after the correction coefficient k is determined, the operation proceeds to Step 206.

In Step 206, the viewed distance X' corrected in accordance with Formula (2) above is calculated, and the calculated viewed distance X' is outputted to the image processor 48. In Step 208, the corrected deviation angle φ' calculated by the image processor 48 on the basis of the corrected viewed distance X' is read, and the operation proceeds to Step 210. In Step 210, the amounts of control of the light distribution of the headlamps 18 and 20 are calculated by using fuzzy inference as described above (see FIG. 20). Upon completion of this calculation, in Step 212, the light-shielding plates 40A, 40B, and 40C are moved in accordance with the amounts of control of the light distribution thus calculated, so as to control the light distribution of the headlamps 18 and 20, and this routine ends.

Next, a detailed description will be given of Step 286. As shown in FIG. 27, the deviation angle φ and the acceleration dV of the vehicle'are fetched (Step 300). The respective degrees of fulfillment of the absolute value |φ| with the code of the deviation angle φ removed and the acceleration dV of the vehicle, which are the antecedents of the fuzzy rule, are calculated in accordance with the above-described fuzzy inference rules (Step 302). Then, an AND of the degrees of fulfillment of the respective rules, i.e., the minimum value wi (i represents the letter of the rule) of the degrees of fulfillment, namely, the goodness of fit, is calculated (Step 304). The set (AND) Wi weighted by the goodness of fit wi is determined from the membership function for quantifying the correction of the viewed distance of the consequent corresponding to the rule (Step 306). Subsequently, the result of inference (set W) is determined by summing the sets from the results of inference (respective sets Wi) calculated for the respective rules (Step 308). The center of gravity of this set W is then determined (Step 310), and the correction coefficient k of the viewed distance corresponding to the obtained value of the center of gravity is determined (Step 312).

Accordingly, the angle of deviation with respect to the direction in which the driver looks is corrected as the viewed distance is corrected in accordance with the acceleration of the vehicle, and the light distribution is controlled so as to correspond to the corrected viewed distance. Thus, as the deviation angle φ is corrected on the basis of the driver's viewed distance in accordance with the acceleration of the vehicle, even in a case where a time lag of the amount of time required for image processing occurs in control, it is possible to optimally calculate the direction and position viewed by the driver. Accordingly, no time lag occurs in the illumination by the headlamps of the position viewed by the driver, so that the driver does not feel any unpleasant sensations.

Any time lag other than that of the operation processing time required for image processing can be ignored. Since the time lag due to image processing occurs only during acceleration and deceleration, the correction time is concentrated, so that stable control can be provided.

Although the correction of light distribution control by means of the acceleration is effected by correcting the viewed distance X, the deviation angle φ may be corrected as shown in following Formula (3):

$$\phi' = \phi + K_2 \cdot dV \qquad (3)$$

where,

φ: deviation angle dV: acceleration $K_2$: correction coefficient

Fourth Embodiment

Although in the foregoing embodiments, a description has been given of an example in which the light distribution control of the headlamps 18 and 20 is subjected to fuzzy inference in accordance with the route and the vehicle speed V, in a case where a lane change is made to an adjacent lane of a road having a plurality of lanes, e.g., an expressway, it is necessary to illuminate the adjacent lane so as to ensure the field of view for the driver. Accordingly, in a fourth embodiment, a description will be given of an example of light distribution control when making a lane change when there is no change in the route, such as changing lanes on an expressway during high-speed running.

Since the structure of the fourth embodiment is similar to the above-described first embodiment, detailed description will be omitted, and operation of the fourth embodiment will be described hereafter. In addition, during high-speed running (e.g., on an expressway) in accordance with the fourth embodiment which will be described below, the vehicle speed is high and the changes in the vehicle speed are small, so that it is assumed that the distance reached by the light does not change in accordance with the change in the vehicle speed V. For this reason, a description below will be given of only the light distribution control by the spread of light.

Figure 29:
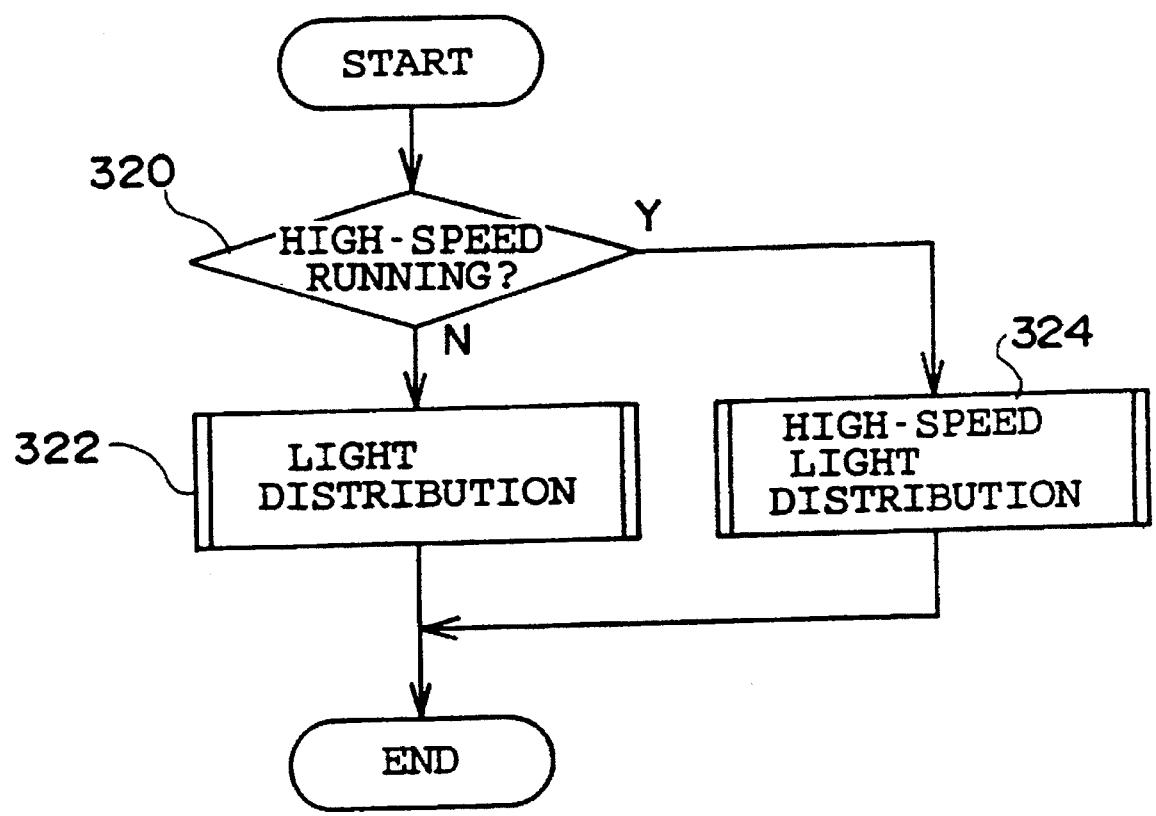
FIG. 29 is a flowchart illustrating a main routine for light distribution control in accordance with a fourth embodiment.

FIG. 29 shows a control main routine in accordance with the fourth embodiment.

Figure 31A:
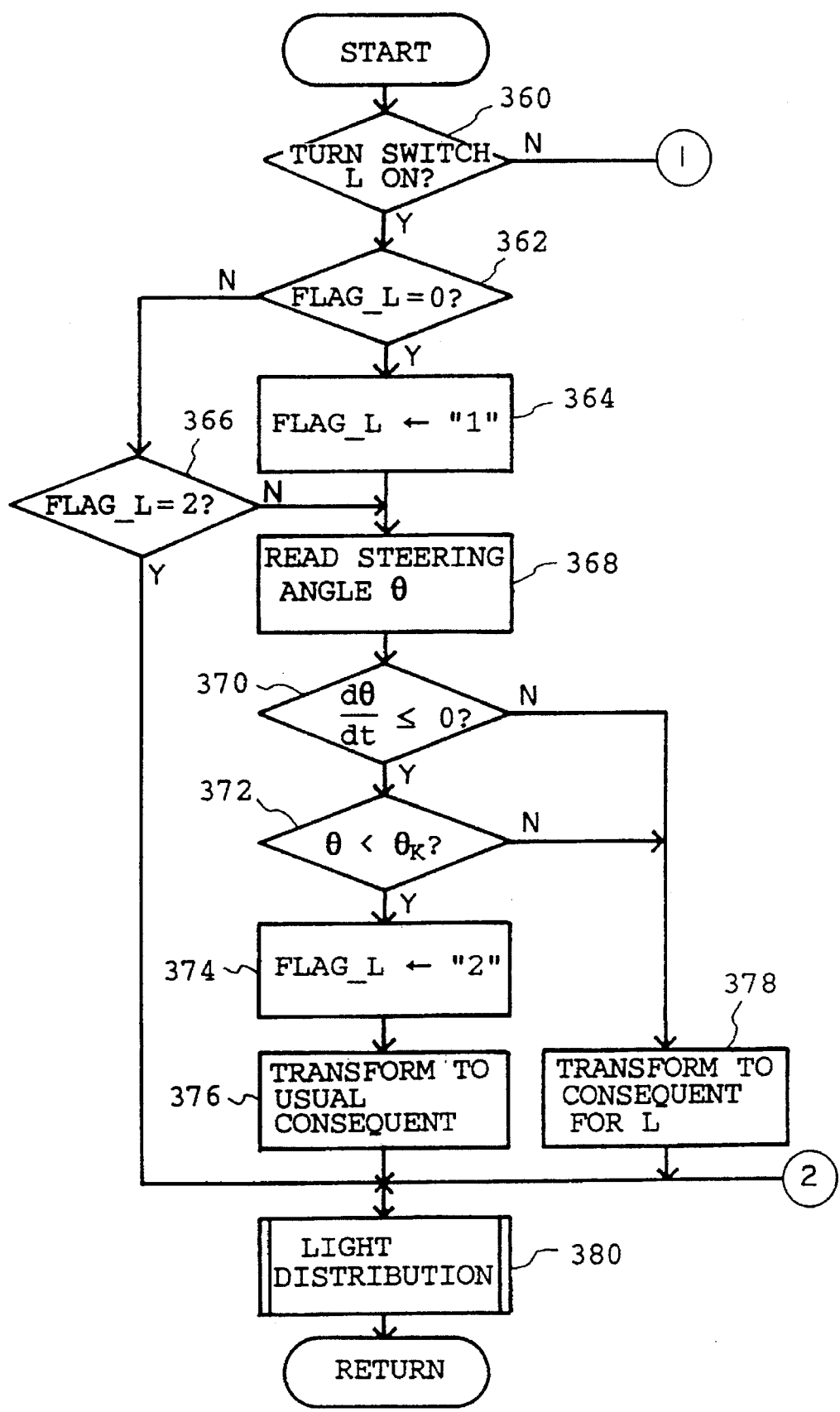
FIGS. 31A and 31B are flowcharts illustrating a subroutine for light distribution control using a turn signal switch in accordance with the fourth embodiment.
Figure 31B:
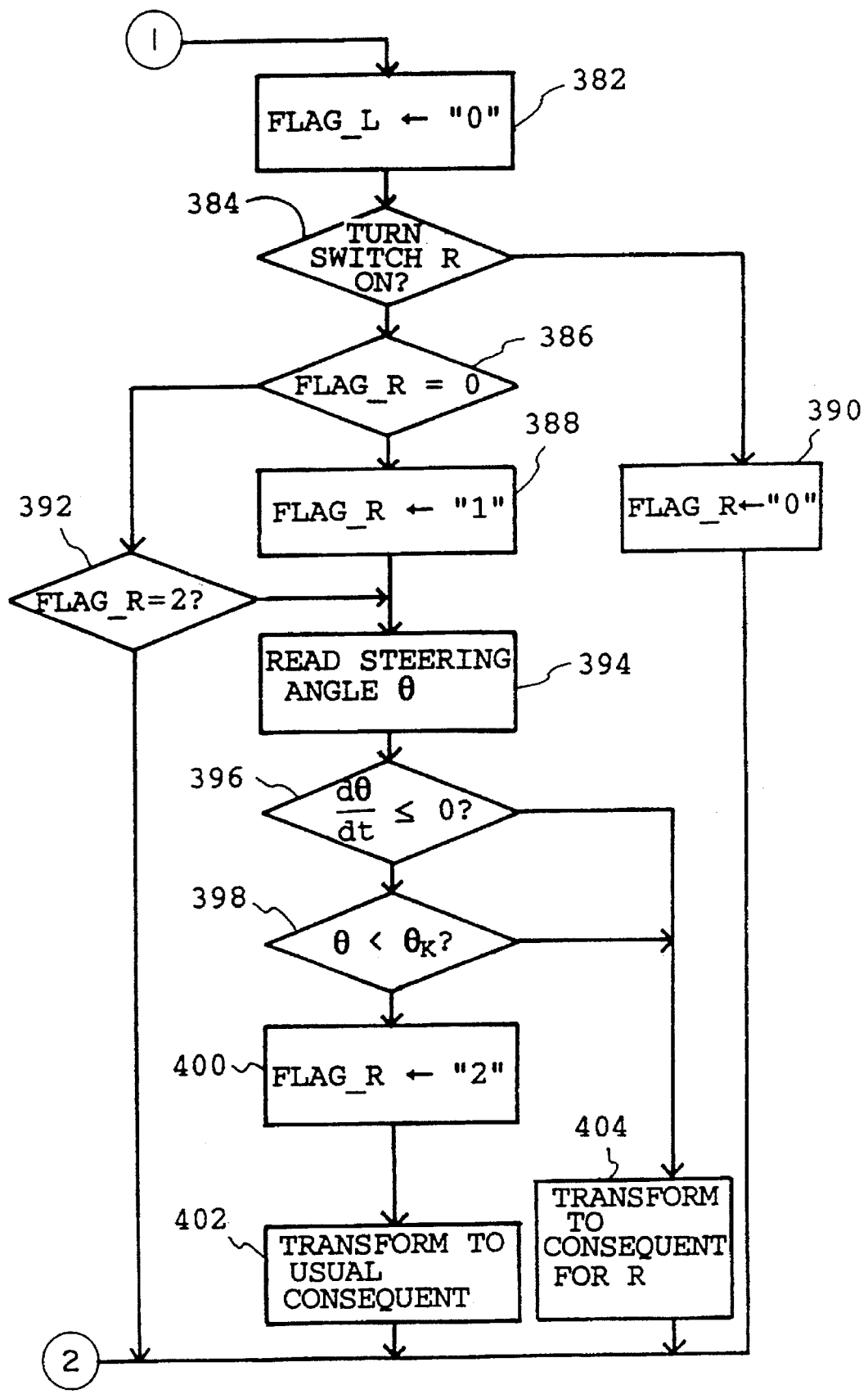

First, when this routine is implemented, the operation proceeds to Step 320, and a determination is made as to whether or not a flag FLAG_H, which will be described later, has been set, so as to determine whether the vehicle is in a high-speed running state. If NO is the answer to this determination, processing for high-speed running is not required, the operation proceeds to Step 322, and after executing Steps 202 to 212 in the control main routine in the first embodiment (see FIG. 18), this main routine ends. Meanwhile, if YES is the answer to the determination, since the vehicle is in a high-speed running state, the high-speed running processing routine (FIG. 31) which will be described later is executed, and then this main routine ends.

If the flag FLAG_H has been set, the operation proceeds to Step 324 to execute the light-distribution control subroutine (FIG. 31) for lane changing during high-speed running, which will be described later, and then this routine ends.

Next, a description will be given of high-speed-running determining routine for interrupt processing to determine the flag FLAG_H which is used to determine whether the vehicle is running at high speed. When the flag FLAG_H, which will be described below, is set to "1," the flag indicates that the vehicle is in a high-speed running state, and, when set to "0," the flag indicates that the vehicle is not in a high-speed running state. In addition, a flag FLAG_T indicates the presence or absence of the operation of a timer for measuring the time over which high-speed running continues. When the flag FLAG_T is set to "1," the flag indicates a timer "on" state, and, when set to "0," the flag indicates a timer "off" state.

Figure 30:
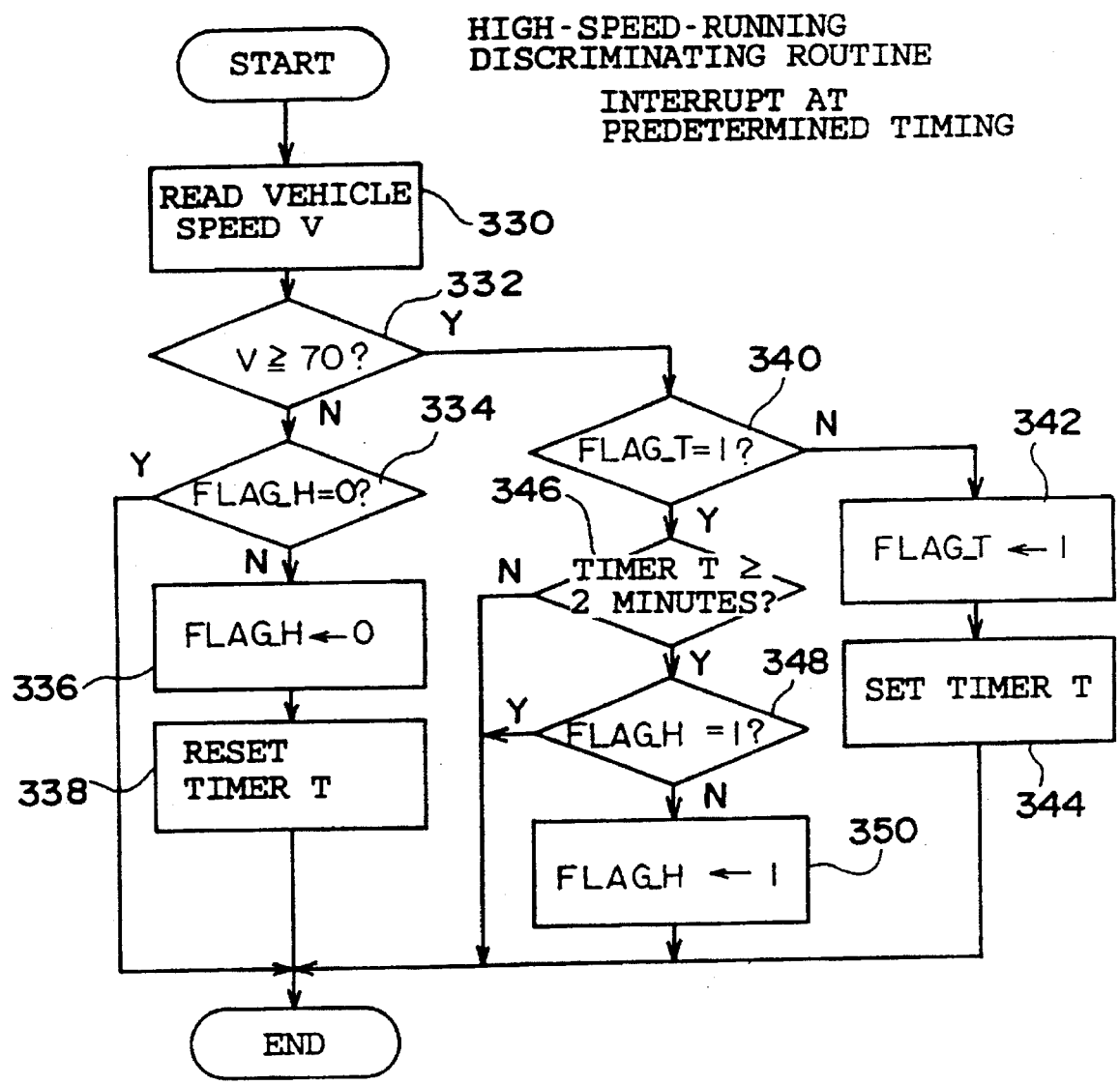
FIG. 30 is a flowchart illustrating a routine for determining high-speed running in accordance with the fourth embodiment.

The high-speed-running determination routine shown in FIG. 30 interrupt processes the control main routine for each predetermined time after the headlamps 18 and 20 are turned on. When this routine is implemented, after the vehicle speed V is read (Step 330), a determination is made as to whether or not V≧70, thereby determining whether the vehicle is presently running at high speed (Step 332). If the vehicle speed V≧70, a determination is made in Step 340 as to whether the flag FLAG_T="1," so as to determine whether the flag FLAG_T indicating the "off" state of the timer for measuring the high-speed running time has been set. If the flag FLAG_T has been set, a determination is made as to whether or not the time T measured by the timer is such that T≧2 (minutes) (Step 346). If T is less than two minutes, a determination is made that the current running state of the vehicle is not a continuous high-speed running state such as on an expressway, and this routine ends. However, if T is two or more minutes, a determination is made as to whether the flag FLAG_H has already been set for continued high-speed running (Step 348). Thereafter, the flag FLAG_H, if reset, is set (Step 350), and this main routine ends.

If NO is the answer to the determination in Step 340, it follows that the vehicle speed V≧70 and that the vehicle is in a high-speed state. The flag FLAG_T is set, and the timer is set (Steps 342, 344), and this routine ends.

On the other hand, if V<70 and NO is the answer in Step 332, the vehicle 10 is not in the high-speed running state. Therefore, if the flag FLAG_T is set, this flag is reset, and the timer is also reset, and this routine ends (Steps 334, 336, and 338).

Thus, in this interrupt processing routine, the flag FLAG_H is set under the assumption that a state in which the vehicle speed V of the vehicle 10 has continued at a predetermined vehicle speed (in this embodiment, 70 km/h) for a predetermined time (2 minutes) is the high-speed running state. Hence, it is easy to determine a state matching the state of high-speed running on an expressway or the like.

Next, a detailed description will be given of Step 324 mentioned above. It should be noted that this light-distribution control subroutine makes use of the indication signal of the turn signal switch indicated by the driver for lane changing. In addition, a flag FLAG_L indicates a state of light distribution control based on the turning on and off of a contact TSL of the turn signal switch 70. A flag FLAG_R indicates a state of light distribution control based on the turning on and off of a contact TSR of the turn signal switch 70. As for the states of the flags FLAG_L and FLAG_R, when these flags are "0," they indicate the "off" state of the turn signal switch; when they are "1," they indicate that the turn signal switch is on, representing a state for which light distribution control is to be effected in correspondence with the indicated direction; and when they are "2," they indicate the turn signal switch is on, representing a normal state of light distribution control (e.g., a state after completion of light distribution control in correspondence with an indicated direction).

When this subroutine is implemented, the operation proceeds to Step 360 to determine whether the contact TSL of the turn signal switch 70 is on. If on, the operation proceeds to Step 362, and, if off, the operation proceeds to Step 382.

In Step 362, a determination is made as to whether the flag FLAG_L indicating the leftward state of the turn signal switch 70 is 0. If FLAG_L≠0 (i.e., NO is the answer) and FLAG_L=1, the operation proceeds to Step 368. IF FLAG_L=2, it means that light distribution control corresponding to the indicated direction (leftward direction) has been completed, so that the operation proceeds to Step 380 to execute Steps 202 to 212 in the control main routine in the first embodiment (see FIG. 18), and then this main routine ends.

Figure 32A:
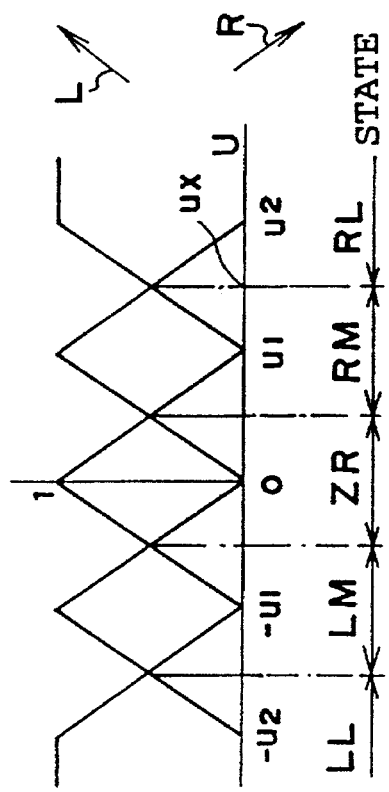
FIGS. 32A to 32C are image diagrams illustrating states of changing membership functions in accordance with the fourth embodiment.
Figure 32B:
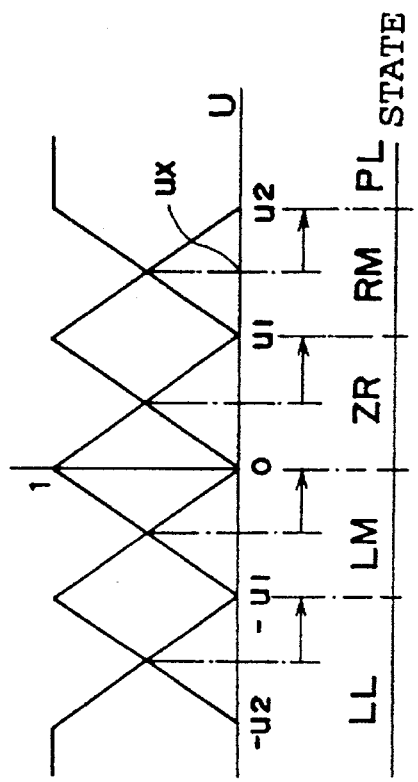

When the flag FLAG_L=0 in Step 362, the flag FLAG_L is set (Step 364), and the steering angle θ is then read (Step 368). In an ensuing Step 370, a determination is made as to whether a rate of change (dθ/dt) with respect to the time of the steering angle θ thus read is 0 or less. If NO is the answer to this determination, a determination is made that a lane change is being made, and in Step 378, the membership function GW of the consequent used in fuzzy inference mentioned above (see FIG. 15C) is changed to control in which priority is placed on high-speed leftward light distribution. In other words, as shown in FIGS. 32A and 32B, the states (states in five stages, RL, RM, ZR, LM, and LL) (FIG. 32A) corresponding to the above-described beam patterns Z are shifted to the positive code side (in the direction of the arrows in FIG. 32B) so as to correspond to the respective ranges divided by the five amounts of control of the spread-light distribution (−u2, −u1, 0, u1, and u2). Then, by using the membership function of this changed consequent, light distribution control is effected in the same way as described above (Step 380).

In addition, when the rate of change (dθ/dt) is less than or equal to 0, a determination is made as to whether the steering angle θ is less than a predetermined angle θk (Step 372). Here, in steering for a lane change during high-speed running, steering in substantially the same turning direction and at an angle exceeding the predetermined angle θk is carried out within a predetermined time (during lane changing). For this reason, by determining whether the turn signal is on and whether the steering angle θ is less than the predetermined angle θk, it is possible to determine whether lane changing has been completed. Accordingly, the determination in Step 372 determines whether lane changing has been completed.

If it is determined that lane changing has been completed, the flag FLAG_L is set to the completed flag "2" (Step 374), and after returning the membership function of the consequent used in the fuzzy inference mentioned above to the normal consequent GW (see FIGS. 15A to 15D) (Step 376), light distribution control is effected in the same way as described above (Step 380).

Meanwhile, if it is determined in Step 360 that the contact TSL of the turn signal switch 70 is off, the flag FLAG_L is reset (Step 382). In Step 384, a determination is made as to whether the contact TSR of the turn signal switch 70 is on. If on, the operation proceeds to Step 386, and, if off, the flag FLAG_R is reset in Step 390, and the operation proceeds to Step 380.

In Step 386, a determination is made as to whether the flag FLAG_R indicating the rightward condition of the turn signal switch 70 is 0. If FLAG_R≠0 (NO is the answer), and FLAG_R=1, the operation proceeds to Step 394. If FLAG_R=2, it means that the light distribution control corresponding to the indicated direction (rightward direction) has been completed, so that the operation proceeds directly to Step 380 to execute the control main routine (see FIG. 18), and then this routine ends.

Figure 32C:
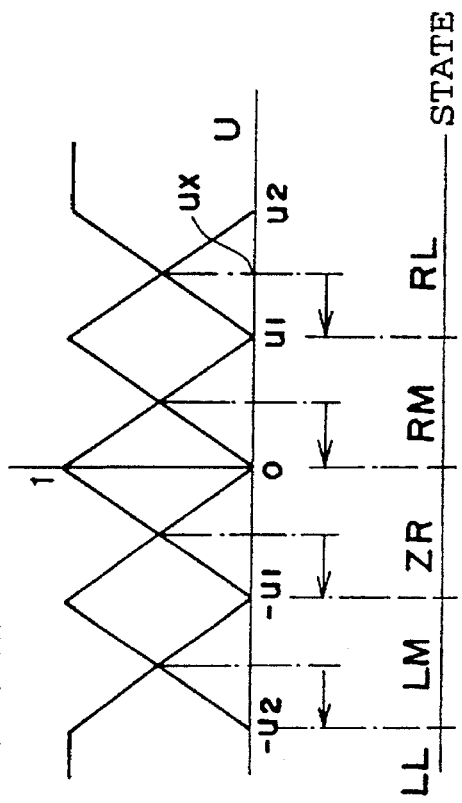

If FLAG R_R=0 in Step 386, the flag FLAG_R is set (Step 388), and then the steering angle θ is read (Step 394). Subsequently, in the same way as the above-described control for the leftward direction, the rate of change (dθ/dt) with respect to the time of the steering angle θ thus read is determined (Step 396). When it is determined that a lane change is being made (Step 396), the membership function GW in the consequent (see FIG. 15C) is changed to control in which priority is placed on high-speed rightward light distribution (Step 404). In other words, in the same way as described above, as shown in FIGS. 32A, 32B and 32C, the states in five stages (FIG. 32A) are shifted to the negative code side (in the direction of the arrows in FIG. 32C) so as to correspond to the respective ranges divided by the five amounts of control of the spread-light distribution (−u2, u1, 0, u1, and u2). Then, by using the membership function of this changed consequent, light distribution control is effected in the same way as described above (Step 380).

In addition, When the rate of change (dθ/dt) is less than or equal to 0, and when the steering angle θ is less than a predetermined angle θk (Step 398), it is determined that lane changing has been completed. The flag FLAG_R is set to the completed flag "2" (Step 400), and the membership function of the consequent is returned to the normal consequent GW (see FIGS. 15A to 15D) in the same way as described above.

Next, a description will be given of fuzzy inference in accordance with the membership functions in the consequents (FIGS. 32A to 32C), which are changed as described above, in accordance with the direction of the turn signal switch (when either the contact TSR or TSL is turned on).

To simplify the description, a description will be given of running conditions similar to those in the first embodiment (route and vehicle speed) and of fuzzy inference based on two rules, rule (5) and rule (6) in Table 1. Also, to avoid confusion, a description will be given by substituting φd for the deviation angle φ, and Vd for the vehicle speed V.

First, since fuzzy inference is the same as that of the first embodiment until the determination of the amount of control U, a brief description will be given thereof.

When the deviation angle θ is φd, and the vehicle speed V is Vd (see FIG. 33A), the degrees of fulfillment (antecedents) corresponding to the deviation angle θ and the vehicle speed v are calculated for rule (5) (see FIG. 33B) and rule (6) (see FIG. 33C). Next, an AND of the degrees of fulfillment, i.e., the Goodness of fit (a minimum value w of the degrees of fulfillment) with respect to the deviation angle φ and the vehicle speed V, is calculated with respect to each of the above-described rules. In rule (5), the minimum value of the degree of fulfillment thus determined becomes a goodness of fit $w_1$, and in rule (6) the minimum value becomes a goodness of fit $w_2$. Next, the result of inference is calculated for each of the rules. Namely, with respect to rule (5), a set W1 (see FIG. 33B), which is the hatched portion formed by cutting the membership function GW(RL) of the amount of control of the spread light at the goodness of fit $w_1$, is obtained. With respect to rule (6), a set W2 (see FIG. 33C), which is the hatched portion formed by cutting GW(RM) at the goodness of fit $w_2$, is obtained. The result of fuzzy inference becomes a set W in a hatched portion which combines the sets W1 and W2 (see FIG. 33D). Since the amount of control U of the spread light with respect to the center of gravity of this set W falls in a range from the amount of control u1 to an amount of control ux corresponding to a point of intersection between the membership functions GW(RM) and GW(RL), the RM state is selected.

Here, in a case where the contact TSL of the turn signal switch 70 is turned on and a leftward turn is indicated, the setting of the membership function GW of the antecedent is shifted, as described above (see FIG. 34A). At this time, the amount of control Ud of the spread of light with respect to the center of gravity of the set W, which is the result of inference of fuzzy inference (FIG. 34D), falls in a range from the amount of control u1 to the amount of control ux. Since this range is included in the RM state even after the above-described shift, the RM state is selected.

In a case where the contact TSR of the turn signal switch 70 is turned on and a rightward turn is indicated, the setting of the membership function GW of the antecedent is shifted, as described above (see FIG. 35A). At this time, the amount of control Ud of the spread of light with respect to the center of gravity of the set W, which is the result of inference of fuzzy inference (FIG. 35D), falls in a range from the amount of control u1 to the amount of control ux. Since this range has been changed by the above-described shift so as to be included in the RL state, the RL state is selected.

Thus, at the time of making a lane change in the rightward direction corresponding to the deviation angle φ, the light distribution increases further in the rightward direction, and the adjacent lane is illuminated, thereby ensuring visibility for the driver. In addition, at the time of making a lane change back to the left lane in the above-described case, since the light is already ensured by the light distribution in the straight advancing direction, it can be understood that only slight control is needed.

Figure 36C:
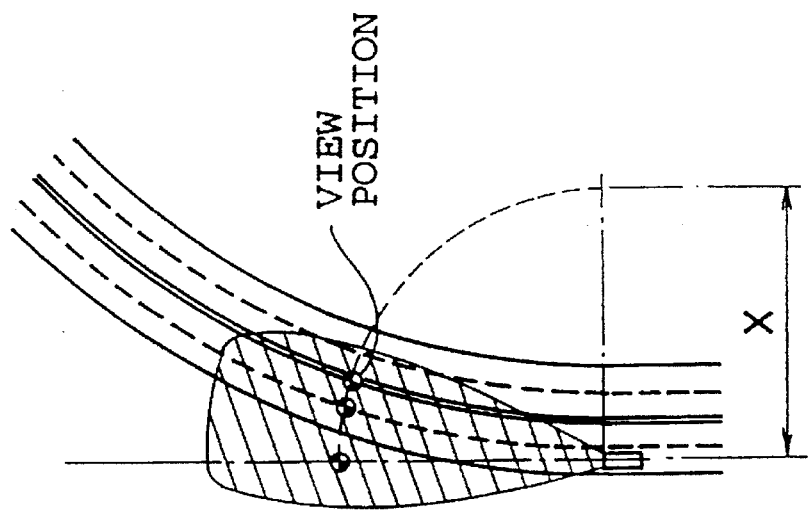
FIGS. 36A to 36C are plan views illustrating a road route and light distribution using the headlamps, and explaining the light distribution at the time of making a lane change in accordance with the fourth embodiment.
Figure 36B:
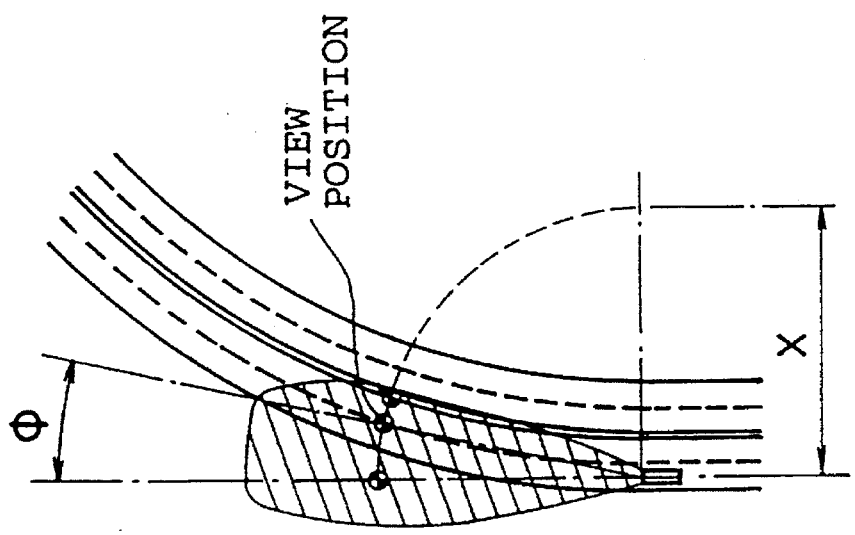
Figure 36A:
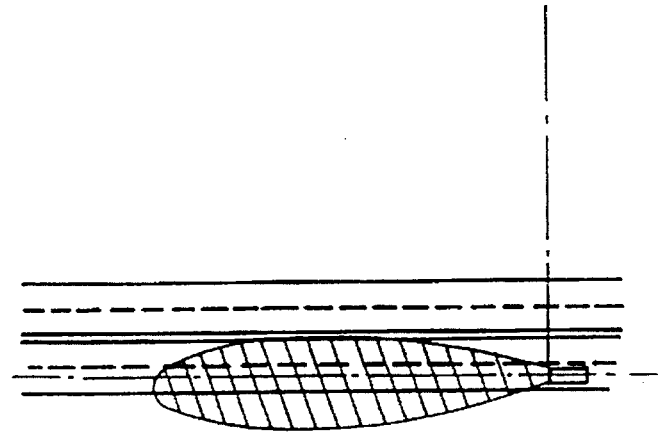

Accordingly, when the vehicle is advancing straight forward, as shown in FIG. 36A, light distribution in the straight advancing direction is made appropriately, thereby guaranteeing visibility. Here, in a case where the road is curved to the right, e.g., the route has a radius of 80 R, if the amount of control U of the light distribution, which is based on the spread of the light distribution and the distance reached by the light, is determined and the light is distributed on the basis of the fuzzy inference rules described above, the direction and the position viewed by the driver are positively illuminated by the headlamps, as shown in FIG. 33B, thereby improving the visibility. At this time, when the turn signal switch (TSR) is turned on for making a lane change, the view position shifts further to the right side as shown in FIG. 36C. The direction and the position viewed by the driver are optimally calculated in accordance with the turning on/off of the turn signal switch. Accordingly, even in a case in which the view position changes due to the intent of the driver to change lanes during high-speed running, the driver's visibility is improved.

Thus, in accordance with the fourth embodiment, information necessary at the time of a lane change can be obtained in advance from the turn signal switch. At the time of making a lane change, the position and the direction viewed by the driver are inferred through fuzzy inference, and light distribution is controlled. Hence, even in a case where the direction of the vehicle differs from the direction of the course of the road, light distribution is controlled in accordance with a lane change.

In addition, upon completion of the lane change, the operation returns to normal light distribution control, so that the variations in the view position at the time of conducting image processing are made small.

Further, in the fourth embodiment, the spread of light is not changed in correspondence with the turn signal switch, but the threshold value of the amount of control of the membership function in the consequent in fuzzy inference is changed. Therefore, it is possible to obtain an optimum light distribution only through simple selection, and there is no need to effect light distribution based on complicated control.

Figure 37C:
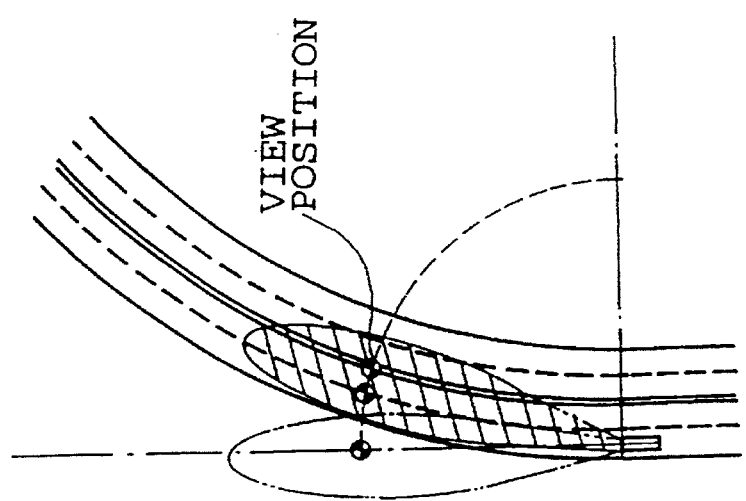
FIGS. 37A to 37C are plan views illustrating the road route and the light distribution of headlamps when optical axes are changed, and explaining the light distribution at the time of making a lane change in accordance with the fourth embodiment.
Figure 37B:
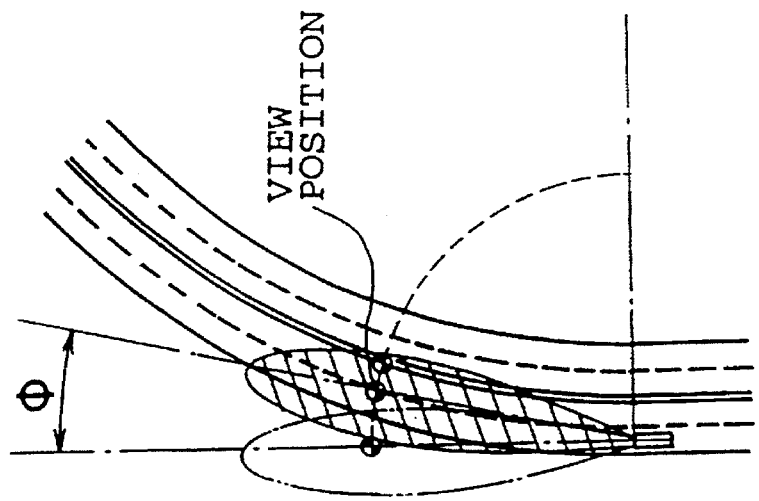
Figure 37A:
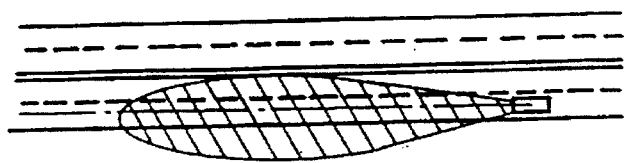

It should be noted that although, in the fourth embodiment, a description has been given of an example in which the light distribution is changed by changing the positions of the light-shielding plates in response to a lane change during high-speed running on the basis of the first embodiment, the present invention is not limited to the same, and the optical axis (center axis) of each headlamp may be changed. In this case, it suffices if the optical axis is oscillated to the left or right in correspondence with the deviation angle φ determined as described above and the spread light distribution obtained from fuzzy inference, and the optical axis is oscillated vertically in correspondence with the light-reaching distance obtained from fuzzy inference. An example of light distribution when the optical axis is changed is shown in FIGS. 37A to 37C. The diagrams of light distribution shown in FIGS. 37A to 37C correspond to diagrams of light distribution based on light distribution control using the shade, which are shown in FIGS. 36A to 36C.

It should be noted that although, in the above-described embodiment, a description has been given of fuzzy inference using an AND in which a minimum value of the degrees if fulfillment is set as the goodness of fit. However, it is possible to use an example in which the product of the degrees of fulfillment is calculated to determine the goodness of fit (fuzzy inference based on the algebraic product). Further, it is possible to use compounded rules of other types of fuzzy inference for determining the goodness of fit from the degree of fulfillment.

What is claimed is:

1. An apparatus for controlling a light distribution of a headlamp in which light performance is changeable comprising:

a sensor means for detecting vehicle operating condition;

calculating means for estimating a driver's view position which is determined by a the distance a vehicle reaches after a predetermined time along a forward roadway, and calculating a deviation angle formed by a running direction of said vehicle and a direction of said driver's view position; and first control means for controlling the light distribution composed of beam spread and beam orientation of said headlamp on the basis of a result of calculation by said calculating means.

2. An apparatus for controlling the light distribution of a headlamp according to claim 1, further comprising:

one of an optic and image sensor for detecting the forward roadway of said vehicle, said one of said optic and image sensor supplying information representing a route of the forward roadway.

3. An apparatus for controlling the light distribution of a headlamp according to claim 2, wherein the information representing the route of the forward roadway of said vehicle is obtained from sign posts arranged along the road.

4. An apparatus for controlling the light distribution of a headlamp according to claim 3, wherein said light distribution of the headlamp is calculated on the basis of said driver's view position and said deviation angle.

5. An apparatus for controlling the light distribution of a headlamp according to claim 1, wherein said light distribution of the headlamp is calculated on the basis of said driver's view position and said deviation angle.

6. An apparatus for controlling the light distribution of a headlamp according to claim 1, wherein said headlamp has adjusting means therein, and control of said light distribution is effected by controlling said adjusting means.

7. An apparatus according to claim 1, wherein said vehicle operating condition comprises a speed of the vehicle, and said first controlling means controls the light distribution by controlling the light distribution pattern of the headlamp.

8. An apparatus for controlling the light distribution of a headlamp in which light performance is changeable according to claim 7, further comprising:

one of an optic and image sensor for detecting the forward roadway of said vehicle, said one of said optic and image sensor supplying the information representing a route of the forward roadway.

9. An apparatus for controlling the light distribution of a headlamp in which light performance is changeable according to claim 8, wherein said headlamp has adjusting means therein, and said light distribution of said headlamp is effected by controlling said adjusting means.

10. An apparatus for controlling the light distribution of a headlamp as in claim 1, wherein said sensor means is a speed sensor for detecting a speed of said vehicle, said apparatus further comprising:

one of an optic and image sensor for detecting the forward roadway of said vehicle.

11. An apparatus for controlling the light distribution of a headlamp according to claim 10, wherein said driver's view position is determined by the distance said vehicle reaches after a predetermined time along the forward roadway and correction-coefficient when a vehicle acceleration exceeds a predetermined value.

12. An apparatus for controlling the light distribution of a headlamp as in claim 10 further comprising:

image processing means for determining the route of the forward roadway on the basis of a signal inputted thereto from said one of an optic and image sensor.

13. An apparatus for controlling the light distribution of a headlamp in which light performance is changeable, comprising:

a speed sensor for detecting a speed of a vehicle;

a turn signal switch for indicating a moving direction of said vehicle;

calculating means for maintaining and accommodating illumination level of driver's view field including driver's view position in accordance with route of the forward roadway of said vehicle, vehicle speed a direction of said vehicle indicated by said turn signal switch; and control means for controlling the light distribution composed of beam spread and beam orientation of said headlamp on the basis of a result of calculation by said calculating means.

14. An apparatus for controlling the light distribution of a headlamp according to claim 13, wherein when said speed of said vehicle determined in a high speed running state calculated by a signal of said speed sensor, said calculating means further estimates a driver's view position which is determined by distance of said vehicle reaching after predetermined time along the forward roadway and a direction of said vehicle indicated by turn signal switch and said light distribution of the headlamp is calculated on the basis of said driver's view position and said deviation angle.

15. An apparatus according to claim 1, further comprising:

storage means for storing a plurality of beam patterns composed of beam spread and beam direction corresponding with predetermined light performance;

selecting means for selecting a beam pattern in said storage means; and second control means for controlling the light distribution on the basis of the selected beam pattern selected by said selecting means.

16. An apparatus according to claim 1, further comprising:

a speed sensor for detecting a speed of a vehicle;

storage means for storing a plurality of beam patterns composed of beam spread and beam direction corresponding with predetermined light performance;

selecting means for selecting a beam pattern in said storage means on the basis of said deviation angle and said driver's view position; and second control means for controlling the light distribution on the basis of the beam pattern selected by said selecting means.

17. A method for controlling a light distribution of a headlamp in which light performance is changeable comprising the steps of:

detecting a speed of a vehicle;

estimating a driver's view position determined by a distance said vehicle reaches after a predetermined time along a forward roadway and a deviation angle formed by a running direction of said vehicle and a direction of said driver's view position;

calculating a light distribution of said headlamp for maintaining and accommodating illumination level of driver's view field including the driver's view position; and controlling the light distribution composed of beam spread and beam direction of said headlamp on the basis of a result of calculation.

18. A method for controlling a light distribution of a headlamp in which light performance is changeable, comprising the steps of:

assigning operating condition of a vehicle and a deviation angle between a running direction of the vehicle and a direction of a view position of driver on a scale respectively in advance in accordance with predetermined first principles while establishing degrees thereof;

identifying a position on the scale to determine the degree and carrying out a predetermined calculation with respect to the degree to produce a calculation result;

at least one of selecting and averaging the calculation result in accordance with predetermined second principles to determine a control value; and controlling the light distribution on the basis of the control value.

* * * * *